United States Patent
Han et al.

(10) Patent No.: US 11,471,833 B2
(45) Date of Patent: Oct. 18, 2022

(54) FLAT-PLATE FILTER FOR WATER TREATMENT AND FLAT-PLATE FILTER MODULE COMPRISING SAME

(71) Applicant: AMOGREENTECH CO., LTD., Gimpo-si (KR)

(72) Inventors: Kyung Gu Han, Goyang-si (KR); Jae Yun Kim, Seoul (KR)

(73) Assignee: Amogreentech Co., Ltd., Gimpo-si (KR)

( * ) Notice: Subject to any disclaimer, the term of this patent is extended or adjusted under 35 U.S.C. 154(b) by 422 days.

(21) Appl. No.: 16/334,843

(22) PCT Filed: Sep. 27, 2017

(86) PCT No.: PCT/KR2017/010702
§ 371 (c)(1),
(2) Date: Mar. 20, 2019

(87) PCT Pub. No.: WO2018/062838
PCT Pub. Date: Apr. 5, 2018

(65) Prior Publication Data
US 2020/0016542 A1 Jan. 16, 2020

(30) Foreign Application Priority Data
Sep. 29, 2016 (KR) .......... 10-2016-0125520
Oct. 6, 2016 (KR) .......... 10-2016-0129228
(Continued)

(51) Int. Cl.
*B01D 63/08* (2006.01)
*B01D 69/06* (2006.01)
(Continued)

(52) U.S. Cl.
CPC ............ *B01D 63/08* (2013.01); *B01D 69/06* (2013.01); *B01D 69/10* (2013.01); *C02F 1/44* (2013.01);
(Continued)

(58) Field of Classification Search
CPC ........ B01D 61/20; B01D 63/08; B01D 69/06; B01D 69/10; B01D 2312/02;
(Continued)

(56) References Cited

U.S. PATENT DOCUMENTS

| 10,589,195 B2 * | 3/2020 | Han | B01D 29/92 |
| 2010/0096317 A1 * | 4/2010 | Morita | B01D 71/36 |
| | | | 210/321.84 |

FOREIGN PATENT DOCUMENTS

| EP | 3498362 A1 | 6/2019 |
| JP | 2013202515 A | 10/2013 |

(Continued)

OTHER PUBLICATIONS

KR20060019241A—EPO Machine Translation (Year: 2020).*
(Continued)

*Primary Examiner* — Patrick Orme
(74) *Attorney, Agent, or Firm* — Rothwell, Figg, Ernst & Manbeck, P.C.

(57) ABSTRACT

A flat-plate filter for water treatment and a flat-plate filter module comprising the same are provided. The flat-plate filter for water treatment according to an embodiment of the present invention comprises: a piece-shaped filtration member comprising a first support and a membrane formed on both sides of the first support; and a support frame fitted in and coupled to the edge of the filtration member so as to support the filtration member, and having a flow path through which filtered water introduced from at least one surface of the filtration member flows, wherein a part of the
(Continued)

filtration member is disposed in the flow path or at the edge of the flow path such that the first support is exposed.

15 Claims, 38 Drawing Sheets

(30) Foreign Application Priority Data

Oct. 14, 2016 (KR) .................. 10-2016-0133606
Oct. 14, 2016 (KR) .................. 10-2016-0133607
Oct. 14, 2016 (KR) .................. 10-2016-0133609

(51) Int. Cl.
*B01D 69/10* (2006.01)
*C02F 1/44* (2006.01)

(52) U.S. Cl.
CPC ...... *B01D 2313/06* (2013.01); *B01D 2313/12* (2013.01); *B01D 2319/04* (2013.01)

(58) Field of Classification Search
CPC .......... B01D 2313/025; B01D 2313/06; B01D 2313/12; B01D 2313/54; B01D 2313/56; B01D 2315/06; B01D 2319/04; C02F 1/44

See application file for complete search history.

(56) References Cited

FOREIGN PATENT DOCUMENTS

| | | |
|---|---|---|
| KR | 10-0459037 B1 | 11/2004 |
| KR | 200368690 Y | 11/2004 |
| KR | 10-2006-0019241 A | 3/2006 |
| KR | 20060019241 A * | 3/2006 |
| KR | 10-2011-0126506 A | 11/2011 |
| KR | 10-2011-0139692 A | 12/2011 |
| KR | 101242080 B1 | 3/2013 |
| WO | 2014126443 A1 | 8/2014 |
| WO | WO 2014126443 A1 * | 8/2014 |

OTHER PUBLICATIONS

WO2014126443A1—EPO Machine Translation (Year: 2020).*
Search Report cited in PCT/KR2017/010702, dated Feb. 1, 2018, 2 pages.

* cited by examiner

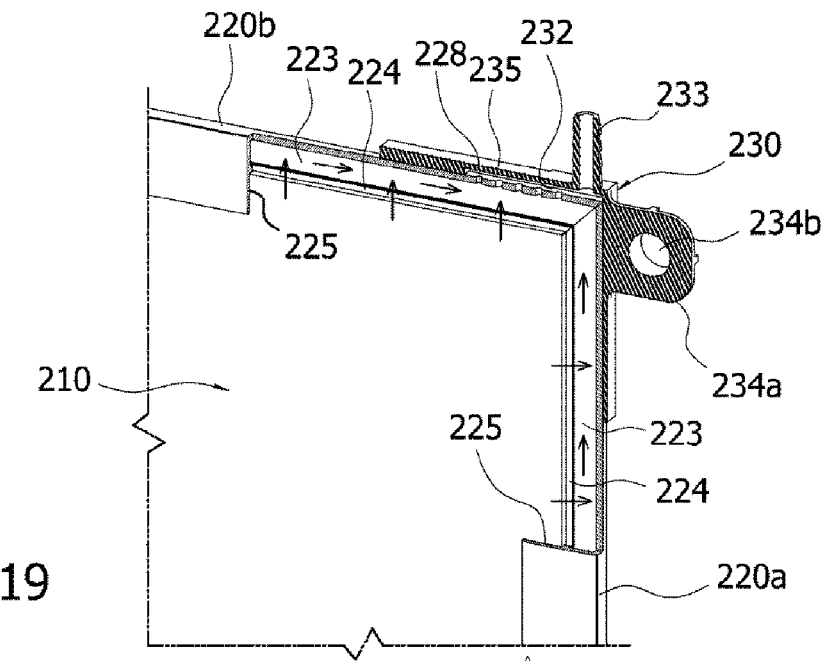
FIG. 19
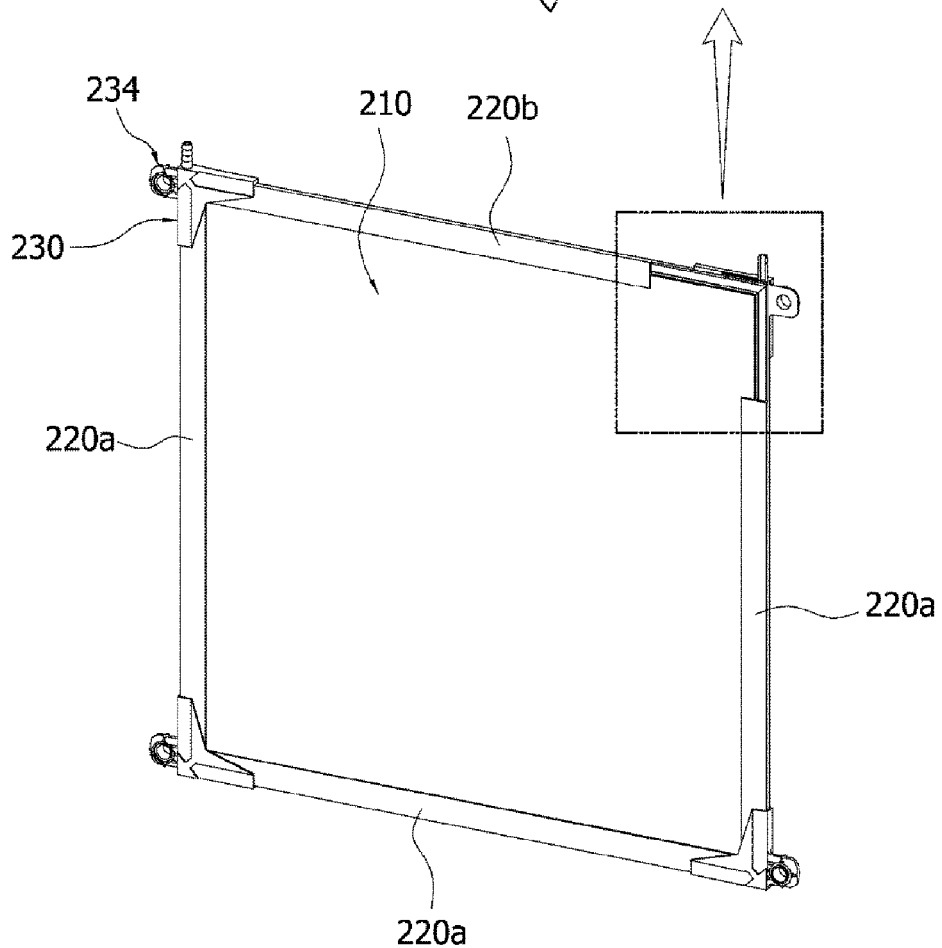

FLAT-PLATE FILTER FOR WATER TREATMENT AND FLAT-PLATE FILTER MODULE COMPRISING SAME

CROSS REFERENCE TO RELATED APPLICATION

This application is a 35 U.S.C. 371 National Phase Entry Application from PCT/KR2017/010702, filed Sep. 27, 2017, which claims the benefit of Korean Patent Application Nos. 10-2016-0125520 filed Sep. 29, 2016, 10-2016-0129228 filed Oct. 6, 2016, 10-2016-0133606, 10-2016-0133607 and 10-2016-0133609 all filed on Oct. 14, 2016, the disclosures of which are incorporated herein in their entirety by reference.

DESCRIPTION

Technical Field

The present invention relates to a flat-plate filter for water treatment and a flat-plate filter module including the same.

Background Art

Generally, owing to the rapid development of industries and urban concentration of population, urban sewage and industrial wastewater have been increased. The increase of wastewater is becoming a serious problem in modern society, and various wastewater treatment facilities are being proposed for economical and efficient treatment.

In such various wastewater treatment facilities, a plurality of filters for filtering wastewater may be provided, and the wastewater is filtered through filtration members included in the plurality of filters.

In this case, when the filtration member is provided in a flat-plate shape having a predetermined area, a support frame for supporting the filtration member is engaged with an edge of the filtration member.

Conventionally, an open end is formed at one side of the support frame to allow a filtration member to be inserted into the support frame, and a flow path is formed at the other side of the support frame. However, due to a structure of the conventional support frame, a passage through which filtered water produced through the filtration member flows to the flow path is narrow such that filtration efficiency is degraded.

Further, a plurality of support frames are provided and coupled through a connecting member. However, due to the structure of the conventional support frame, a support frame in vicinity of a water receiving hole is manufactured in shape differently from other support frames such that productivity is degraded.

Further, a plurality of support frames are provided to include flow paths having the same shape. However, due to the structure of the conventional support frame, a suction pressure during a filtration process or a back-washing pressure during a washing process acts differently in the filtration member according to a region such that filtration efficiency or cleaning efficiency is degraded.

Further, the support frame is fixed to the edge of the filtration member via an adhesive member. Consequently, a bonding process for fixing the support frame to the filtration member is accompanied such that there is a problem in that a work process becomes cumbersome.

DISCLOSURE

Technical Problem

The present invention is directed to providing a flat-plate filter for water treatment, which is capable of improving filtration efficiency by increasing an amount of filtered water flowing from a filtration member into a flow path, and a flat-plate filter module including the same.

The present invention is also directed to providing a flat-plate filter for water treatment, which is capable of improving productivity by standardizing a coupling structure of a frame, and a flat-plate filter module including the same.

The present invention is further directed to providing a flat-plate filter for water treatment, which is capable of improving engageability and tightness by allowing a sufficient amount of adhesive members to be accommodated between surfaces of a connecting member and a frame facing each other, and a flat-plate filter module including the same.

The present invention is further directed to providing a flat-plate filter for water treatment, which is capable of improving filtration efficiency and cleaning efficiency by preventing imbalance in pressure of regions of a filtration member, and a flat-plate filter module including the same.

The present invention is further directed to providing a flat-plate filter for water treatment, which is capable of improving increasing work productivity by inserting and disposing a support frame between nanofiber webs facing each other, and a flat-plate filter module including the same.

Technical Solution

One aspect of the present invention provides a flat-plate filter for water treatment, including a piece-shaped filtration member, which includes a first support and a membrane formed on both surfaces of the first support, and a support frame fitted in and inserted into an edge of the filtration member so as to support the filtration member and having a flow path through which filtered water flows from at least one surface of the filtration member. A portion of the filtration member may be disposed in the flow path so as to expose the first support or may be disposed at an edge of the flow path.

The membrane may be removed from at least a portion on both sides of the portion of the filtration member disposed in the flow path such that the first support may be exposed to the flow path.

The support frame may include a plurality of frames coupled to the edge of the filtration member, and the plurality of frames may each include a first plate and a pair of second plates extending from both end portions of the first plate so as to allow the edge of the filtration member to be inserted.

The flow path may be formed by inner surfaces of the first plate and the second plates and one surface of the first support.

Only the first support on one surface of the filtration member may be brought into contact with the first plate.

The frame may further include a confinement member protruding from an inner surface of the first plate toward the flow path so as to limit an insertion depth of the filtration member.

An accommodation space for accommodating an adhesive member may be formed between the filtration member and inner surfaces of the second plates.

The accommodation space may be formed through at least one step surface, which is formed on an inner surface of an end portion of the second plate by being incised in a length direction of the frame.

The plurality of frames may be disposed such that one end portion thereof is brought into contact with another end portion thereof, a collecting space in which filtered water flows in different directions through the flow path may be formed at adjacent end portions constituting a corner of the support frame, and the collecting space may communicate with a water receiving hole for discharging the filtered water to the outside.

The flat-plate filter for water treatment may further include a plurality of connecting members coupled to corners of the support frame, wherein a gap adjuster for adjusting a gap between adjacent filtration members may be provided to at least one among the plurality of connecting members.

Each of the plurality of connecting members may include a body coupled to the corner of the support frame and a gap adjuster having an engagement hole through which an engagement bar having a predetermined length passes.

At least one among the plurality of connecting members may further include a water receiving hole for discharging the filtered water flowing into the flow path to the outside.

The filtration member may further include a second support disposed between the membrane and the first support.

The membrane may be made of a nanofiber web formed of nanofibers.

Another aspect of the present invention provides a flat-plate filter module for water treatment, including a plurality of the above-described flat-plate filters for water treatment, each of which include at least one water receiving hole through which water filtered through a filtration member is discharged and which are disposed in parallel; a fixing frame configured to fix the plurality of flat-plate filters for water treatment disposed in parallel via at least one engagement bar; and at least one common water receiving member connected to the water receiving holes provided at the plurality of flat-plate filters for water treatment in a one-to-one relationship to collect the filtered water discharged from the water receiving holes.

Advantageous Effects

According to exemplary embodiments of the present invention, a support of a filtration member increases an area exposed to a flow path, and thus an amount of filtered water flowing from the filtration member into the flow path can be increased such that filtration efficiency can be improved. Therefore, a filtration time can be shortened or a treatment amount of waste water can be increased such that economic feasibility of wastewater treatment can be improved.

Further, according to exemplary embodiments of the present invention, both end portions of each of a plurality of frames coupled via a connecting member are processed in the same shape such that an assembly process of the plurality of frames can be improved and productivity can be increased.

Further, according to exemplary embodiments of the present invention, end portions of the plurality of frames can be coupled through oblique cut surfaces to increase an area in which end portions of two frames are brought into contact with each other such that a coupling force between the frames and a supporting force of the filtration member can be improved.

Further, according to exemplary embodiments of the present invention, since a separated space is formed between surfaces of the connecting member and the frame which face each other, a sufficient amount of an adhesive member can be accommodated in the separated space to improve tightness, and the connecting member can be easily coupled to the frame to improve engageability.

Further, according to exemplary embodiments of the present invention, since a cross-sectional area of the flow path formed at the support frame is differently provided according to a position and a distance from a water receiving hole such that imbalance in pressure between regions of the filtration member can be prevented to improve filtration efficiency or washing efficiency.

Further, according to exemplary embodiments of the present invention, since the imbalance in pressure between the regions of the filtration member is prevented, a partial damage to the filtration member is prevented such that a service life thereof can be improved to reduce a maintenance cost.

Further, according to exemplary embodiments of the present invention, the frame inserted between nanofiber webs is fixed to edges of the nanofiber webs through heat fusing such that work productivity can be increased.

Further, according to exemplary embodiments of the present invention, a bonding area is increased due to heat fusing such that tightness can be enhanced and stiffness against a back-washing pressure can be enhanced.

DESCRIPTION OF DRAWINGS

FIG. 19 is a diagram illustrating a flow route of filtered water flowing into a water receiving hole in the flat-plate filter for water treatment according to the second embodiment of the present invention.

FIG. 42A is a diagram illustrating a case in which a gap is formed between the frame and a second support, and FIG. 42B is a diagram illustrating a case in which the filtration member is implemented as a three-layer structure.

MODES OF THE INVENTION

Figure 1:
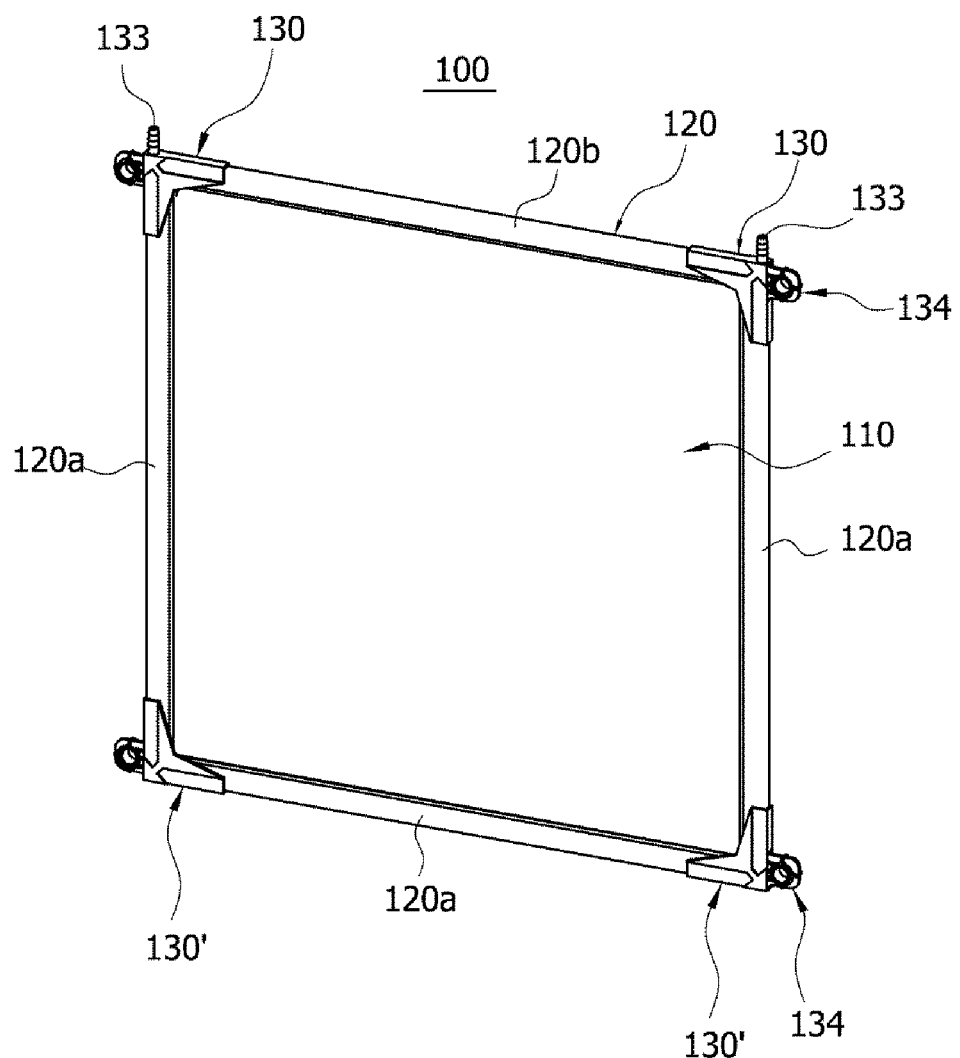
FIG. 1 is a diagram illustrating a flat-plate filter for water treatment according to a first embodiment of the present invention.

Hereinafter, embodiments of the present invention will be fully described in detail which is suitable for easy implementation by those skilled in the art to which the present invention pertains with reference to the accompanying drawings. The present invention may be implemented in various different forms, and thus it is not limited to embodiments which will be described herein. In the drawings, some portions not related to the description will be omitted and not shown in order to clearly describe the present invention, and the same reference numerals are given to the same or similar components throughout this disclosure.

Figure 2:
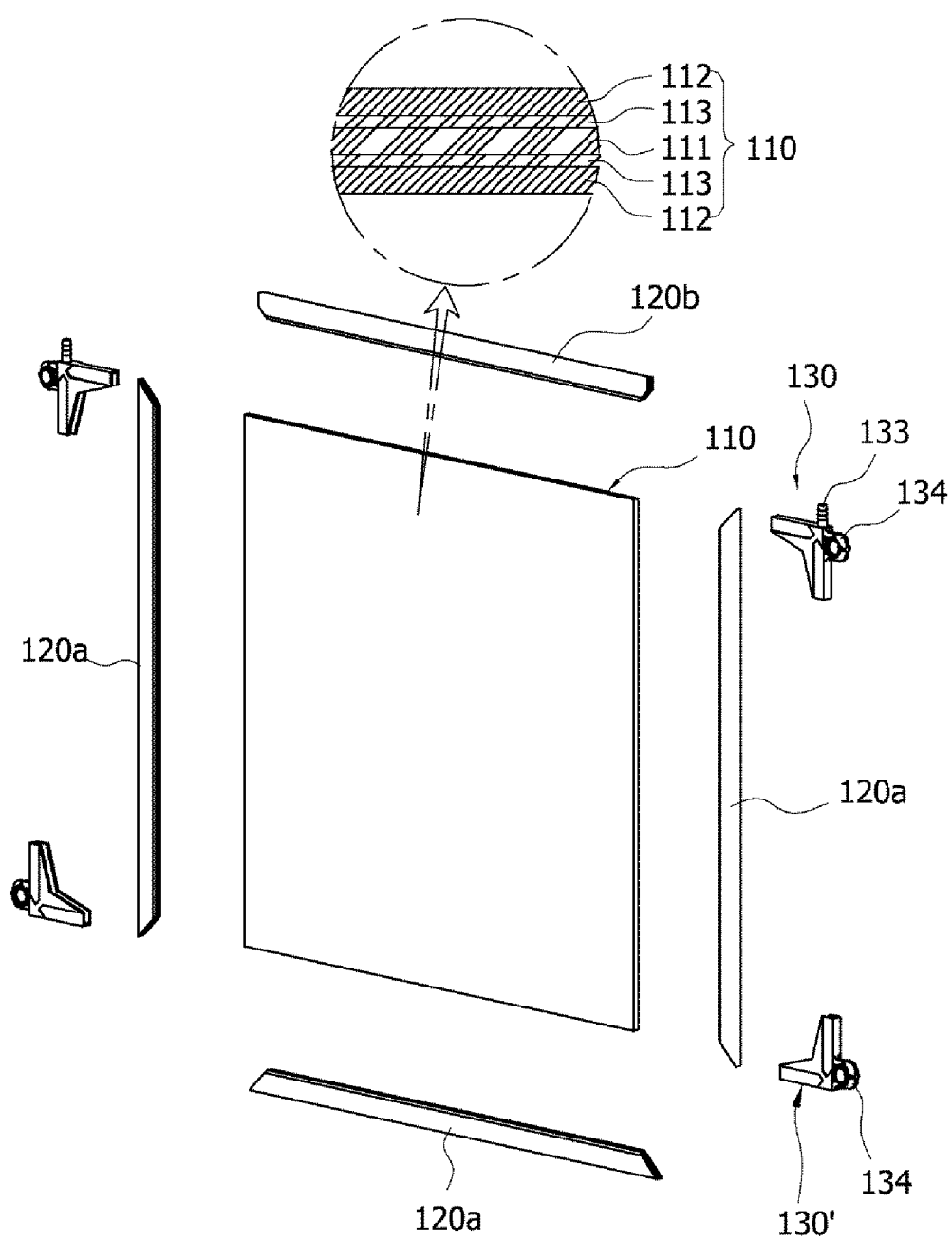
FIG. 2 is an exploded view of FIG. 1.

As shown in FIGS. 1 and 2, a flat-plate filter 100 for water treatment according to a first embodiment of the present invention includes a filtration member 110 and a support frame 120.

The filtration member 110 is configured to filter foreign materials contained in a target filtration liquid such as wastewater. A known filtration member may be used as the filtration member 110, but the filtration member 110 may have a plate shape in which a membrane 112 is disposed on both sides of a first support 111.

Here, the membrane 112 is configured to filter foreign materials contained in the target filtration liquid while the target filtration liquid passes through the membrane 112 due to a suction pressure, and the first support 111 serves to support the membrane 112 and serves as a flow passage through which filtered water produced by the membrane 112 flows. For example, the membrane 112 may be made of a nanofiber web.

In this case, the filtration member 110 may have a three-layer structure in which the nanofiber web 112 is directly attached to both sides of the first support 111. Alternatively, the filtration member 110 may have a five-layer structure in which the nanofiber web 112 is attached to both of the sides of the first support 111 via a second support 113. Here, the filtration member 110 may also be constituted of a filtration member having a single-layer structure or a conventional filtration member.

Here, a second support 113 may be formed to have a thickness that is relatively smaller than a thickness of the first support 111 so as to reduce an overall thickness of the filtration member 110. The second support 113 may be laminated on one surface of the first support 111.

As described above, the nanofiber web 112 is attached to the first support 111 via the second support 113 instead of being directly attached to the first support 111 such that adhesive strength may be improved so as to easily attach the nanofiber web 112.

For example, the nanofiber web 112 may be attached to the first support 111 via the second support 113 through heat fusing, ultrasonic fusing, microwave fusing, or the like.

Here, during the attachment, the second support 113 may be partially or entirely melted and attached to the first support 111.

In this case, the nanofiber web 112 may have a melting temperature that is higher than a process temperature during the fusing so as to not be melted due to heat, whereas the second support 113 may have a melting temperature that is lower than the process temperature during the fusing.

Consequently, the filtration member 110 may be implemented as a three-layer structure due to complete melting of the second support 113, or as a five-layer structure resulting from the second support 113 being partially melted so as to remain between the nanofiber web 112 and the first support 111. However, a structure of the filtration member 110 is not limited to the above-described structures, and any structure may be employed as long as it can be constituted such that one or more support layers are interposed between two nanofiber webs 112.

Further, the first support 111 and the second support 113 may be made of porous materials so as to serve as flow passages through which filtered water produced by the nanofiber web 112 will flow.

For example, the first support 111 and/or the second support 113 may be any one among commonly used known fabrics, knits, and non-woven fabrics. The non-woven fabrics may employ dry non-woven fabrics such as chemically bonded non-woven fabrics, thermally bonded non-woven fabrics, airlaid non-woven fabrics, and the like, or known non-woven fabrics such as wet non-woven fabrics, spunlace non-woven fabrics, needle punched non-woven fabrics, meltblown non-woven fabrics, and the like. An opening, porosity, a basis weight, and the like of the non-woven fabric may be varied according to desired water permeability, desired filtration efficiency, and mechanical strength.

In other words, materials for the first support 111 and/or the second support 113 are not limited. For example, a synthetic fiber selected from the group consisting of polyester, polypropylene, nylon, and polyethylene, or a natural fiber including a cellulose-based fiber may be used.

However, during a water treatment process, in order to prevent problems of separation between the nanofiber web 112 and the first support 111 and/or the second support 113, and degradation of water permeability due to the use of a separate adhesive component through improvement of a binding force with the nanofiber web 112, the first support 111 and the second support 113 may each include a low melting point polymer such as a known low melting point polyester, a known low melting point polyethylene, or the like which is capable of being thermally fused and may each be made of a polyester-based low melting point composite fiber in which a sheath is formed of low melting point polyester and a core is formed of polyethylene terephthalate, and/or a polyolefin-based low melting point composite fiber in which the sheath is formed of low melting point polyethylene and the core is formed of polypropylene.

Here, a melting point of the low melting point polymer may be in the range of 60 to 180° C. and a thickness of the first support 111 may be in the range of 2 to 200 μm, but the present invention is not limited thereto.

Meanwhile, the second support 113 applied to the present invention may be made of a material that is different from that of the first support 111. Alternatively, the second support 113 may be made of a material that is identical to that of the first support 111 to enhance adhesive power with the first support 111 while being laminated therewith.

The nanofiber web 112 is configured to filter foreign materials contained in a target filtration liquid and may be formed of a nanofiber. In this case, the nanofiber may include a fiber forming component, which contains polyacrylonitrile (PAN) and polyvinylidene fluoride (PVDF), and an emulsifier for improving miscibility of the fiber forming component.

Here, the fiber forming component may include PAN having high hydrophilicity and PVDF having very high hydrophobicity.

Owing to the nature of PVDF, mechanical strength and chemical resistance of the nanofiber may be secured. Since PAN has high hydrophilicity, hydrophobicity of the nanofiber is prevented and hydrophilicity thereof is improved such that, when the nanofiber is attached to the filtration member, improved water permeability may be exhibited.

Meanwhile, the nanofiber web 112 may include a nanofiber web of a three-dimensional network structure. For example, the nanofiber including the emulsifier and the fiber forming component containing PAN and PVDF is stacked perpendicular to a stranding surface. Owing to a solvent which is not volatilized and evaporated into air during stranding, fusing occurs in a portion at which surfaces of nanofibers among the stacked nanofibers are brought into contact with each other such that a three-dimensional network structure may be formed.

The nanofiber web 112 may be constituted of a single layer or a plurality of layers.

The support frame 120 is coupled to an edge of the filtration member 110 to support the edge thereof such that the filtration member 110 may be maintained in a plate-shaped form.

The support frame 120 may be made of a single member to entirely or partially support the edge of the filtration member 110. Alternatively, the support frame 120 may be implemented as a plurality of frames 120a and 120b coupled to the edge of the filtration member 111.

For example, the plurality of frames 120a and 120b may be disposed at the edge of the filtration member 110 so as to allow an end portion of one frame of the plurality of frames 120a and 120b to be brought into contact with an end portion of the other frame thereof, and the end portions of two adjacent frames 120a and 120b may be connected via connecting members 130 and 130' which are disposed at corners of the filtration member 110 (see FIG. 2).

However, the support frame is not limited to the above-described shape and may be changed into various shapes such as a circular shape, an arc shape, a polygonal shape, and a combination thereof according to the shape of the filtration member 110. Any shape may be employed as long as it can entirely surround the edge of filtration member 110.

In this case, the support frame 120 may serve to support the filtration member 110 in a form of a plate shape as well as serve as a flow route for allowing the filtered water produced by the nanofiber web 112 to flow to a water receiving hole 133 through an externally provided suction force.

Figure 3:
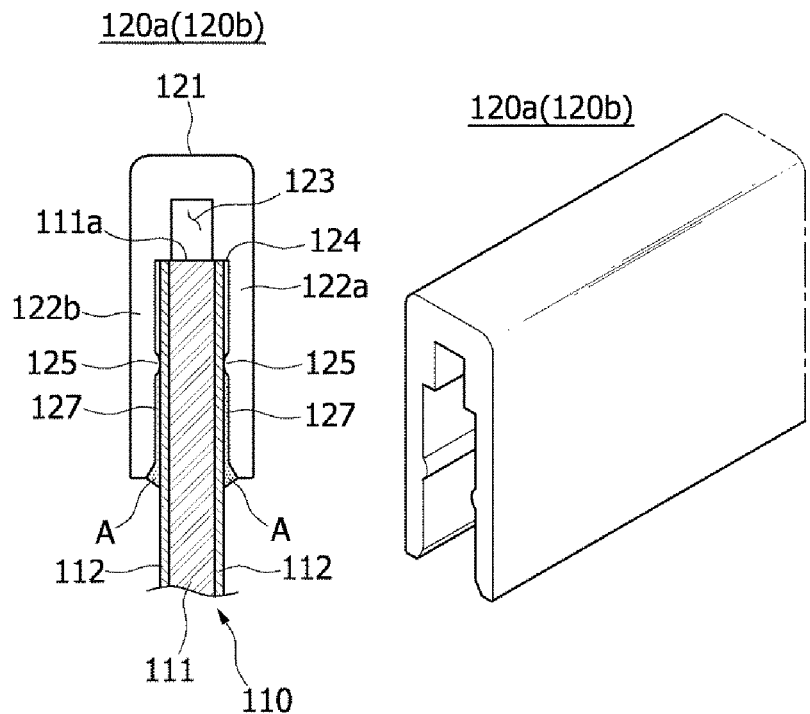
FIGS. 3 to 7 are cross-sectional views and partial perspective views illustrating various forms of a support frame and a filtration member which are applied to the flat-plate filter for water treatment according to the first embodiment of the present invention.

To this end, each of the frames 120a and 120b constituting the support frame 120 may be provided in a substantially right-rotated U shape having one opened side, and a flow path 123 through which the filtered water flowing from the filtration member 110 moves is formed inside each of the frames 120a and 120b (see FIG. 3).

More specifically, each of the plurality of frames 120a and 120b may include a plate-shaped first plate 121, and a pair of second plates 122a and 122b extending from the first plate 121 in a direction perpendicular to the first plate 121 (See FIGS. 3 to 7).

Consequently, the edge of the filtration member 110 may be inserted into open ends of the frames 120a and 120b, i.e., a space formed between the pair of second plates 122a and 122b, thereby being supported on the pair of second plates 122a and 122b facing each other.

In this case, a portion of the filtration member 110 may be disposed in the flow path 123 or at an edge of the flow path 123 so as to expose the first support 111 or the second support 113.

Consequently, an area in which the first support 111 and the flow path 123 are in contact with each other increases, i.e., an area in which the filtered water flows from the first support 111 to the flow path 123 increases such that an amount of the filtered water flowing into the flow path 123 may be increased due to an externally provided suction force. Therefore, filtration efficiency may be improved while the filtration member 110 having the same area is used.

Further, during a back-washing process, it is possible to supply a fluid such as higher pressure washing water due to an increased inflow area between the flow path 123 and the first support 111 or between the flow path 123 and the second support 113 such that foreign materials attached to the filtration member 110 may be removed more quickly and completely to prevent degradation of filtration efficiency and improve a production yield.

For example, the filtration member 110 is disposed at the edge of the flow path 123. In this case, the edge of the filtration member 110 inserted into the space formed between the pair of second plates 122a and 122b may be inserted to be spaced at a predetermined distance from the first plate 121.

That is, as shown in FIG. 3, a confinement member 124 for limiting an insertion depth of the filtration member 110 may be provided on surfaces facing each other of the pair of facing second plates 122a and 122b. Here, the confinement member 124 may be formed as a step surface 124 formed by being incised in a length direction on inner surfaces of the frames 120a and 120b.

Consequently, the insertion depth of the filtration member 110 is limited through the confinement member 124 while the edge of the filtration member 110 is engaged with each of the frames 120a and 120b such that a predetermined space may be formed between an end portion of the edge of the filtration member 110 and the first plate 121.

Accordingly, when the filtration member 110 is coupled to the frames 120a and 120b, the edge of the filtration member 110 is always maintained in a state of being spaced apart from the first plate 121 such that the flow path 123 through which a fluid such as filtered water or washing water may move may be formed by the inner surfaces of the first plate 121 and the second plates 122a and 122b and one surface 111a of the first support 111.

Consequently, since the first support 111 or the second support 113 is directly brought into contact with the flow path 123 by an area exposed to the flow path 123, i.e., by corresponding to a width of the flow path 123, an area through which the filtered water may flow to flow path 123 is increased such that filtration efficiency may be improved.

In this case, the flow path 123 may be formed to have a width that is substantially equal to a width of the first support 111 or the sum of widths of the first support 111 and the second support 113. That is, the width of the flow path 123 and the width of the first support 111 or the second support 113 may be determined so as to maximize an area in which the flow path 123 is brought into contact with the first support 111 or the second support 113.

Further, the filtration member 110 may be formed such that a plurality of semicircular grooves (not shown) are formed on the exposed surface 111a of the first support 111. That is, the plurality of semicircular grooves (not shown) are formed on one surface of the filtration member 110 inserted between the second plates 122a and 122b such that an area in contact with the flow path 123 on the one surface of the filtration member 110 is increased by inner surfaces of the plurality of semicircular grooves.

Consequently, an amount of filtered water flowing from the filtration member 110, particularly the first support 111 or the second support 113, to the flow path 123 is further increased such that filtration efficiency may be further improved.

Alternatively, a portion of a filtration member 110' may be disposed in a flow path 123a, and the nanofiber web 112 may be removed from at least a portion of both sides of the portion of the filtration member 110' disposed in the flow path 123a such that the first support 111 may be exposed to the flow path 123a.

In this case, each frame 120a' and 120b' may not have a separate confinement member, and one surface of the filtration member 110' may be brought into surface contact with the first plate 121. Further, in order to allow the filtration member 110' to be inserted into the flow path 123a, a width of the flow path 123a should be formed to be at least larger than a width of the filtration member 110'.

Figure 4:
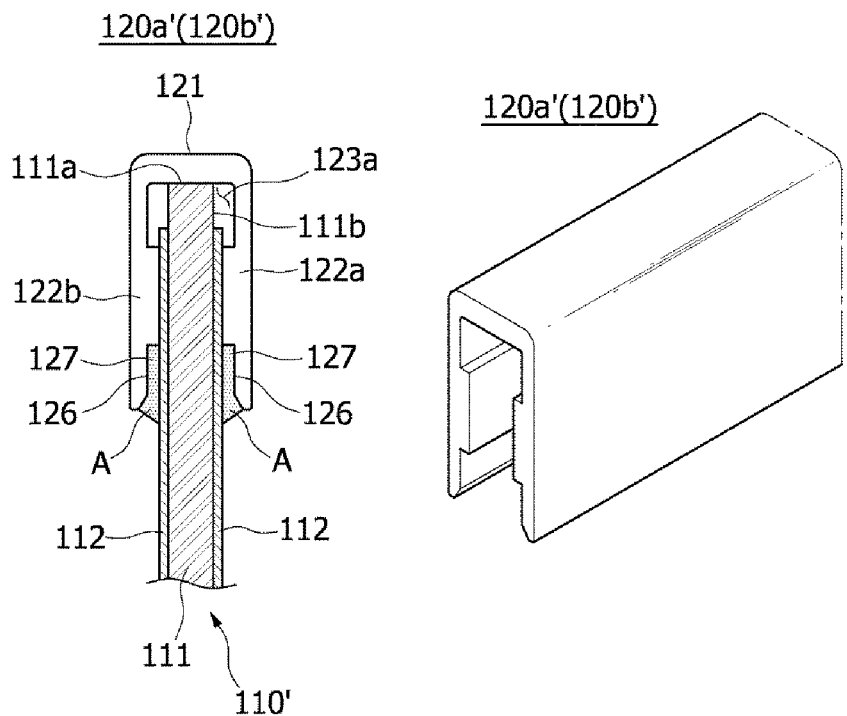

That is, as shown in FIG. 4, in order to expose a portion 111b of the first support 111, the filtration member 110' may be inserted to an end of the flow path 123a in a state in which the nanofiber web 112 is removed, thereby being brought into surface contact with the first plate 121.

Here, since the nanofiber web 112 is partially removed from the filtration member 110', only the exposed surface 111a of the first support 111 may be brought into surface contact with the inner surface of the first plate 121. Although only the filtration member 110' has been described as being exposed to the flow path 123a, this is the case in which the filtration member 110' has a three-layer structure, and when the filtration member 110' has a five-layer structure, the second support 113 may be exposed. Thus, in the following description, unless otherwise specified, the first support 111 may be understood to include the second support 113.

Consequently, an area in which the filtered water may flow between the filtration member 110' and the flow path 123a may be increased by corresponding to the area of the portion 111b in which the nanofiber web 112 is removed from both sides of the filtration member 110'.

In this case, since the exposed surfaces 111a on both sides of the first support 111 are brought into surface contact with the first plate 121 and thus the filtered water cannot flow, the area of the portion 111b from which the nanofiber web 112 is removed so as to improve filtration efficiency may be formed to be larger than an area corresponding to the width of the support 111.

Here, the portion 111b in which the nanofiber web 112 is removed from the filtration member 110' may be formed to be equal to or smaller than a height of the flow path 123a. That is, the nanofiber web 112 may be removed to completely expose the first support 111 in the flow path 123a.

Further, a plurality of through-holes (not shown) may be formed at a portion of the filtration member 110' disposed in the flow path 123. In this case, the plurality of through-holes (not shown) may be formed at only the portion 111b of the first support 111 in a state in which the nanofiber web 112 is removed from the portion of the filtration member 110' disposed in the flow path 123. Alternatively, in a state in which the nanofiber web 112 is not removed, i.e., a plurality of through-holes may be formed to entirely pass through the first support 111 and the nanofiber web 112.

Consequently, since an area in which the flow path 123a is brought into contact with the first support 111 or the second support 113 may be increased by an area corresponding to inner surfaces of the plurality of through-holes (not shown), an amount of the filtered water flowing from the first support 111 or the second support 113 to the flow path 123a is increased such that filtration efficiency may be further improved.

Alternatively, an upper surface of the filtration member 110' may be exposed to the flow path. In this case, the frames 120a" and 120b" may be formed such that the edge of the filtration member 110 inserted into the space formed between the pair of second plates 122a and 122b is spaced a predetermined distance from the first plate 121.

Figure 5:
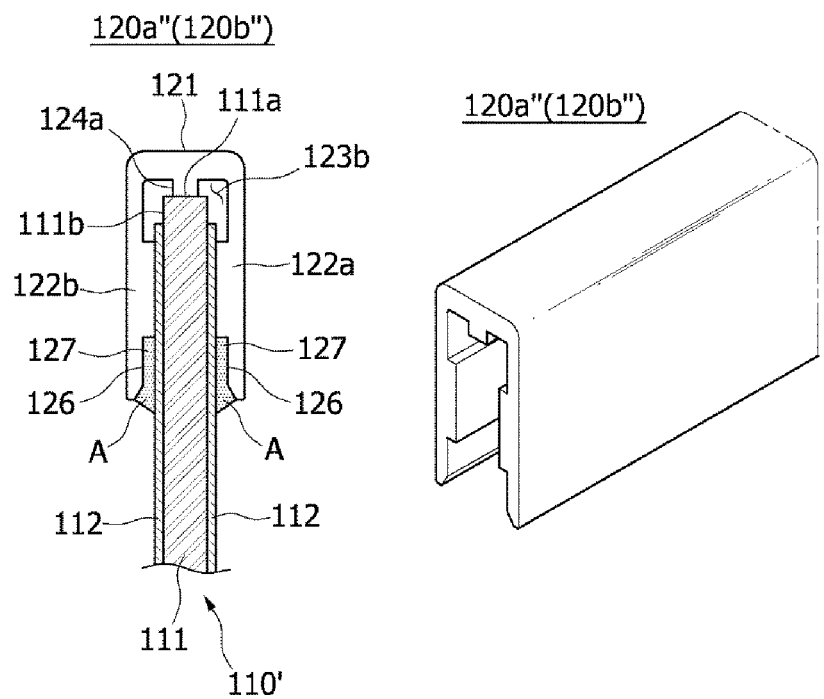
Figure 6:
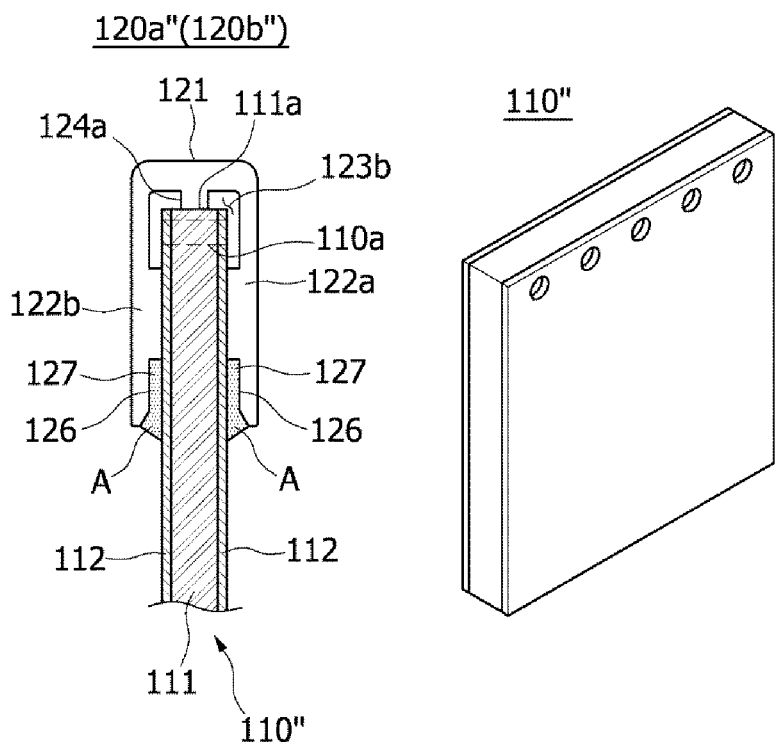
Figure 7:
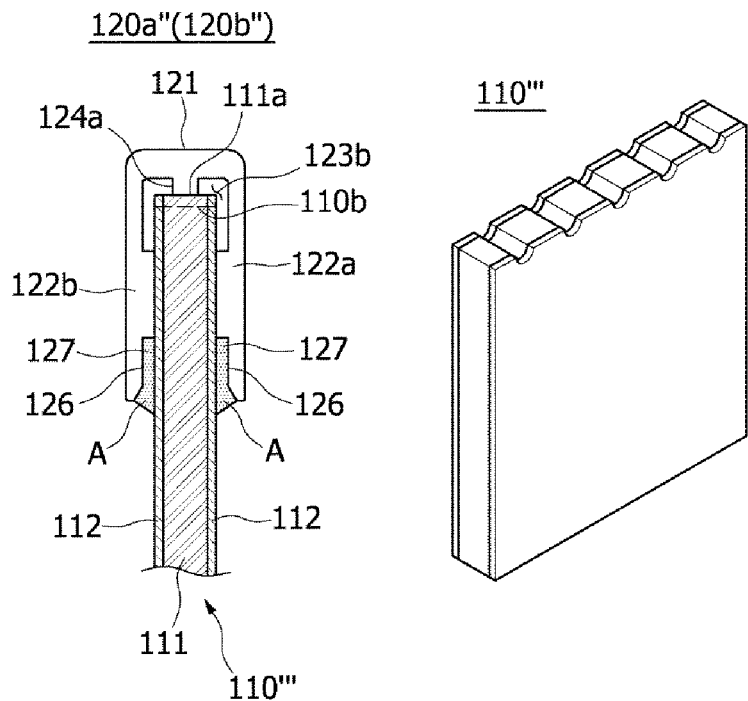

That is, as shown in FIG. 5, a confinement member 124a may be provided with respect to the surfaces of the pair of facing second plates 122a and 122b of the frames 120a" and 120b" which are facing each other to limit an insertion depth of the filtration members 110', 110", or 110''' (see FIGS. 5 to 7).

In this case, the confinement member 124a may be formed to protrude from the inner surface of the first plate 121 toward the flow path 123a. Further, the confinement member 124a may be entirely or partially provided in the length direction of each frame.

Consequently, since the filtered water may flow through the exposed surface 111b on both sides of the first support 111 as well as an exposed surface 111a on an upper side thereof in a flow path 123b, filtration efficiency of the filtration member 110' may be further improved as compared with FIG. 4.

Alternatively, a plurality of through-holes 110a may be formed at a portion of the filtration member 110" disposed in the flow path 123a. In this case, the nanofiber web 112 may not be removed from both sides of the filtration member 110".

That is, as shown in FIG. 6, in a state in which the nanofiber web 112 is not removed from the filtration member 110", the plurality of through-holes 110a may be formed at an upper side of the filtration member 110" disposed in the flow path 123b, and then the filtration member 110" may be inserted into frames 120a" and 120b" provided with the confinement member 124a formed to protrude from the first plate 121 at an upper side of the flow path 123b.

In this case, since the nanofiber web 112 is not removed from both of the sides of the filtration member 110" and thus a passage through which the filtered water may flow is limited to the exposed surface 111a on the upper side of the filtration member 110", the plurality of through holes 110a are formed such that an area of the passage may be increased.

Consequently, the filtered water may flow through the exposed surface 111a on an upper side of the first support 111 as well as inner surfaces of the plurality of through-holes 110a in the flow path 123b such that filtration efficiency of the filtration member 110" may be improved.

Further, as shown in FIGS. 4 and 5, the nanofiber web 112 may be removed from a portion of both side surfaces of the filtration member 110".

Consequently, the filtered water may flow through the exposed surfaces on both of the sides of the filtration member 110" in addition to the upper side of the filtration member 110" and the inner surfaces of the plurality of through-holes 110a such that the filtration efficiency of the filtration member 110" may be further improved as compared with FIG. 5 or 6.

Alternatively, a plurality of semicircular groove portions 110b may be formed on one surface of a filtration member 110'''. In this case, the nanofiber web 112 may not be removed from both sides of the filtration member 110'''.

That is, as shown in FIG. 7, in a state in which the nanofiber web 112 is not removed from the filtration member 110''', the plurality of semicircular groove portions 110b may be formed at an upper surface of the filtration member 110''', and then the filtration member 110''' may be inserted into the frames 120a" and 120b" provided with the confinement member 124a formed to protrude from the first plate 121 at the upper side of the flow path 123b.

In this case, since the nanofiber web 112 is not removed from both of the sides of the filtration member 110''' and thus a passage through which the filtered water may flow is limited to the exposed surface 111a on the upper side of the filtration member 110", the plurality of semicircular groove portions 110b are formed such that an area of the passage may be increased.

Consequently, the filtered water may flow through the exposed surface 111a on an upper side of the first support 111 as well as inner surfaces of the plurality of semicircular groove portions 110b in the flow path 123b such that filtration efficiency of the filtration member 110''' may be improved.

Alternatively, as shown in FIGS. 4 and 5, the nanofiber web 112 may be removed from a portion of both side surfaces of the filtration member 110".

Consequently, the filtered water may flow through the exposed surfaces on both of the sides of the filtration member 110''' in addition to the upper side of the filtration member 110''' and the inner surfaces of the plurality of semicircular groove portions 110b such that the filtration efficiency of the filtration member 110''' may be further improved as compared with FIG. 5 or 7.

Meanwhile, the support frame 120 may be fixed to the edge of the filtration member 110 via an adhesive member A.

In this case, an accommodation space forming part may be provided at the support frame 120 of the flat-plate filter 100 for water treatment according to the first embodiment of the present invention, thereby increasing a bonding force between the filtration member 110 and the support frame 120 to enhance structural stiffness.

That is, an accommodation space 127 for accommodating the adhesive member A is provided at the support frame 120 through the accommodation space forming part such that a sufficient amount of the adhesive member A may be interposed between the support frame 120 and the filtration member 110.

Consequently, the flat-plate filter 100 for water treatment according to the first embodiment of the present invention is configured to extend a bonding area between the adhesive member A accommodated in the accommodation space 127, the filtration member 110, and the support frame 120 such that the bonding force may be enhanced and tightness may be improved.

Accordingly, during a back-washing process for removing foreign materials present on the filtration member 110, even though a fluid such as high-pressure washing water is supplied to the filtration member 110 from the outside, it is possible to prevent the support frame 120 coupled to the edge of the filtration member 110 from being separated or released from the filtration member 110.

Further, during the back-washing process, it is possible to supply a fluid such as higher pressure washing water due to an enhanced bonding force between the filtration member 110 and the support frame 120 such that foreign materials attached to the filtration member 110 may be removed more quickly and completely to prevent degradation of filtration efficiency and improve a production yield.

For example, the accommodation space 127 for accommodating the adhesive member A may be formed through a protrusion 125 formed to protrude from the inner surface of each of the frames 120a and 120b constituting the support frame 120 in the length direction.

That is, as shown in FIG. 3, the protrusion 125 may be formed to be located between the flow path 123 and end portions of the second plates 122a and 122b constituting the frames 120a and 120b to protrude inward from the inner surface of each of the second plates 122a and 122b to a predetermined height in the length directions of the frames 120a and 120b.

Consequently, when the edge of the filtration member 110 is inserted between the pair of second plates 122a and 122b facing each other, one surface of the filtration member 110 is brought into line contact with an end portion of the protrusion 125, and a clearance space corresponding to the height of the protrusion 125 is formed on the inner surface of each of the second plates 122a and 122b such that the accommodation space 127 capable of accommodating the adhesive member A may be formed.

In this case, the protrusion 125 formed to protrude in the length directions of the frames 120a and 120b is brought into line contact with one surface of the filtration member 110, thereby simultaneously serving to support the filtration member 110 and block the adhesive member A supplied from the outside from moving to the flow path 123.

Here, a formation position of the protrusion 125 may be appropriately changed as long as it is located between the flow path 123 and the end portions of the second plates 122a and 122b. When the protrusions 125 are relatively closer in distance than the end portions of the second plates 122a and 122b, an amount of the adhesive member A accommodated in accommodation space 127 is increased such that adhesive strength may be further enhanced.

Meanwhile, a plurality of protrusions may be provided on the inner surfaces of the second plates 122a and 122b, and the plurality of protrusions may be disposed to be spaced apart from each other in parallel in the length directions of the frames 120a and 120b.

In this case, the plurality of protrusions may be formed to have different heights and a protruding height may become larger from the end portions of the second plates 122a and 122b toward the flow path 123.

Consequently, a protrusion among the plurality of protrusions formed at a position closest to the flow path 123 is formed to have a largest protrusion height, thereby being brought into contact with one surface of the filtration member 110 when the filtration member 110 is inserted. The remaining protrusions are buried by the adhesive member A accommodated in the accommodation space 127 without being brought into contact with one surface of the filtration member 110.

Therefore, the remaining protrusions are integrated with the adhesive member A, thereby more effectively preventing the frames 120a and 120b from being released from the edge of the filtration member 110.

Alternatively, the accommodation space 127 for accommodating the adhesive member A may be formed on the inner surface of each of the frames 120a', 120b', 120a", and 120b" constituting the support frame 120 through a step surface 126 formed by incising the inner surface in the length direction.

That is, as shown in FIGS. 4 to 7, the step surfaces 126 may be formed on inner surfaces of the end portions of the second plates 122a and 122b constituting the frame 120a', 120b', 120a", or 120b" in the length direction of the frame 120a', 120b', 120a", or 120b".

Consequently, when the edge of the filtration member 110', 110", or 110'" is inserted between the pair of second plates 122a and 122b facing each other, one surface of the filtration member 110', 110", or 110'" is brought into surface contact with a portion, except for the step surface 126, on one surface of each of the pair of second plates 122a and 122b, and a clearance space corresponding to a depth of the step surface 126 is formed on the inner surface of each of the pair of second plates 122a and 122b such that the accommodation space 127 capable of accommodating the adhesive member A may be formed.

In this case, in the frame 120a', 120b', 120a", or 120b", a plurality of step surfaces may be formed the inner surfaces of the second plates 122a and 122b, the plurality of step surfaces may be formed to have different heights in multiple stages connected to each other, and the depths of the plurality of step surfaces may be formed to be smaller from the end portions of the second plates 122a and 122b toward the flow path 123.

Consequently, a step surface among the plurality of step surfaces formed at a position closest to the flow path 123 may be formed to have a smallest depth, and a step surface thereamong formed at a position closest to the end portion of the second plate 122a or 122b may be formed to have a largest depth. Therefore, when the adhesive member A is injected into the accommodation space 127, the adhesive member A may smoothly flow into the accommodation space 127.

Meanwhile, the flat-plate filter 100 for water treatment according to the first embodiment of the present invention may include connecting members 130 and 130' coupled to corners of the support frame 120.

A plurality of connecting members 130 and 130' may be provided and coupled to the corners of the support frame 120, thereby fixing end portions of two adjacent frames 120a and 120b.

Figure 8:
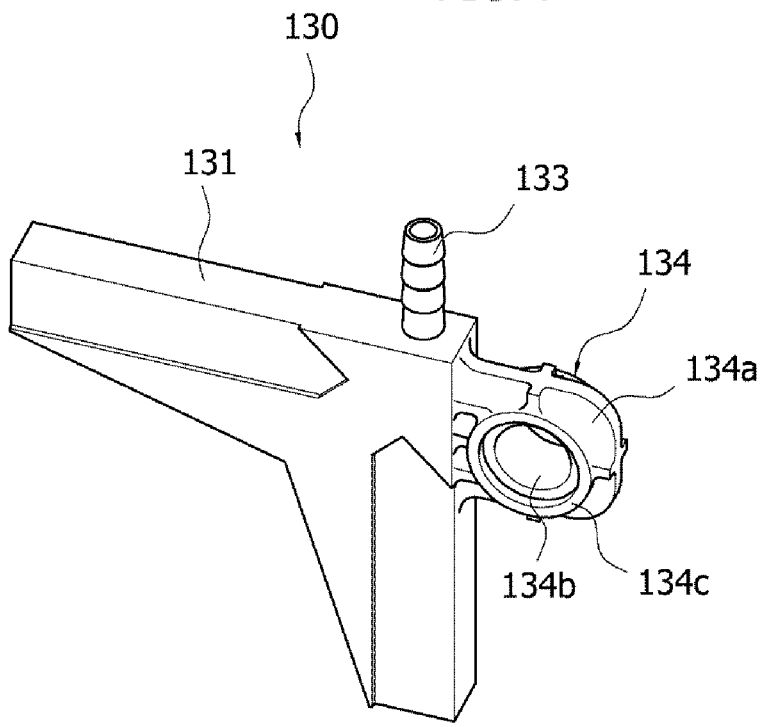
FIG. 8 is a diagram illustrating a connecting member applied to the flat-plate filter for water treatment according to the first embodiment of the present invention.
Figure 9:
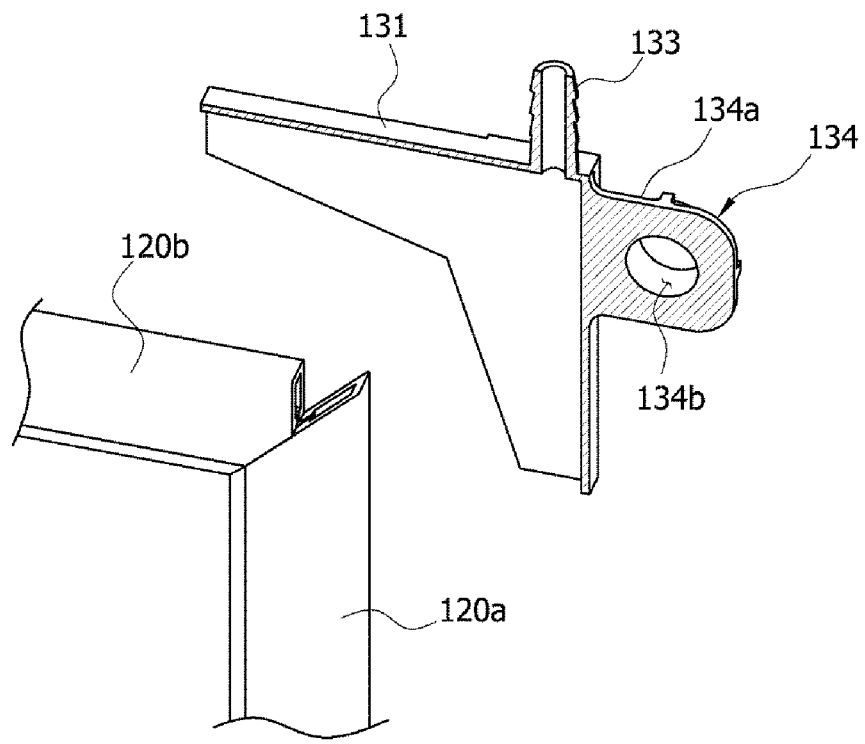
FIG. 9 is a diagram illustrating a separated state of the connecting member and the support frame which are applied to the flat-plate filter for water treatment according to the first embodiment of the present invention.
Figure 10:
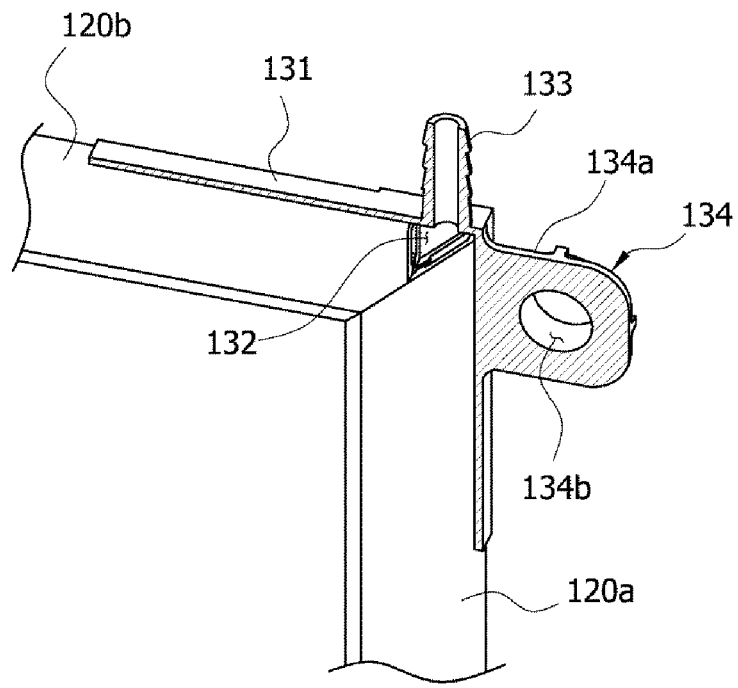
FIG. 10 is a diagram illustrating a coupled state of the connecting member and the support frame which are applied to the flat-plate filter for water treatment according to the first embodiment of the present invention.

To this end, the connecting members 130 and 130' may each include a body 131 having one opened side so as to allow the end portions of the two adjacent frames 120a and 120b to be inserted (see FIGS. 8 to 10).

Consequently, the two adjacent frames 120a and 120b among the plurality of frames 120a and 120b constituting the support frame 120 may be fixed by the body 131 by inserting the end portions of the two adjacent frames 120a and 120b into the body 131.

For example, the end portion of the frame 120a of the two adjacent frames 120a and 120b is inserted in a first direction of the body 131, and the end portion of the frame 120b thereof is inserted in a second direction of the body 131 such that the end portion of the frame 120b may be disposed to be brought into contact with the end portion of the frame 120a inserted in the first direction (see FIG. 10).

In this case, a flow path 123 formed at the frame 120a inserted in the first direction and a flow path 123 formed at the frame 120b inserted in the second direction are disposed to communicate with each other such that flow paths formed at the frames 120a and 120b may communicate with each other.

Here, the first direction and the second direction may be directions perpendicular to each other on the same plane or may be inclined directions having a predetermined angle with respect to one straight line on the same plane.

Meanwhile, when a plurality of filters are disposed in parallel, a gap adjuster 134 may be provided at the flat-plate filter 100 for water treatment according to the first embodiment of the present invention to allow filtration members 110 to be disposed and spaced a gap from each other.

The gap adjuster 134 may be provided on at least one of a plurality of frames 120a and 120b constituting the support frame 120. Alternatively, the gap adjuster 134 may be on at least one of the connecting members 130 and 130'.

For example, the gap adjuster 134 may include an extension plate 134a, which has an engagement hole 134b, and a spacing member 134c and may be formed on one side of each of the connecting members 130 and 130'.

In particular, the extension plate 134a may extend outward from the body 131 of each of the connecting members 130 and 130', and the engagement hole 134b through which an engagement bar 640 passes may be formed to pass through the extension plate 134a (see FIG. 8).

In the drawing, the engagement hole 134b has been illustrated as being formed to pass through the extension plate 134a in a circular shape, but the present invention is not limited thereto, and the engagement hole 134b may have a shape corresponding to a cross-sectional shape of the engagement bar 640. For example, the engagement hole 134b may be formed in a circular shape, an arc shape, a polygonal cross section shape, or a combination thereof.

In this case, the spacing member 134c may protrude to a predetermined height from one surface of the extension plate 134a to have a predetermined thickness or may be provided to entirely or partially surround an edge of the engagement hole 134b.

Here, the spacing member 134c may be formed on both surfaces of the extension plate 134a, may be formed on only one surface of the extension plate 134a, or may be formed in a multi-stage structure having different heights from one surface of the extension plate 134a.

Here, a gap between the plurality of filtration members 110 disposed in parallel may be 3 mm or more, but the present invention is not limited thereto, and the plurality of filtration members 110 may be disposed to have various gaps by appropriately adjusting a height or a thickness of the spacing member 134c.

Consequently, when the plurality of flat-plate filters 100 are connected through the engagement bar 640, even though the flat-plate filters 100 are brought into close contact with each other, the filtration members 110 disposed in parallel may be spaced by a gap from each other through the spacing member 134c.

Figure 47:
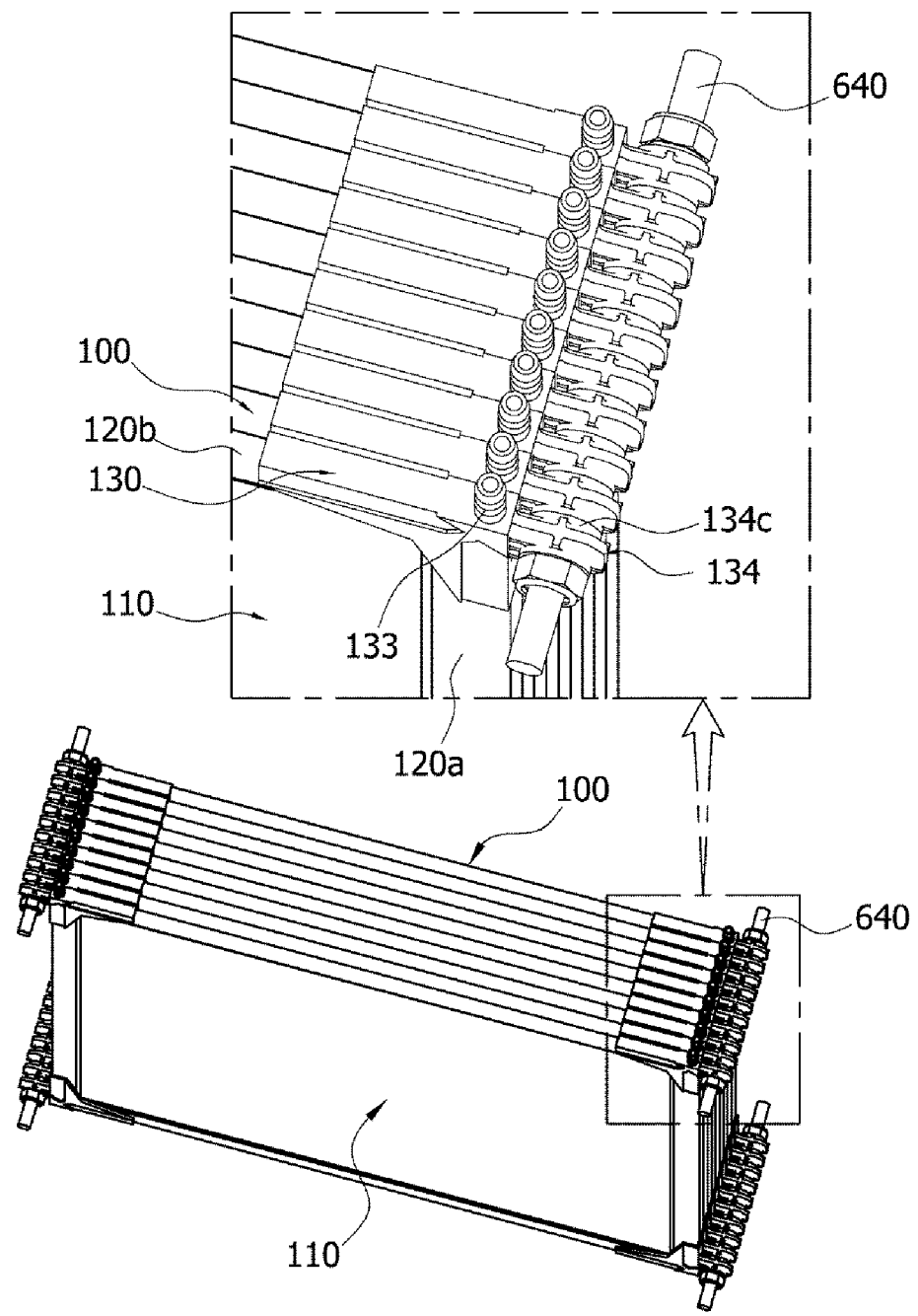
FIG. 47 is a diagram illustrating a state in which a fixing frame is removed from FIG. 46.

Thus, when the plurality of flat-plate filters 100 are disposed in parallel, when the engagement bar 640 is engaged to pass through the engagement holes 134b, and then when the plurality of flat-plate filters 100 are brought in close contact with each other, adjacently disposed filtration members 110 may be spaced a predetermined gap from each other through the spacing member 134c (see FIG. 47).

That is, when a flat-plate filter module 600 is constituted using the plurality of flat-plate filters 100 and the plurality of flat-plate filters 100 connected to the engagement bar 640 are brought into close contact with each other, a uniform gap may be formed between the filtration members 110 by the spacing member 134c even when an operator does not manually adjust a gap between the plurality of flat-plate filters 100. When a fixing member such as a nut is engaged with both sides of the engagement bar 640, the gap formed between the plurality of filtration members 110 may be maintained.

Consequently, since a target filtration liquid may be present on both sides of each of the plurality of filtration members 110 in the flat-plate filter module 600, the target filtration liquid may flow from both of the sides of each of the plurality of filtration members 110 toward an interior of each thereof due to an externally provided suction force to produce filtered water.

Further, when a back-washing process is performed to remove foreign materials adhering to each of the plurality of filtration members 110 after the production process of the filtered water is repeatedly performed, the foreign materials adhering to each of the plurality of filtration members 110 may be separated therefrom due to a pressure of a fluid such as washing water supplied from the outside to be dropped into a space between adjacent filtration members 110.

A water receiving hole 133 for discharging the filtered, water which is moved along the flow paths 123 formed at the frames 120a and 120b, to the outside may be provided in at least one of the connecting members 130 and 130' (see FIG. 8).

That is, the connecting member 130' in which the water receiving hole 133 is not formed among the plurality of connecting members 130 and 130' coupled to the corners of the support frame 120 may only serve to connect a pair of adjacent frames, whereas the connecting member 130 in which the water receiving hole 133 is formed may also serve as a drain for discharging the filtered water produced through the water receiving hole 133 to the outside in addition to serving to connect the pair of adjacent frames.

Here, the water receiving hole 133 may be provided at any one of the plurality of connecting members, but it is preferable that the water receiving hole 133 is provided at each of the plurality of connecting members 130 to provide a uniform suction pressure to each of the plurality of filtration members 110.

Further, the water receiving hole 133 may be integrally formed with the body 131 of the connecting member 130 (see FIG. 8). Alternatively, a coupling hole 131a may be formed in the body 131 of the connecting member 130, and a water receiving hole 133 having a predetermined length may be detachably coupled to the coupling hole 131a (see FIG. 12).

In this case, when the connecting member 130 having the water receiving hole 133 is coupled to two adjacent frames 120a and 120b, a collecting space 132 communicating with flow paths 123 formed at the two adjacent frames 120a and 120b may formed at the connecting member 130. The collecting space 132 may be formed at a position communicating with the water receiving hole 133.

For example, when the connecting member 130 having the water receiving hole 133 is coupled to the two adjacent frames 120a and 120b, the collecting space 132 may be formed at end portions of the two adjacent frames 120a and 120b inserted into the connecting member 130. Alternatively, the collecting space 132 may be formed by incising one end portion of the two adjacent frames 120a and 120b inserted into the connecting member 130 and preventing a shape combination of the two adjacent frames 120a and 120b (see FIG. 10).

Figure 11:
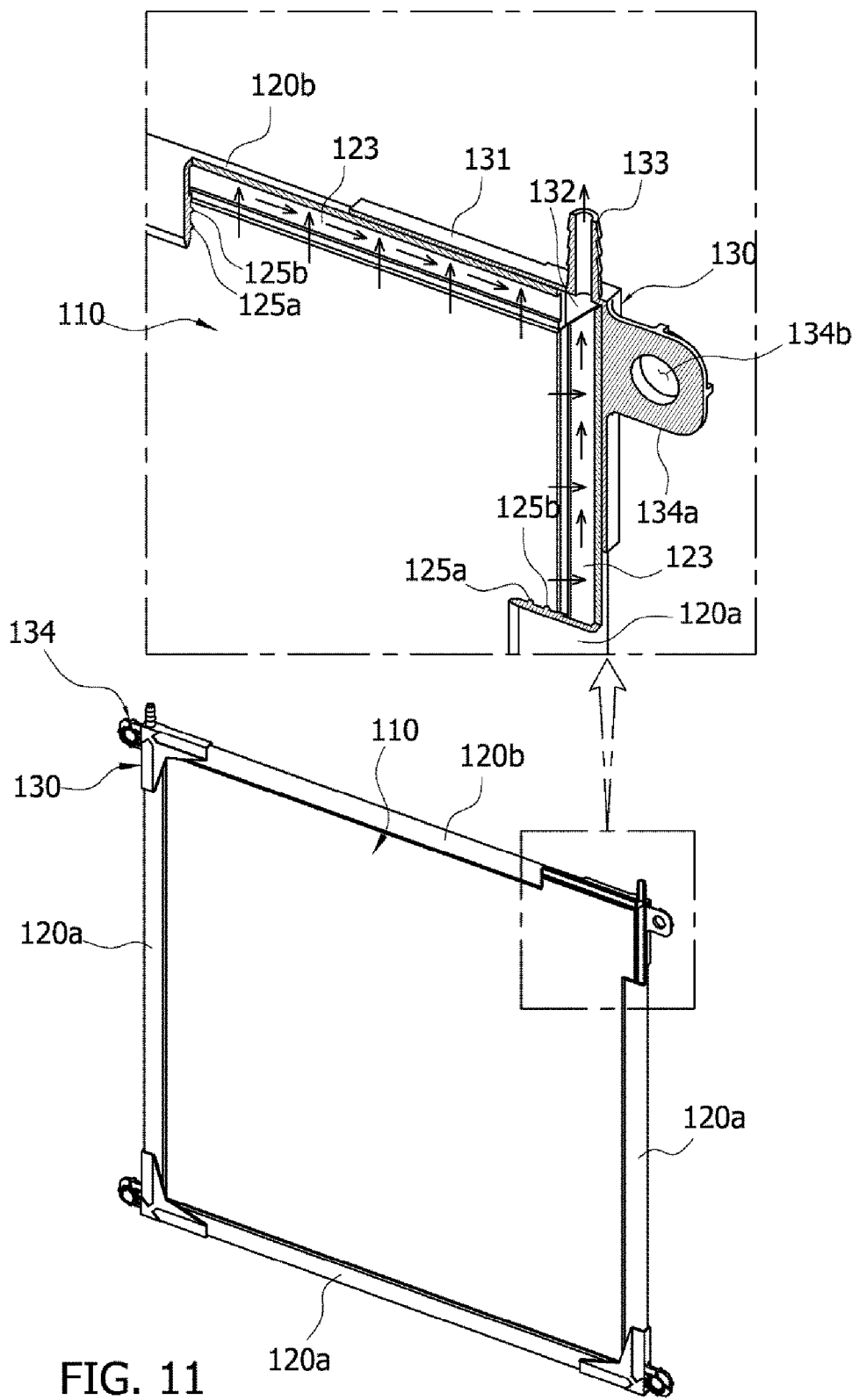
FIG. 11 is a diagram illustrating a flow route of filtered water flowing into a water receiving hole in the flat-plate filter for water treatment according to the first embodiment of the present invention.

Consequently, filtered water flowing along the flow path 123 formed at one frame of the two adjacent frames 120a and 120b and filtered water flowing along the flow path 123 formed at the other frame thereof 120a and 120b may meet in the collecting space 132 and may be discharged to the outside through the water receiving hole 133 communicating with the collecting space 132 (see FIG. 11).

Therefore, the filtered water, which flows in the filtration member 110 by a suction force provided from a pump (not shown) and from which foreign materials are filtered may flow into the flow paths 123 formed at the plurality of frames 120a and 120b, may move to the collecting space 132 along the flow paths 123 and then may be discharged to the outside through the water receiving hole 133.

Contrarily, during a back-washing process, a fluid such as washing water provided from the outside may flow in through the water receiving hole 133, may pass through the collecting space 132, and then may be supplied to the flow path 123 formed at each of the plurality of frames 120a and 120b.

A flat-plate filter for water treatment according to a second embodiment of the present invention may be equal or similar to the above-described flat-plate filter 100 for water treatment according to the first embodiment of the present invention except for the support frame 220 and the connecting member 230.

Here, technical features identical to those of the flat-plate filter 100 for water treatment according to the first embodiment of the present invention will be omitted, and the technical features not mentioned with respect to the flat-plate filter for water treatment according to the second embodiment of the present invention will be understood to be equal to the corresponding components of the flat-plate filter 100 for water treatment according to the first embodiment.

The flat-plate filter for water treatment according to the second embodiment of the present invention includes a filtration member 210, a support frame 220, and a connecting member 230. Here, the filtration member 210 may be identical or similar to the filtration member 110 of FIG. 1.

Figure 13:
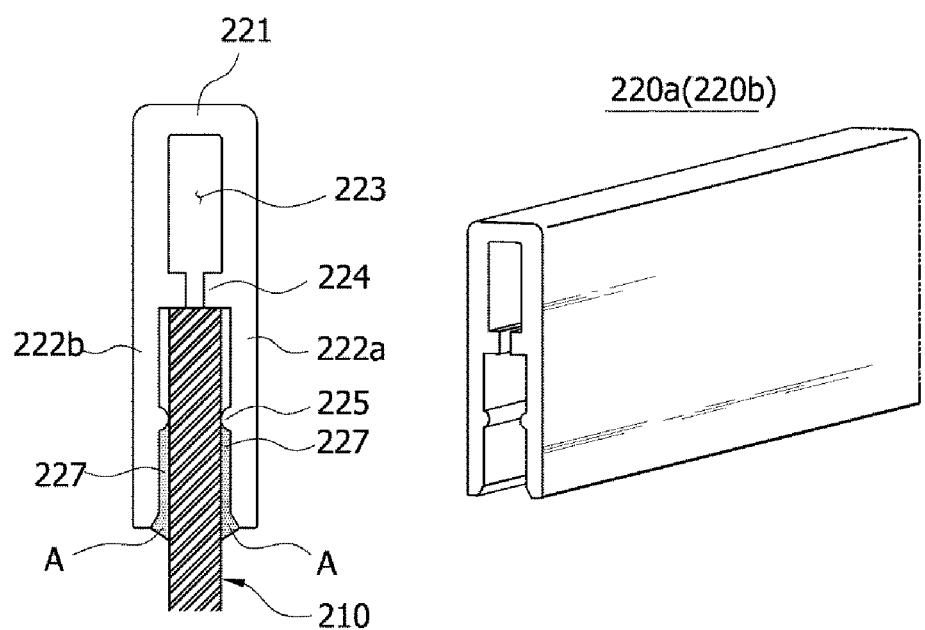
FIGS. 13 to 14 are cross-sectional views and partial perspective views illustrating various forms of a support frame and a filtration member which are applied to a flat-plate filter for water treatment according to a second embodiment of the present invention.
Figure 14:
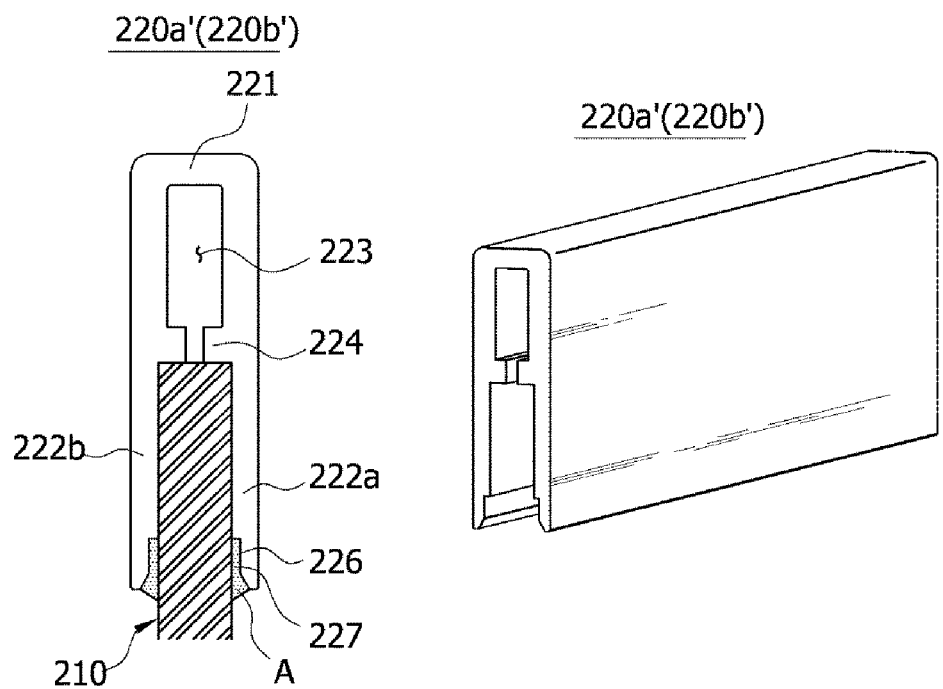

As shown in FIGS. 13 and 14, the support frame 220 is fitted in and coupled to an edge of the filtration member 210 formed in a plate shape to support the edge thereof such that the filtration member 210 may be maintained in the plate shape.

The support frame 220 includes a plurality of frames 220a and 220b coupled to the edge of the filtration member 210.

In this case, the support frame 220 may serve to support the filtration member 210 in a form of a plate shape as well as serve as a flow route for allowing filtered water produced by the nanofiber web 212 of the filtration member 210 to flow to a water receiving hole 233 through an externally provided suction force.

To this end, each of the frames 220a and 220b constituting the support frame 220 may be provided in a substantially reclined U shape having one opened side, and a flow path 223 through which the filtered water flowing from the filtration member 210 moves is formed inside each of the frames 120a and 120b (see FIG. 13).

More specifically, the plurality of frames 220a and 220b may include a plate-shaped first plate 221 and a pair of second plates 222a and 222b extending from the first plate 221 in a direction perpendicular to the first plate 221 (see FIGS. 13 to 16).

Consequently, the edge of the filtration member 210 may be inserted into a space formed between the pair of second plates 222a and 222b, thereby being supported on the pair of second plates 222a and 222b facing each other.

That is, a confinement member 224 for limiting an insertion depth of the filtration member 210 may be provided on surfaces of the pair of facing second plates 222a and 222b which face each other (see FIGS. 13 and 14).

Consequently, the insertion depth of the filtration member 210 is limited through the confinement member 224 while the edge of the filtration member 210 is engaged with each of the frames 220a and 220b such that a predetermined space may be formed between an end portion of the edge of the filtration member 210 and the first plate 221.

Accordingly, when the filtration member 210 is coupled to the frames 220a and 220b, the edge of the filtration member 210 is always maintained in a state of being spaced apart from the first plate 221 such that the flow path 223 through which a fluid such as filtered water or washing water may move may be formed.

In the present embodiment, the confinement member 224 may be formed on each of surfaces facing each other of a pair of second plates 222a and 222b facing each other. Alternatively, the confinement member 224 may be formed only on an inner surface of one of the pair of second plates 222a and 222b. Further, the confinement member 224 may be entirely or partially provided in the length direction of each frame. When the confinement members 224 are each formed on the surfaces facing each other of the pair of facing second plates 222a and 222b, the confinement members 224 are disposed to be spaced a predetermined gap from each other such that filtered water may flow to the flow path 223 through the predetermined gap.

Figure 15:
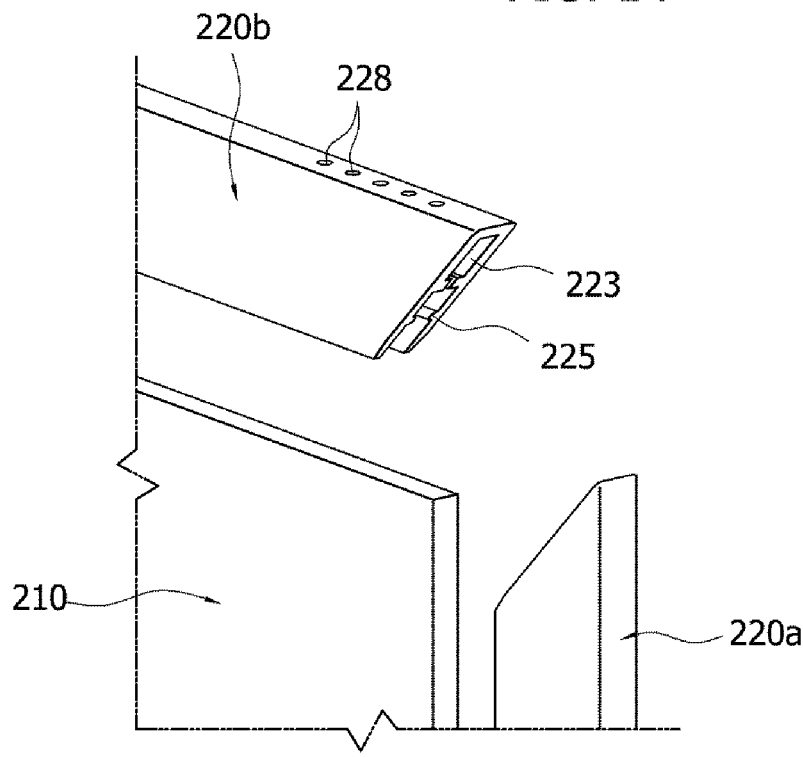
FIG. 15 is a partially exploded view of a plurality of frames and the filtration member which are applied to the flat-plate filter for water treatment according to the second embodiment of the present invention.
Figure 16:
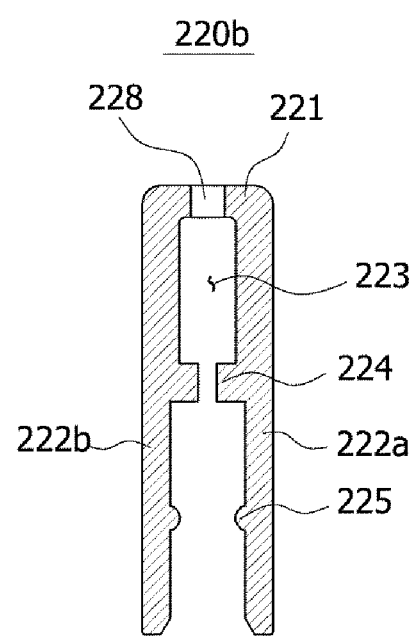
FIG. 16 is a cross-sectional view of a frame at a portion at which a through-hole is formed in FIG. 15.
Figure 17:
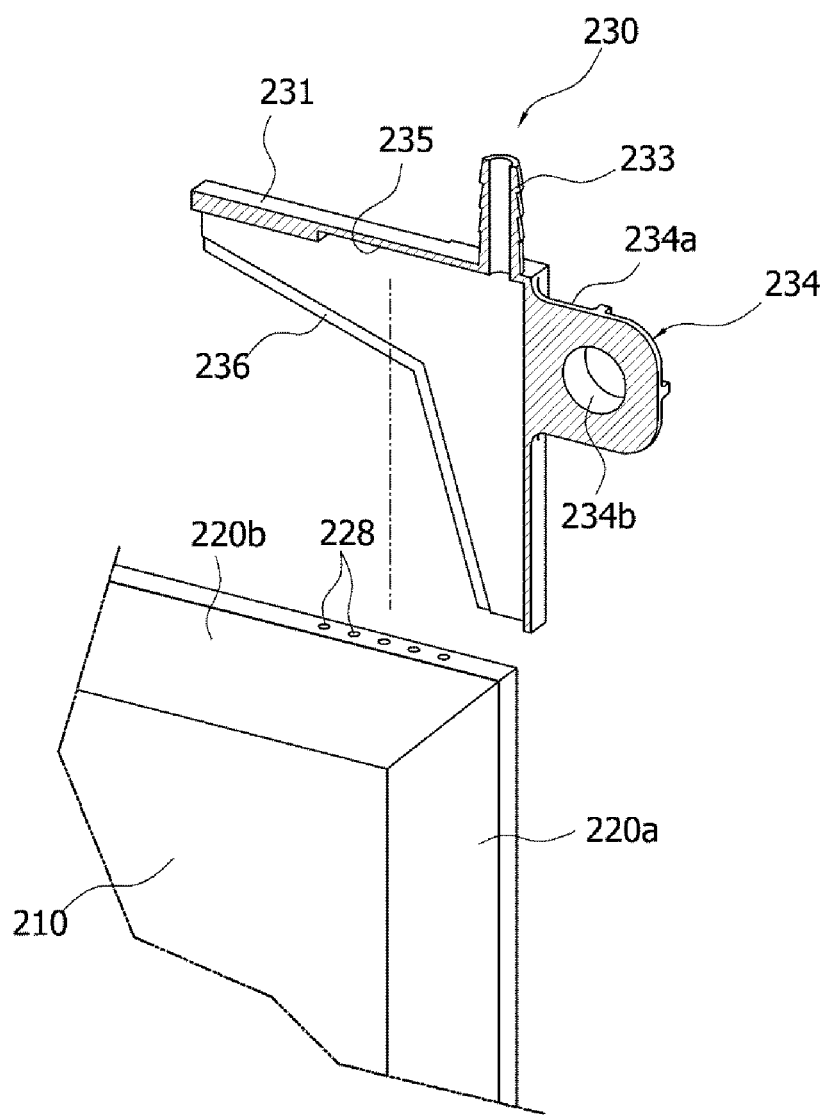
FIG. 17 is a diagram illustrating a separated state of a connecting member and the support frame which are applied to the flat-plate filter for water treatment according to the second embodiment of the present invention.

In this case, both end portions of the frames 220a and 220b are cut obliquely, and when the frames 220a and 220b are coupled, the obliquely cut surfaces are brought into contact with each other (see FIGS. 15 and 17). Here, the plurality of frames may be equally cut in oblique lines at approximately 45 degrees, but the present invention is not limited thereto, and the plurality of frames may be cut in oblique lines at different angles.

Consequently, In the flat-plate filter for water treatment according to the second embodiment of the present invention, since the plurality of frames 220a and 220b are processed in the same shape, the plurality of frames 220a and 220b may be manufactured by the same process such that an assembly process of the plurality of frames 220a and 220b may be improved to enhance productivity.

Further, since end portions of two coupled frames 220a and 220b are cut into oblique lines to be brought into contact with each other across the end portions, a bonding area between the two frames 220a and 220b substantially extend and thus a bonding force is increased as compared with a related art such that a supporting force against the filtration member 210 may be increased.

Figure 18:
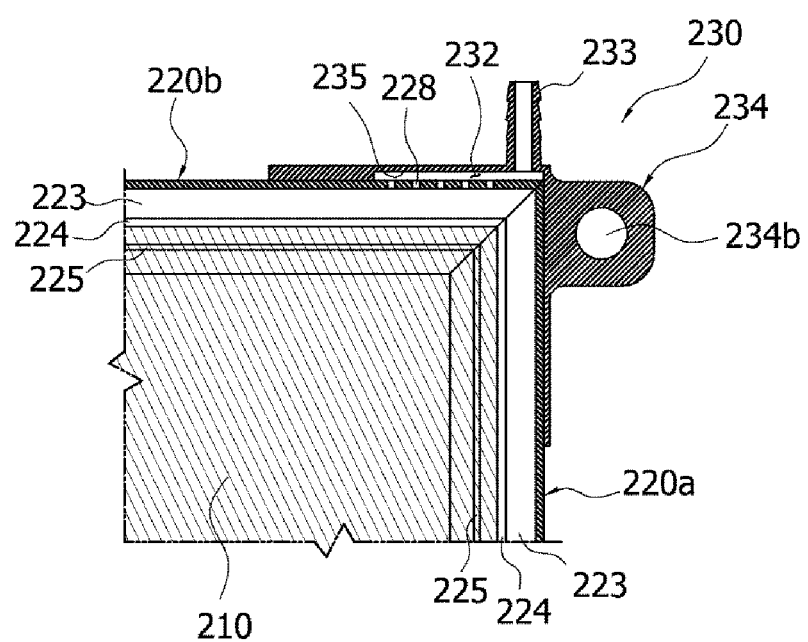
FIG. 18 is a diagram illustrating a coupled state of the connecting member and the support frame which are applied to the flat-plate filter for water treatment according to the second embodiment of the present invention.

Thus, since the plurality of frames 220a and 220b are bonded over an entire area of both end portions of each of the plurality of frames 220a and 220b without the need for an intermediate space as in the related art, flow paths 223 may directly communicate with each other (FIG. 18).

In this case, the flow paths 223 of the frames 220a and 220b directly communicate with each other. However, since the flow path 223 forms a closed loop in a form isolated from the outside, a structure of the support frame 220 is changed into a structure of discharging filtered water produced by the filtration member 210 to the outside. That is, the flow path 223 of the first frame 220b disposed adjacent to a water receiving hole 233 of a connecting member 230 communicates with the water receiving hole 233.

For example, at least one through-hole 228 may be formed at a portion of a surface of the first frame 220b facing the water receiving hole 233. That is, the through-hole 228 may be formed at a first plate 221 of the first frame 220b (see FIG. 16).

Here, the through-hole 228 may be formed in the vicinity of a corner of the support frame 220 so as to be close to the water receiving hole 233. In this case, when a plurality of through-holes 228 are provided, one through-hole 228 may be formed at a position close to the water receiving hole 233, and the remaining through-holes 228 may be formed toward a center of the first frame 220b at regular intervals.

Consequently, since the flow path 223 constituting a closed loop communicates with the water receiving hole 233, filtered water which flows in the filtration member 210 by a suction force provided from a pump (not shown) and from which foreign materials are filtered may flow into the flow paths 223 formed at the plurality of frames 220a and 220b, may move to the through-holes 228 of the first frame 220b along the flow paths 223, and then may be discharged to the outside through the water receiving hole 233.

Further, during a back-washing process, after a fluid such as washing water provided from the outside may flow in the water receiving hole 233, the fluid may first flow to the flow path 223 of the first frame 220b through the through-holes 228 and then may be supplied along the flow paths 223 formed at the frames 220a and 220b.

A plurality of connecting members 230 may be provided and coupled to corners of the support frame 220. The connecting member 230 may fix end portions of two adjacent frames 220a and 220b.

To this end, the connecting member 230 may include a body 231 having one opened side so as to allow the end portions of the two adjacent frames 220a and 120b to be inserted (see FIGS. 17 to 20).

In this case, a passage 232 through which the filtered water flows may be formed between the water receiving hole 233 of the connecting member 230 and the through-holes 228 of the first frame 220b. That is, the passage 232 may be formed between an inner surface of the connecting member 230 and the first plate 221 of the first frame 220b.

For example, the passage 232 may be formed by a step surface 235 formed by being incised on the inner surface of the connecting member 230 facing the through-holes 228. That is, as shown in FIG. 17, the step surface 235 may be formed on the inner surface of the connecting member 230 facing the first frame 220b, and the step surface 235 may be formed to communicate with both of at least one through hole 228 and the water receiving hole 233.

Therefore, the filtered water which flows in the filtration member 210 by a suction force provided from a pump (not shown) and from which foreign materials are filtered may flow into the flow paths 223 formed at the plurality of frames 220a and 220b, may move to the passage 232 along the flow paths 223, and then may be discharged to the outside through the water receiving hole 233.

Contrarily, during a back-washing process, after a fluid such as washing water provided from the outside may flow in through the water receiving hole 233, the fluid may flow to the flow path 223 of the first frame 220b via the passage 232 and then may be supplied along the flow path 223 formed at each of the plurality of frames 220a.

Here, the water receiving hole 233 of the connecting member 230 may be disposed at a center of a region in which the through-holes 228 are formed.

For example, when only a single through-hole 228 is formed in the first plate 221 of the first frame 220b, the water receiving hole 233 of the connecting member 230 may be substantially disposed on a straight line with the single through-hole 228. In this case, when an inner diameter of the single through-hole 228 is smaller than that of the water receiving hole 233, the passage 232 may not be separately provided.

Alternatively, when a plurality of through-holes 228 are formed at the first frame 220b, the water receiving hole 233 of the connecting member 230 may be disposed with the same distance from a through-hole 228 which is disposed at an outermost edge of the plurality of through-holes 228. In this case, the water receiving hole 233 of the connecting member 230 may be substantially disposed at a center of the passage 232.

Consequently, the number of passages through which the filtered water collected through the flow paths 223 of the frames 220a and 220b is discharged to the water receiving hole 233 is increased such that a larger amount of the filtered water may be simultaneously discharged through the water receiving hole 233.

Further, a passage of the filtered water flowing between the through-holes 228 and the water receiving hole 233 is shortened such that the filtered water collected through the flow paths 223 of the frames 220a and 220b may be discharged more efficiently to the outside through the water receiving hole 233.

Meanwhile, the connecting member 230 may be fixed to the plurality of frames 220a and 220b inserted thereinto via an adhesive member B.

In this case, an accommodation space forming part may be provided at the connecting member 230 of the flat-plate filter for water treatment according to the second embodiment of the present invention, thereby increasing a bonding force between the connecting member 230 and each of the frames 220a and 220b to enhance structural stiffness.

Figure 20:
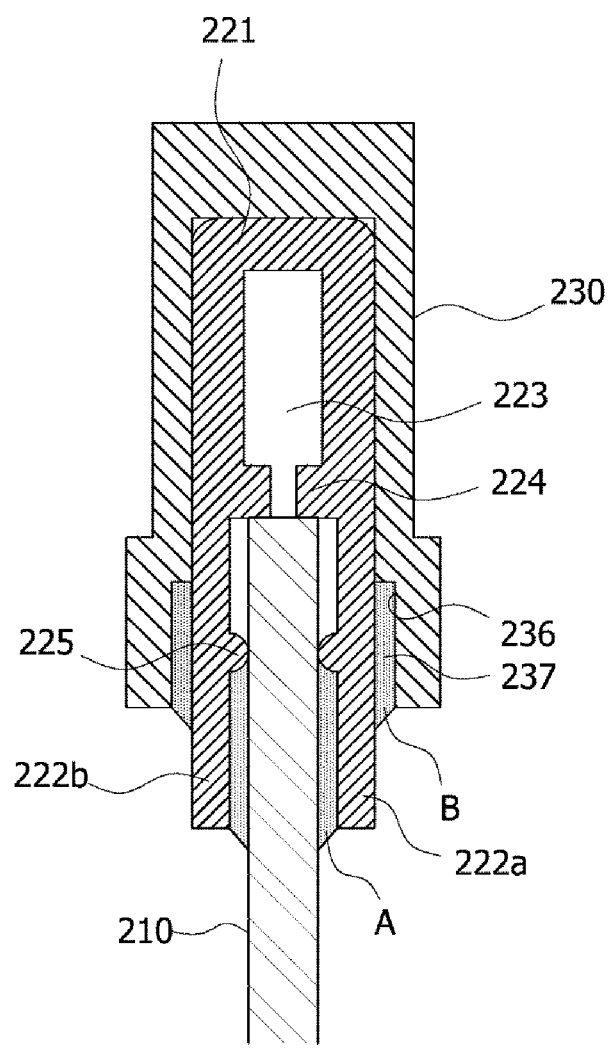
FIG. 20 is a cross-sectional view illustrating a coupled state of the connecting member and the support frame which are applied to the flat-plate filter for water treatment according to the second embodiment of the present invention.

That is, an accommodation space 237 for accommodating the adhesive member B is provided at the connecting member 230 through the accommodation space forming part such that a sufficient amount of the adhesive member B may be interposed between the connecting member 230 and each of the frames 220a and 220b (see FIG. 20).

Consequently, the flat-plate filter for water treatment according to the second embodiment of the present invention is configured to extend a bonding area between the adhesive member B accommodated in the accommodation space 237, the frames 220a and 220b, and the connecting member 230 such that a bonding force may be enhanced and tightness may be improved.

Further, when the connecting member 230 is coupled to the frames 220a and 220b by the accommodation space forming part, a separated space is formed between the connecting member 230 and the frames 220a and 220b such that the connecting member 230 may be easily coupled to the frames 220a and 220b to improve engageability.

For example, the accommodation space 237 for accommodating the adhesive member B may be formed through a step surface 236 formed by being incised along an open end and on an inner surface of the open end of the connecting member 230.

That is, as shown in FIG. 17, the step surface 236 of the connecting member 230 may be formed on the open end, into which the frames 220a and 220b are inserted, over an entire edge of the open end.

Consequently, when the frames 220a and 220b are inserted between the open ends of the connecting member 230 facing each other, one surfaces of the frames 220a and 220b are brought into surface contact with the inner surface of the connecting member 230 except for the step surface 236, and a clearance space corresponding to a depth of the step surface 236 is formed on the inner surface of the open end of the connecting member 230 such that the accommodation space 237 capable of accommodating the adhesive member B may be formed.

Figure 12:
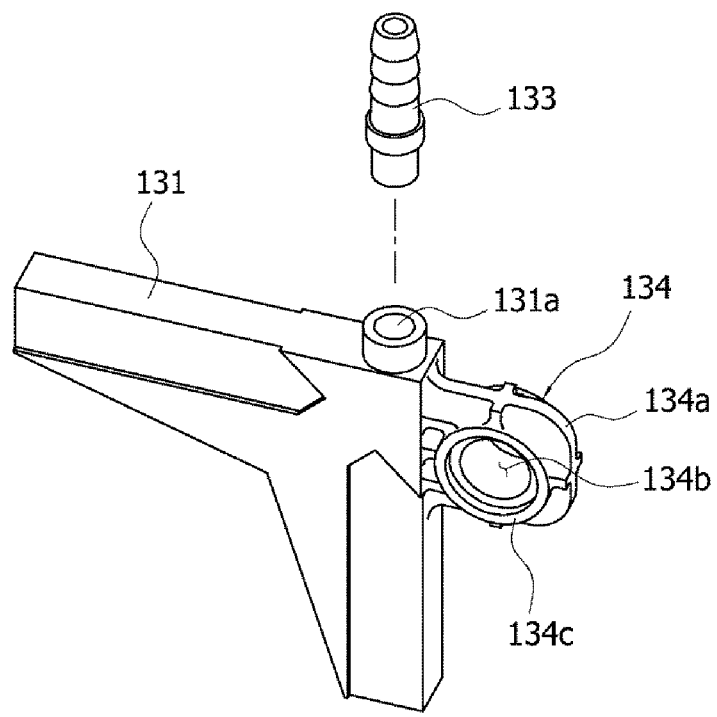
FIG. 12 is a diagram illustrating another form of the water receiving hole applied to the flat-plate filter for water treatment according to the first embodiment of the present invention.

Here, an exterior shape and a function of the connecting member 230 may be identical or similar to those of the connecting member 130 of FIGS. 8 and 12.

A flat-plate filter 300 for water treatment according to a third embodiment of the present invention may be identical or similar to the above-described flat-plate filter 100 for water treatment according to the first and second embodiments of the present invention except for a support frame 320 and a connecting member 330.

Here, technical features identical to those of the flat-plate filter 100 for water treatment according to the first and second embodiments of the present invention will be omitted, and the technical features not mentioned with respect to the flat-plate filter 300 for water treatment according to the third embodiment of the present invention will be understood to be equal to the corresponding components of the flat-plate filter 100 for water treatment according to the first and second embodiments.

Figure 21:
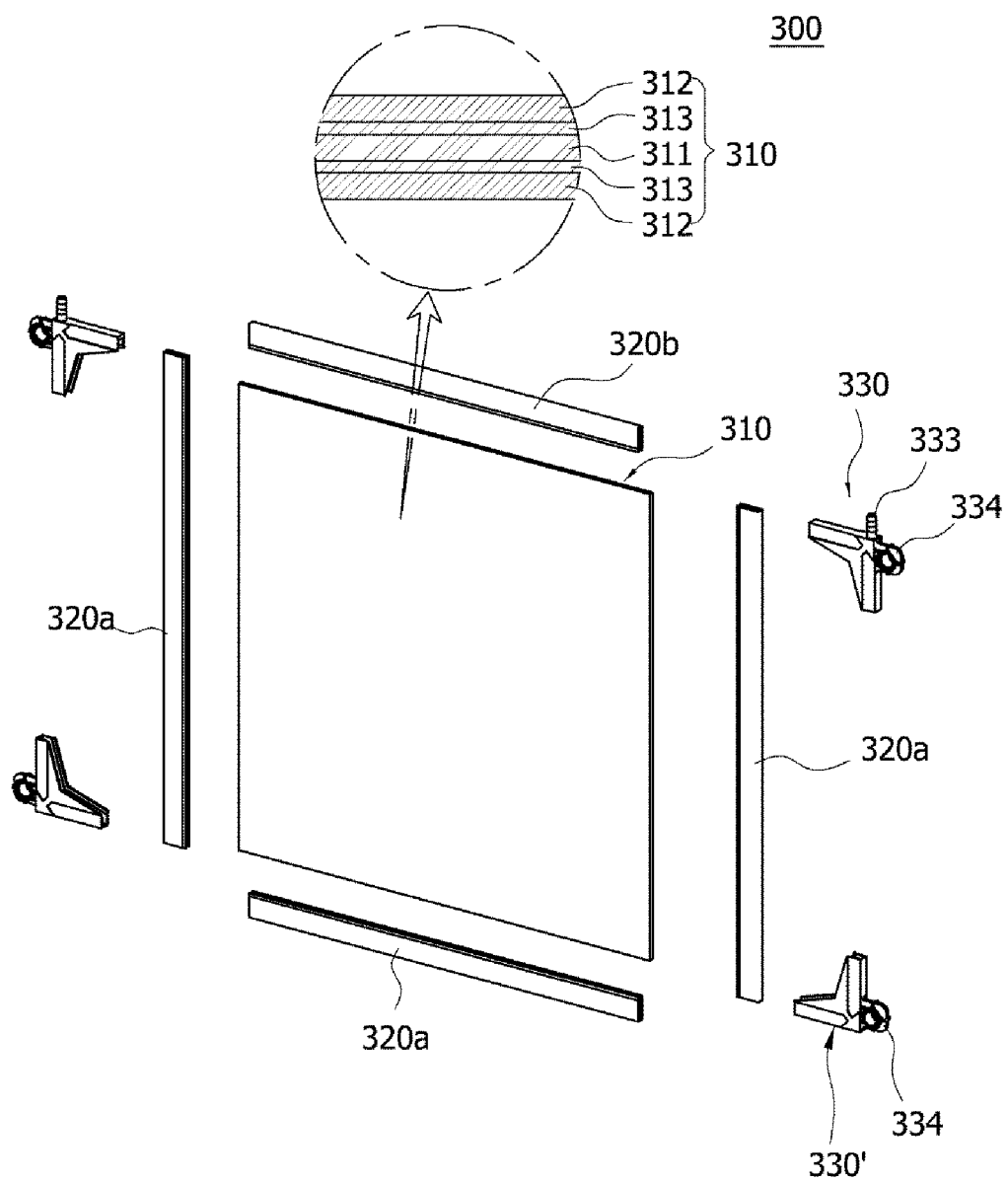
FIG. 21 is an exploded view of a flat-plate filter for water treatment according to a third embodiment of the present invention.

As shown in FIG. 21, the flat-plate filter 300 for water treatment according to the third embodiment of the present invention includes a filtration member 310, a support frame 320, and a connecting member 330. Here, the filtration member 310 may be identical or similar to the filtration member 110 of FIG. 1.

The support frame 320 includes a plurality of frames 320a and 320b coupled to an edge of the filtration member 311. Here, an exterior shape and a function of the support frame 320 may be identical or similar to those of the support frame 220 of FIGS. 13 and 14.

Figure 22:
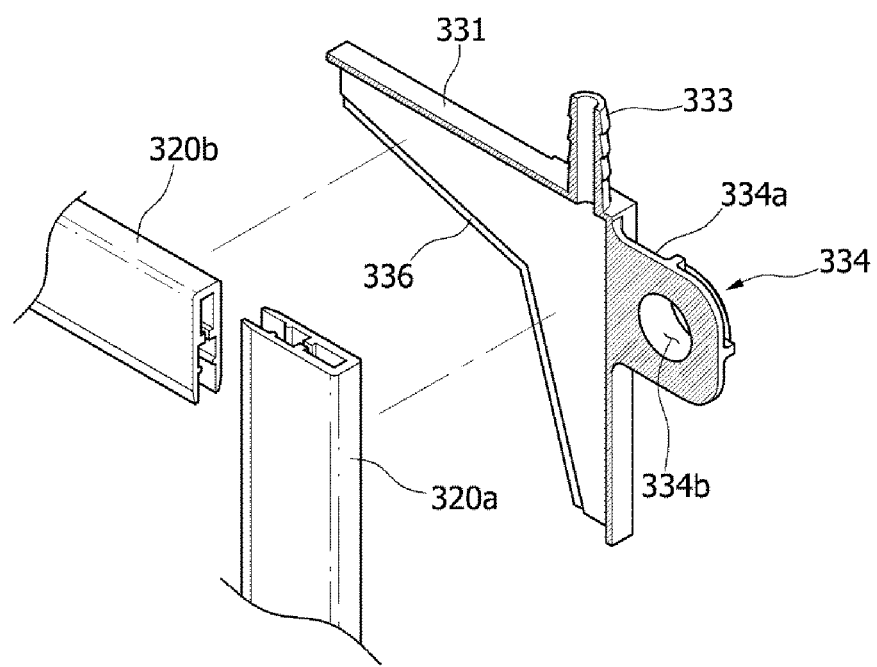
FIG. 22 is a diagram illustrating a separated state of a connecting member and a support frame which are applied to the flat-plate filter for water treatment according to the third embodiment of the present invention.
Figure 23:
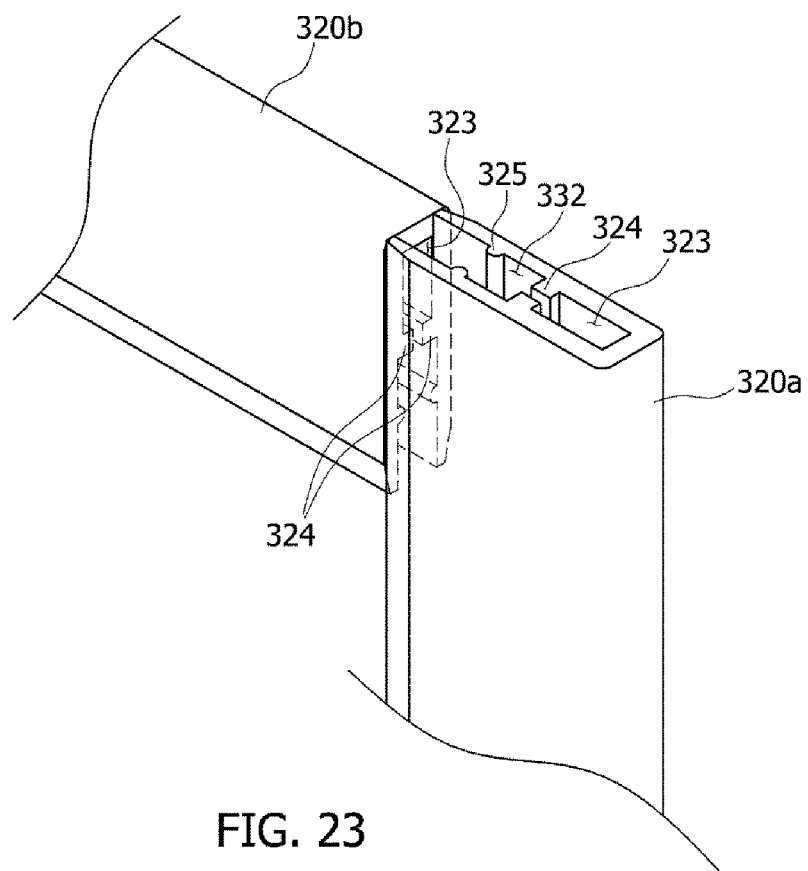
FIG. 23 is an enlarged view illustrating a coupled state of a corner of the support frame applied to the flat-plate filter for water treatment according to the third embodiment of the present invention.

Further, both end portions of the plurality of frames 320a and 320b of the support frame 320 are brought into contact with each other at a right angle (FIGS. 22 and 23).

Here, both cross sections of the frames 320a and 320b may be disposed in different directions. That is, one frame 320b may be horizontally disposed, and the other frame 320a may be vertically disposed.

In this case, flow paths 323 of the plurality of frames 320a and 320b communicate with each other. That is, as shown in FIG. 23, a flow path 323 of one frame 320b may communicate with a flow path 323 of the other frame 320a through a space 332 formed between a confinement member 324 of the other frame 320a and end portions of second plates 321a and 321b.

Here, in a region corresponding to a region between a first plate 321 and the confinement member 324 of the frame 320b among regions in which one frame 320a is brought into contact with the other frame 320b, the filtration member 310 is not inserted into the region due to being blocked by the confinement member 324 of the frame 320b such that the region is an empty state. This region may form the space 332 in which the flow path 323 of the frame 320b communicates with the flow path 323 of the frame 320a.

Figure 24:
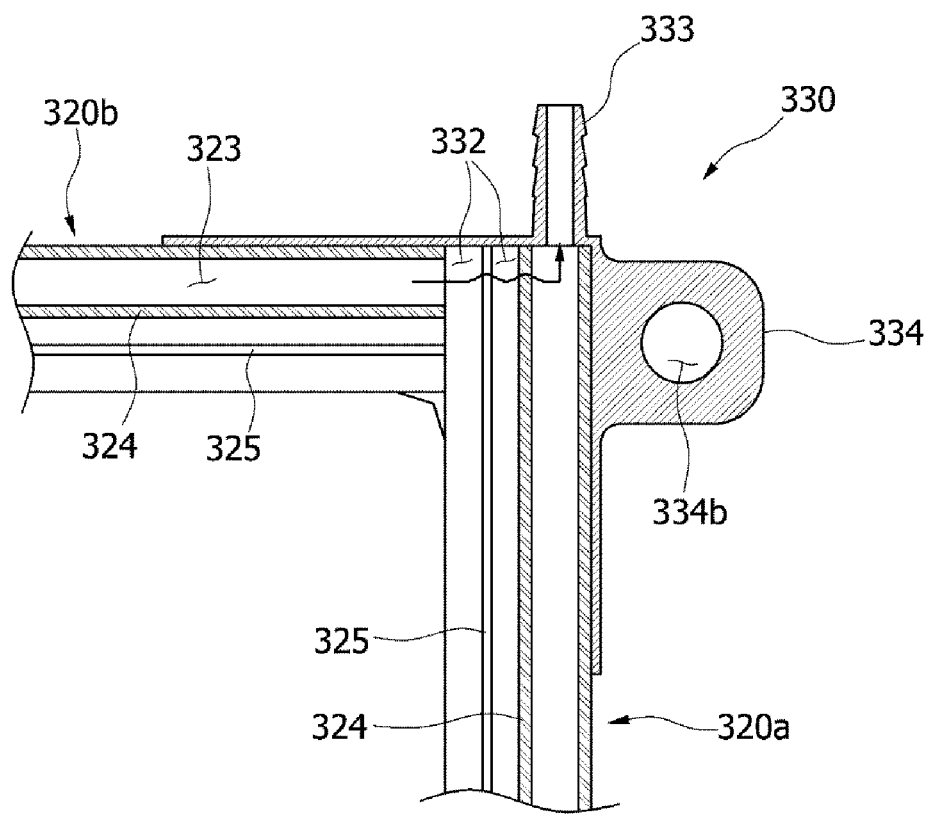
FIG. 24 is a diagram illustrating a coupled state of the connecting member and the support frame which are applied to the flat-plate filter for water treatment according to the third embodiment of the present invention.

In this case, the flow path 323 of the frame 320a may communicate with the water receiving hole 333 to discharge the filtered water (see FIG. 24).

Consequently, in the flat-plate filter 300 for water treatment according to the third embodiment of the present invention, since the plurality of frames 320a and 320b are processed in the same shape, the plurality of frames 320a and 320b may be manufactured by the same process such that an assembly process of the plurality of frames 320a and 320b may be improved to enhance productivity.

Further, since the end portions of the plurality of frames 320a and 320b are brought into contact with each other at a right angle, when the frames 320a and 320b are processed, performing a separate cutting process of forming communicating portions with the water receiving hole 333 is not required so that a processing process may be simplified to reduce a process cost.

In particular, since the two coupled frames 320a and 320b are brought into contact with each other at a right angle across the entire end portions thereof, an actual coupling area extends at a corner communicating with the water receiving hole 333 as compared with the related art, and thus a bonding force between the two frames 320a and 320b may be increased such that a supporting force for the filtration member 310 may also be increased.

As described above, the plurality of frames 320a and 320b are brought into contact with each other across entire areas of both end portions thereof, and without a separate intermediate space as in the related art, the flow paths 323 may directly communicate with each other in the plurality of frames 320a and 320b through the space 332 into which the filtration member 310 is not inserted (see FIG. 24).

A plurality of connecting members 330 may be provided and coupled to corners of the support frame 320. The connecting member 330 may fix end portions of two adjacent frames 320a and 320b.

Here, the end portion of the frame 320a of the two adjacent frames 320a and 320b is inserted in a first direction of a body 331, and the end portion of the frame 320b thereof is inserted in a second direction of the body 331 such that the end portion of the frame 320b may be disposed to be brought into contact with the end portion of the frame 320a inserted in the first direction (see FIG. 22).

In this case, in the connecting member 330 at which the water receiving hole 333 is formed, the water receiving hole 333 may communicate with the flow path 323 of the frame 320a.

Here, since the frames 320a and 320b are disposed at a right angle and thus a cross section of the frame 320a faces the water receiving hole 333, the confinement member 324 on the cross section of the frame 320a acts as a factor for hindering communication between the flow path 323 of the frame 320b and the water receiving hole 333. Therefore, in the connecting member 330, it is preferable that the water receiving hole 333 is formed such that the confinement member 324 of the frame 320a is not disposed in an inner diameter range of the water receiving hole 333.

For example, the connecting member 330 may be substantially disposed on a straight line with the flow path 323 of the frame 320a (FIG. 24). In this case, the water receiving hole 333 of the connecting member 330 may be formed in a shape corresponding to the flow path 323.

Alternatively, when the water receiving hole 333 is not formed in the shape corresponding to the flow path 323, in order to increase an amount of the filtered water which flows from the flow path 323 of the frame 320a to be discharged through the water receiving hole 333, an inner diameter of the water receiving hole 333 may be formed to be larger than a width or a length of the flow path 323 of the frame 320a.

Alternatively, the connecting member 330 may be substantially disposed on a straight line with the space 332 of the frame 320a. In this case, the water receiving hole 333 of the connecting member 330 may be formed in a shape corresponding to the space 332.

Alternatively, when the water receiving hole 333 is not formed in the shape corresponding to the space 332, in order to increase an amount of the filtered water which flows from the flow path 323 of the frame 320a to be discharged through the water receiving hole 333, an inner diameter of the water receiving hole 333 may be formed to be larger than a width or a length of the flow path 323 of the frame 320a.

Figure 25:
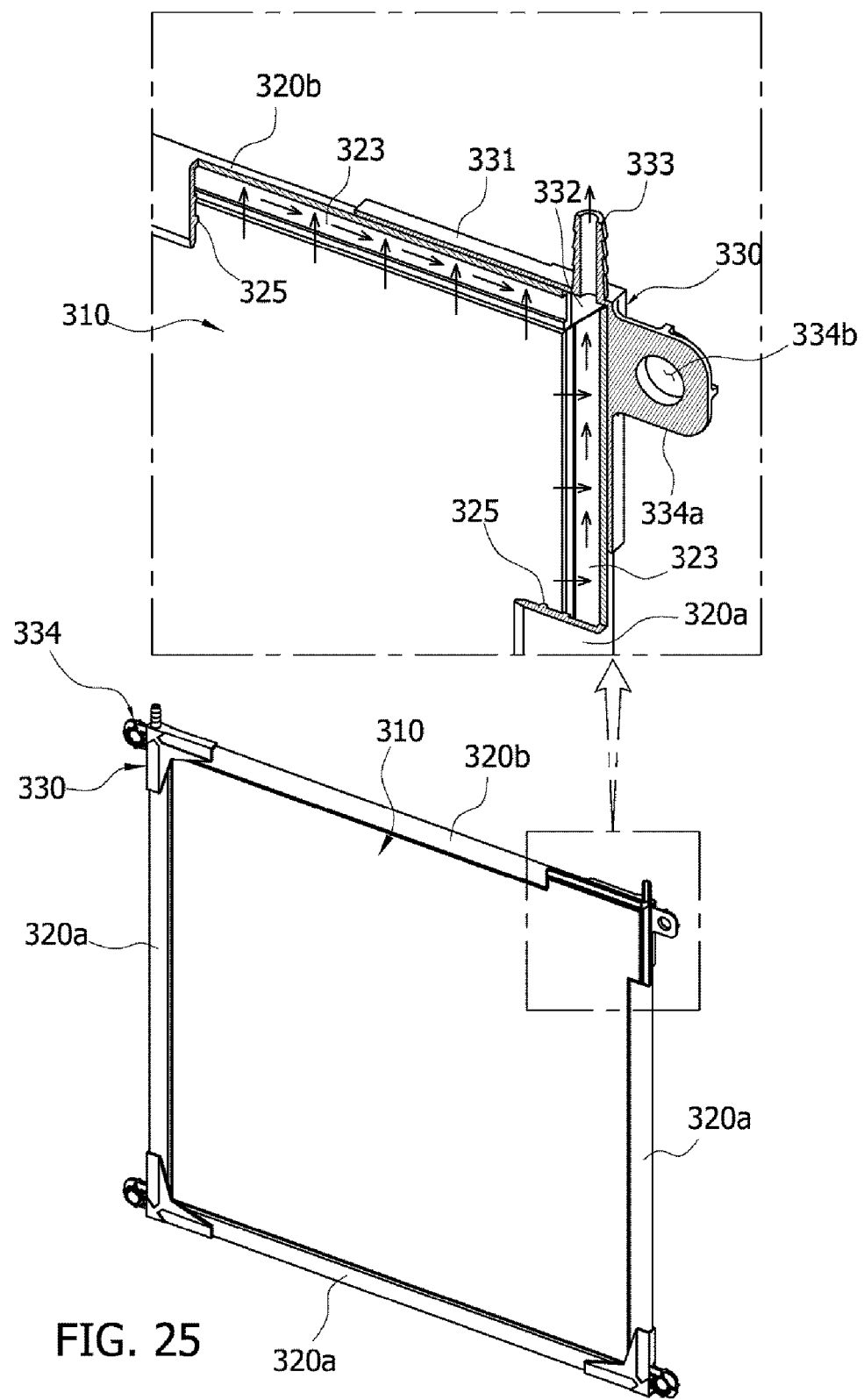
FIG. 25 is a diagram illustrating a flow route of filtered water flowing into a water receiving hole in the flat-plate filter for water treatment according to the third embodiment of the present invention.

Consequently, the filtered water which flows in the filtration member 310 by a suction force provided from a pump (not shown) and from which foreign materials are filtered may flow into the flow paths 323 formed at the plurality of frames 320a and 320b, may move to the connecting member 330 along the flow paths 323, and then may be discharged to the outside through the water receiving hole 333 via the space 332 or the flow path 323 in the frame 320a (see FIG. 25).

Alternatively, during a back-washing process, after a fluid such as washing water provided from the outside may flow in the water receiving hole 333, the fluid may flow to the flow path 323 of the first frame 320a, and simultaneously, may flow to the flow path 323 of the frame 320b through the space 332 between the frames 320a and 320b and then may be supplied along the flow paths 323 formed at the frames 320a and 320b.

Figure 26:
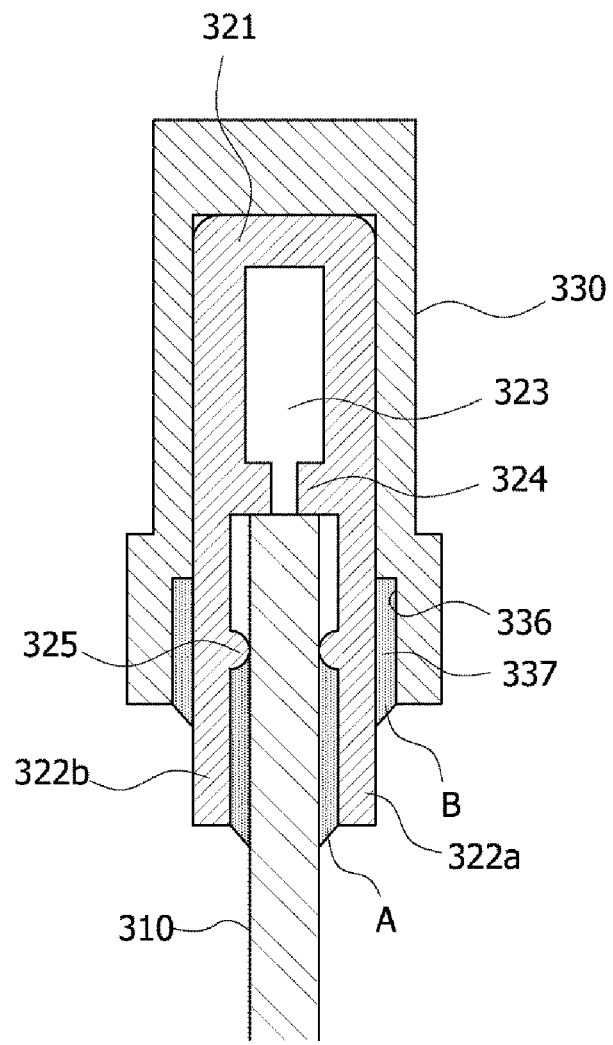
FIG. 26 is a cross-sectional view illustrating a coupled state of the connecting member and the support frame which are applied to the flat-plate filter for water treatment according to the third embodiment of the present invention.

Meanwhile, as shown in FIG. 26, the connecting member 330 may be fixed to the plurality of frames 320a and 320b inserted thereinto via an adhesive member B.

Here, an exterior shape and a function of the connecting member 330 may be identical or similar to those of the connecting member 130 of FIGS. 8 and 12.

Components of a flat-plate filter 400 for water treatment according to a fourth embodiment of the present invention may be identical or similar to those of the above-described flat-plate filter 100 for water treatment according to the first and second embodiments of the present invention shown in FIGS. 1 and 2 except for a support frame 420 and a connecting member 430.

Here, technical features identical to those of the flat-plate filters 100 and 300 for water treatment according to the first to third embodiments of the present invention will be omitted, and the technical features not mentioned with respect to the flat-plate filter 400 for water treatment according to the fourth embodiment of the present invention will be understood to be equal to the corresponding components of the flat-plate filter 100 and 300 for water treatment according to the first to third embodiments.

Figure 27:
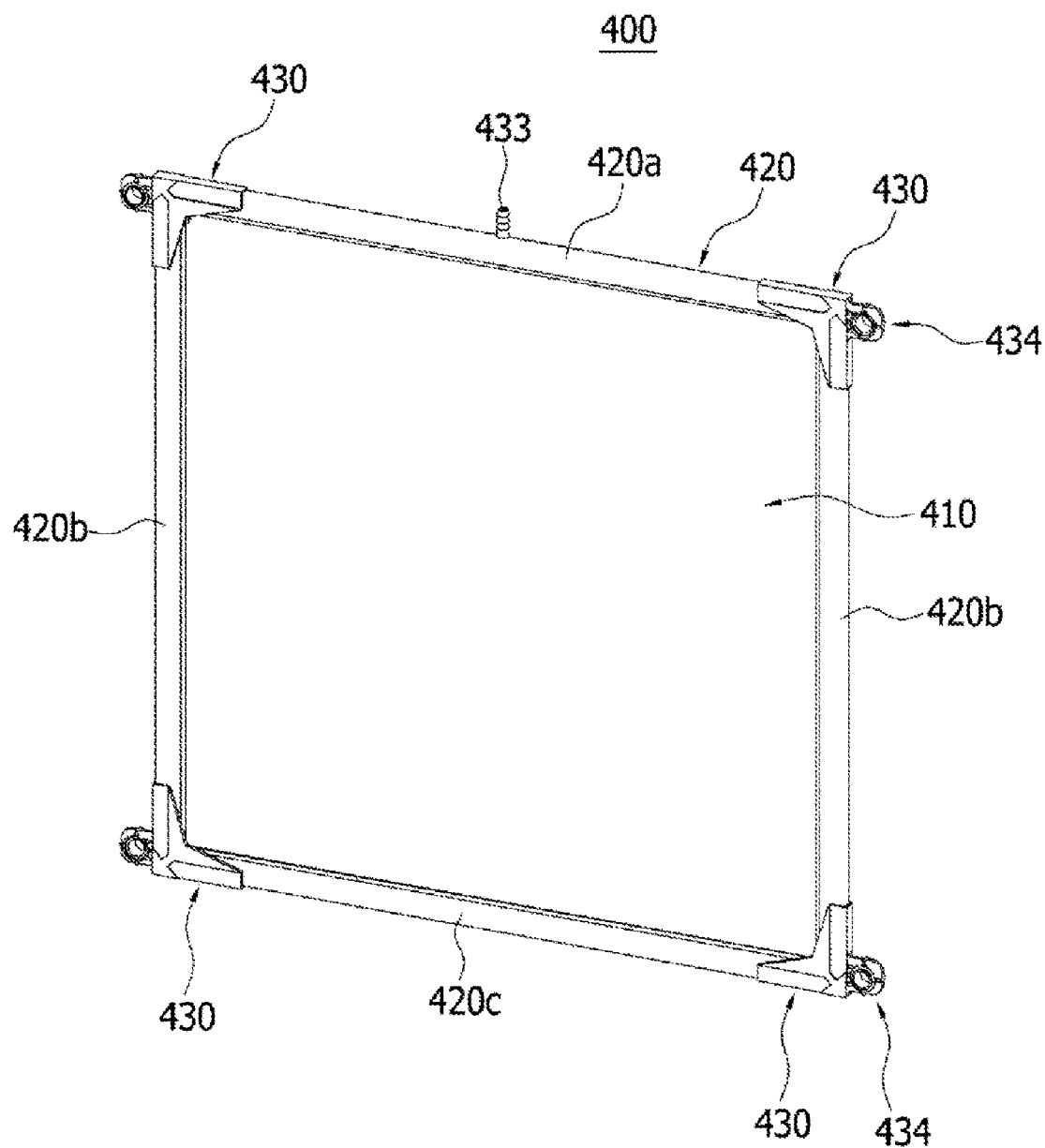
FIG. 27 is a diagram illustrating a flat-plate filter for water treatment according to a fourth embodiment of the present invention.
Figure 28:
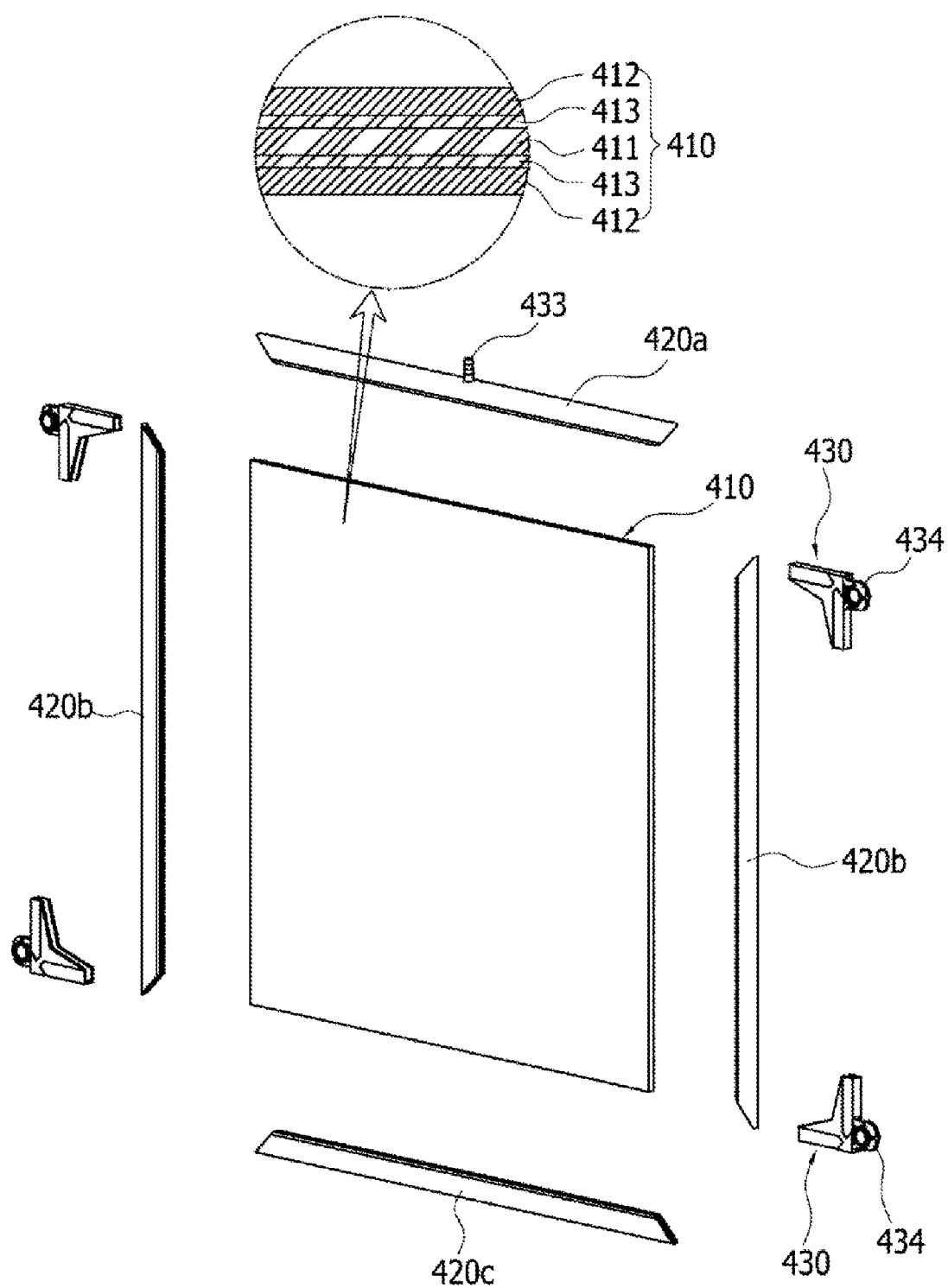
FIG. 28 is an exploded view of FIG. 27.

As shown in FIGS. 27 and 28, the flat-plate filter 400 for water treatment according to the fourth embodiment of the present invention includes a filtration member 410, the support frame 420, and a water receiving hole 433. Here, the filtration member 210 may be identical or similar to the filtration member 110 of FIG. 1.

The support frame 420 is fitted in and coupled to an edge of the filtration member 410 to support the edge thereof such that the filtration member 410 may be maintained in a plate-shaped form. Here, an exterior shape and a function of the support frame 420 may be identical or similar to those of the support frame 220 of FIGS. 13 and 14.

The support frame 420 includes a plurality of frames 420a, 420b, and 420c coupled to the edge of the filtration member 411.

For example, the plurality of frames 420a, 420b, and 420c may be disposed at the edge of the filtration member 410 so as to allow an end portion of one frame of the plurality of frames 420a, 420b, and 420c to be brought into contact with an end portion of another frame thereof, and end portions of two adjacent frames may be connected via the connecting member 430 disposed at a corner of the filtration member 410 (see FIG. 28).

Figure 29:
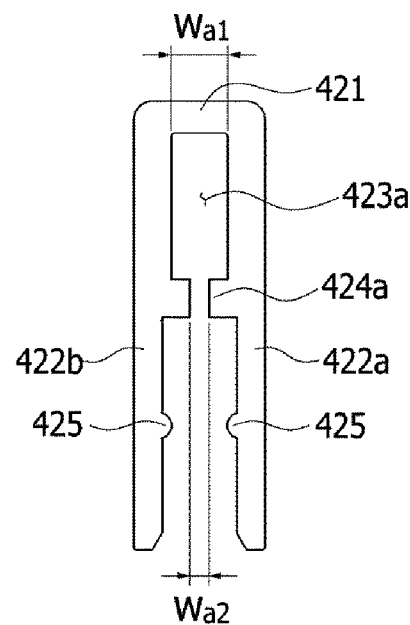
FIGS. 29 to 31 are cross-sectional views illustrating a form of a support frame, which is applied to the flat-plate filter for water treatment according to the fourth embodiment of the present invention, according to a position.
Figure 30:
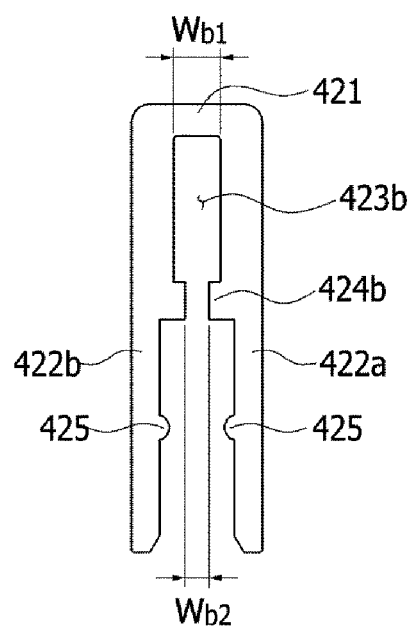
Figure 31:
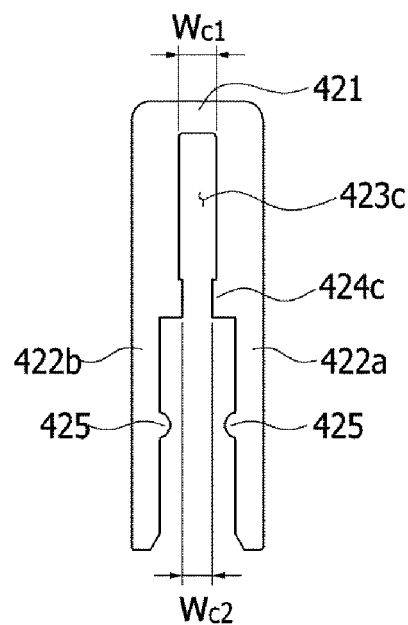

Here, the plurality of frames 420a, 420b, and 420c may each include a plate-shaped first plate 421 and a pair of second plates 422a and 422b extending from the first plate 421 in a direction perpendicular to the first plate 421 (see FIGS. 29 to 31).

Consequently, the edge of the filtration member 410 may be inserted into a space formed between the pair of second plates 422a and 422b, thereby being supported on the pair of second plates 422a and 422b facing each other. In this case, the edge of the filtration member 410 inserted into the space formed between the pair of second plates 422a and 422b may be inserted to be spaced at a predetermined distance from the first plate 421.

That is, a confinement member 424 for limiting an insertion depth of the filtration member 410 may be provided on surfaces facing each other of the pair of facing second plates 422a and 422b (see FIGS. 29 to 31).

Consequently, the insertion depth of the filtration member 410 is limited through the confinement member 424 while the edge of the filtration member 410 is engaged with each of the frames 420a, 420b, and 420c such that a predetermined space may be formed between an end portion of the edge of the filtration member 410 and the first plate 421.

Accordingly, when the filtration member 410 is coupled to the frames 420a, 420b, and 420c, the edge of the filtration member 410 is always maintained in a state of being spaced apart from the first plate 421 such that a flow path 423 through which a fluid such as filtered water or washing water may move may be formed.

Figure 34:
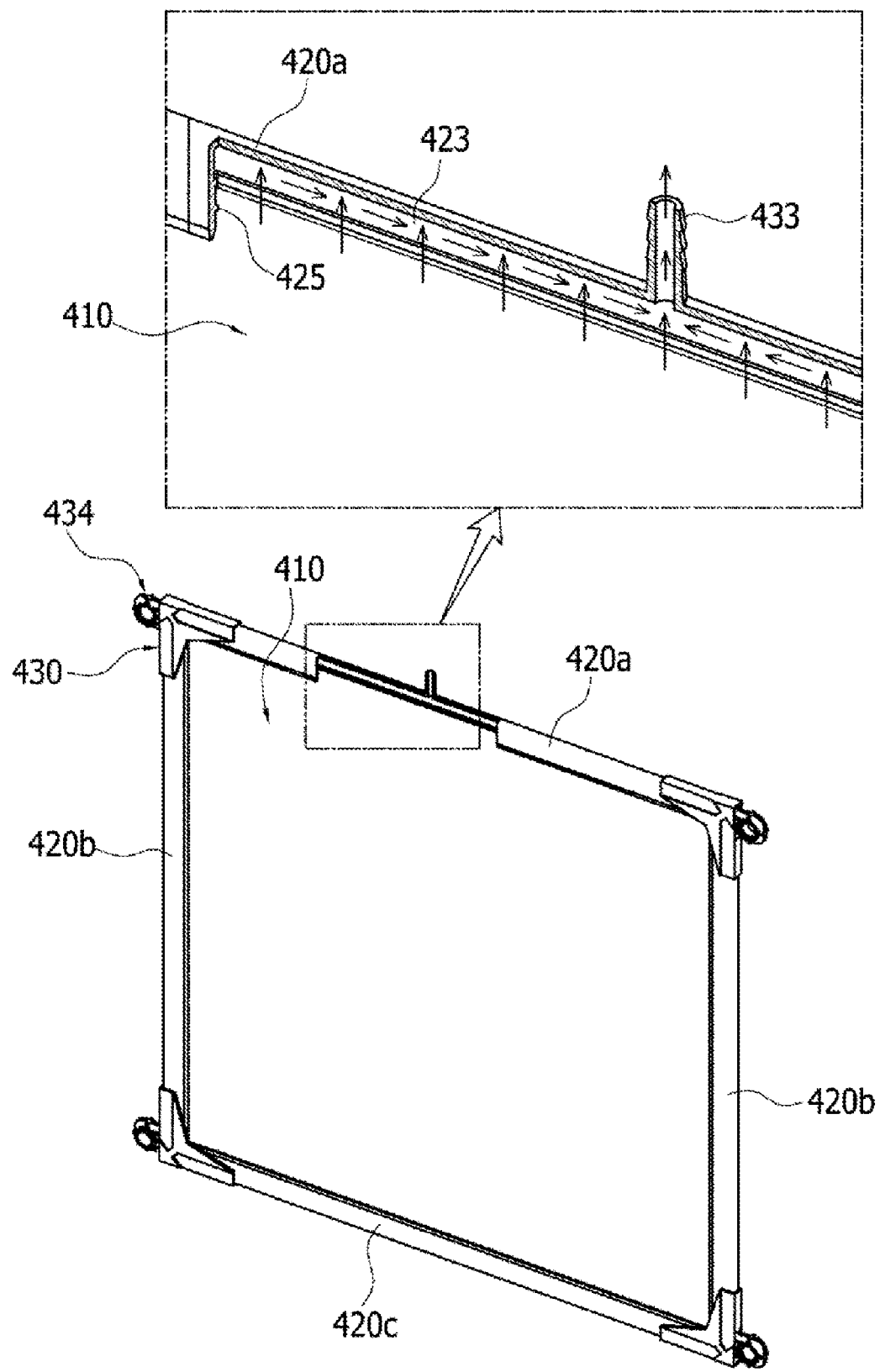
FIG. 34 is a diagram illustrating a flow route of filtered water flowing into a water receiving hole in the flat-plate filter for water treatment according to the fourth embodiment of the present invention.

In this case, the water receiving hole 433 is formed in one of the plurality of frames 420a, 420b, and 420c to communicate with the flow path 423, thereby discharging filtered water produced by the filtration member 410 to the outside. For example, the water receiving hole 433 may be formed in a first frame 420a (see FIG. 34).

Here, the water receiving hole 433 may be provided at an arbitrary position on the first frame 420a, but it is preferable that the water receiving hole 433 is provided at a substantially intermediate position on the first frame 420a to provide a uniform suction pressure to the filtration member 410.

The water receiving hole 433 may be integrally formed with a body of the first frame 420a. Alternatively, the water receiving hole 433 may be formed such that a coupling hole (not shown) is formed at the body of the first frame 420a, and a water receiving hole (not shown) having a predetermined length may be detachably coupled to the coupling hole.

Therefore, the filtered water which flows in the filtration member 410 by a suction force provided from a pump (not shown) and from which foreign materials are filtered may flow into the flow paths 423 formed at the plurality of frames 420a, 420b, and 420c, may move along the flow paths 423, and then may be discharged to the outside through the water receiving hole 433.

Contrarily, during a back-washing process, a fluid such as washing water provided from the outside may flow in through the water receiving hole 433 and then may be supplied to the flow path 423 formed at each of the plurality of frames 420a, 420b, and 420c.

During a filtration process, since the water receiving hole 433 to which a suction pressure is externally supplied is provided at the first frame 420a, the suction pressure is highest at the first frame 420a, and the suction pressure is gradually decreased at the second frame 420b and the third frame 420c the further away the water receiving hole 433 is.

Further, during a back-washing process, a fluid such as washing water provided from the outside through the water receiving hole 433 easily flows along the flow path 423 rather than flowing in the filtration member 410 due to resistance resulting from the filtration member 410. Consequently, a back-washing pressure is highest at the third frame 420c located farthest away from the water receiving hole 433, and the back-washing pressure is gradually decreased as a distance from the water receiving hole 433 is shortened.

Further, during the filtration process, an amount of foreign materials removed by the filtration member 410 in a region in which the suction pressure is high in the vicinity of the water receiving hole 433 is larger than an amount of foreign materials removed by the filtration member 410 in a region in which the suction pressure is low. In this case, since the foreign materials are attached to the filtration member 410, an amount of the foreign materials attached to the filtration member 410 in a region in which the suction pressure is high in the filtration member 410 is larger than a region in which the suction pressure is low therein. Therefore, the amount of the foreign materials attached to the filtration member 410 acts as a larger resistance factor against a movement of a fluid such as washing water.

Consequently, in the back-washing process, since resistance against a movement of a fluid such as washing water decreases the further away the water receiving hole 433 is, the back-washing pressure in the filtration member 410 is increased, whereas since the resistance against the movement of the fluid such as the washing water increases the closer the water receiving hole 433 is, the back-washing pressure in the filtration member 410 is decreased.

In this case, since the suction pressure or the back-washing pressure is not uniform according to regions in the filtration member 410, filtration efficiency may be reduced.

Further, delamination of a nanofiber web 412 from a first support 411 or a second support 413 frequently occurs in a region in which the suction pressure or the back-washing pressure is high rather than a region in which the suction pressure or the back-washing pressure is low, thereby shortening a lifetime of the filtration member 410.

Consequently, it is required to prevent imbalance in suction pressure or back-washing pressure according to regions in the filtration member 410.

To this end, in the flat-plate filter 400 for water treatment according to the fourth embodiment of the present invention, flow paths 423a, 423b, and 423c of the frames 420a, 420b, and 420c have different cross-sectional areas. That is, a cross-sectional area of the flow path 423a of the first frame 420a, at which the water receiving hole 433 for communicating with the flow paths 423a, 423b, and 423c to discharge the filtered water to the outside, may be formed to be larger than a cross-sectional area of the flow path 423b or 423c of the frame 420b or 420c which is not close to the water receiving hole 433.

In this case, when the flow paths 423a, 423b, and 423c are formed with the same height, the cross-sectional areas of the flow paths 423a, 423b, and 423c may be determined by widths of the flow paths 423a, 423b, and 423c. Therefore, as shown in FIGS. 29 to 31, flow path widths $W_{a1}$, $W_{b1}$, and $W_{c1}$ are differently configured such that the flow paths 423a, 423b, and 423c may be formed with different cross-sectional areas.

For example, a ratio of the cross-sectional area of the flow path of the first frame 420a with the water receiving hole 433 formed therein to the cross-sectional area of the flow path of the second or third frame 420b or 420c that is not close to the water receiving hole 433 may be in the range of 1.1:1 to 3:1. That is, a ratio of the flow path width $W_{a1}$ to the flow path width $W_{b1}$ or $W_{c1}$ may be in the range of 1.1:1 to 3:1.

Consequently, the suction pressure is decreased by increasing the cross-sectional area of the flow path of the first frame 420a that is close to the water receiving hole 433 at which the existing suction pressure is high such that it is possible to prevent an imbalance in pressure according to regions in the filtration member 410 and thus improve filtration efficiency.

Further, during the back-washing process, resistance against a fluid such as washing water increases by decreasing the cross-sectional area of the flow path of the second or third frame 420b or 420c further away from the water receiving hole 433, at which the existing back-washing pressure is high, thereby decreasing a back-washing pressure. Consequently, an imbalance in back-washing pressure according to regions in the filtration member 410 may be prevented such that it is possible to improve cleaning efficiency and thus prevent resistance against filtration efficiency.

Thus, as a result, a production yield of the water filtered through the filtration member 410 may be improved, and at the same time, partial delamination of the nanofiber web 412 may be prevented to increase a service life thereof.

Alternatively, the plurality of frames 420a, 420b, and 420c may be formed such that the cross-sectional areas of the flow paths 423a, 423b, and 423c are formed with sequential sizes.

For example, the cross-sectional area of the flow path of the first frame 420a with the water receiving hole 433 formed therein may be formed to be larger than the cross-sectional area of the flow path of the second frame 420b adjacent to the first frame 420a, and the cross-sectional area of the flow path of the second frame 420b may be formed to be larger than the cross-sectional area of the flow path of the third frame 420c not adjacent to the first frame 420a. That is, the cross-sectional area of the flow path may become larger closer to the water receiving hole 433, whereas the cross-sectional area of the flow path may become smaller further away from the water receiving hole 433 (see FIGS. 29 to 31).

Accordingly, the suction pressure or the back-washing pressure of the plurality of frames 420a, 420b, and 420c is sequentially decreased according to a distance from the water receiving hole 433 to further prevent an imbalance in pressure according to regions in the filtration member 410 such that filtration efficiency or cleaning efficiency may be further improved.

Meanwhile, as a gap between the confinement members 424 forming a passage between the filtration member 410 and the flow path 423 becomes smaller, a passage through which the filtered water flows from the filtration member 410 to the flow path 423 is reduced and thus resistance increases such that a suction pressure may be reduced.

In this case, during the back-washing process, when the passage through which a fluid such as washing water flows from the flow path 423 to the filtration member 410 is reduced, a flow rate becomes faster than a flow rate in a case in which the fluid passes through the flow path 423 such that a back-washing pressure may be increased.

Similarly, as the gap between the confinement members 424 is increased, a passage from the filtration member 410 to the flow path 423 becomes larger and thus resistance decreases such that a suction pressure may be increased.

In this case, during the back-washing process, when the passage through which a fluid such as washing water flows from the flow path 423 to the filtration member 410 is increased, a flow rate becomes slower than the flow rate in a case in which the fluid passes through the flow path 423 such that the back-washing pressure may be decreased.

To this end, in the flat-plate filter 400 for water treatment according to the fourth embodiment of the present invention, gaps $W_{a2}$, $W_{b2}$, and $W_{c2}$ between confinement members 424a, 424b, and 424c of the frames 420a, 420b, and 420c may be formed differently.

For example, the gap $W_{a2}$ between the confinement members 424a of the first frame 420a with the water receiving hole 433 formed therein may be smaller than the gap $W_{b2}$ or $W_{c2}$ of the second or third frame 420b or 420c not adjacent to the water receiving hole 433.

In this case, the gap $W_{b2}$ of the confinement members 424b of the second frame 420b may be equal to or smaller than the gap $W_{c2}$ of the confinement members 424c of the third frame 420c.

For example, a ratio of the gap $W_{a2}$ between the confinement members 424a of the first frame 420a with the water receiving hole 433 formed therein to the gap $W_{b2}$ or $W_{c2}$ between the confinement members 424b or the confinement members 424c of the second or third frame 420b or 420c may be in the range of 1:1.1 to 1:1.5.

Accordingly, the suction pressure or the back-washing pressure of the plurality of frames 420a, 420b, and 420c is further decreased according to a distance from the water receiving hole 433 to further prevent an imbalance in pressure according to regions in the filtration member 410 such that filtration efficiency or cleaning efficiency may be further improved.

Meanwhile, the flat-plate filter 400 for water treatment according to the fourth embodiment of the present invention may include a plurality of connecting members 430 coupled to corners of the support frame 420.

The connecting member 430 may fix end portions of two adjacent frames 420a and 420b or two adjacent frames 420b and 420c at the corner of the support frame 420.

Figure 32:
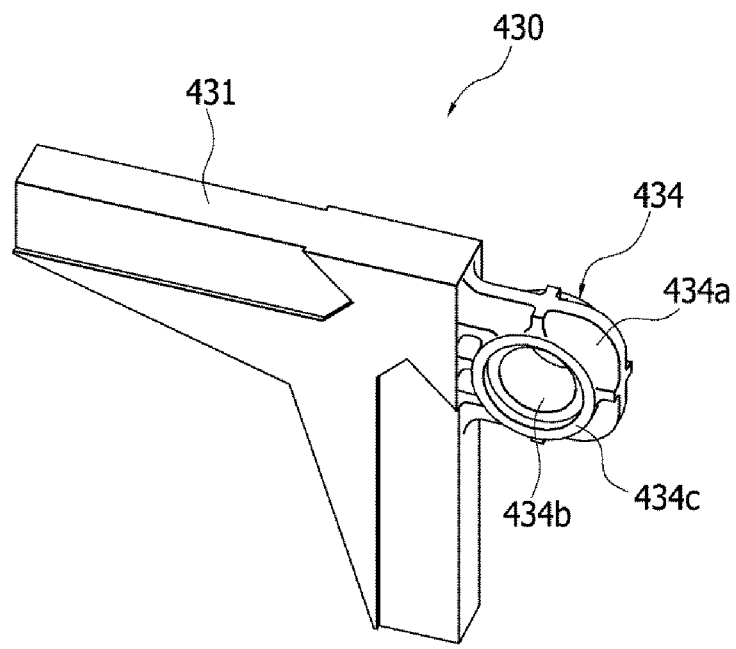
FIG. 32 is a diagram illustrating a connecting member applied to the flat-plate filter for water treatment according to the fourth embodiment of the present invention.
Figure 33:
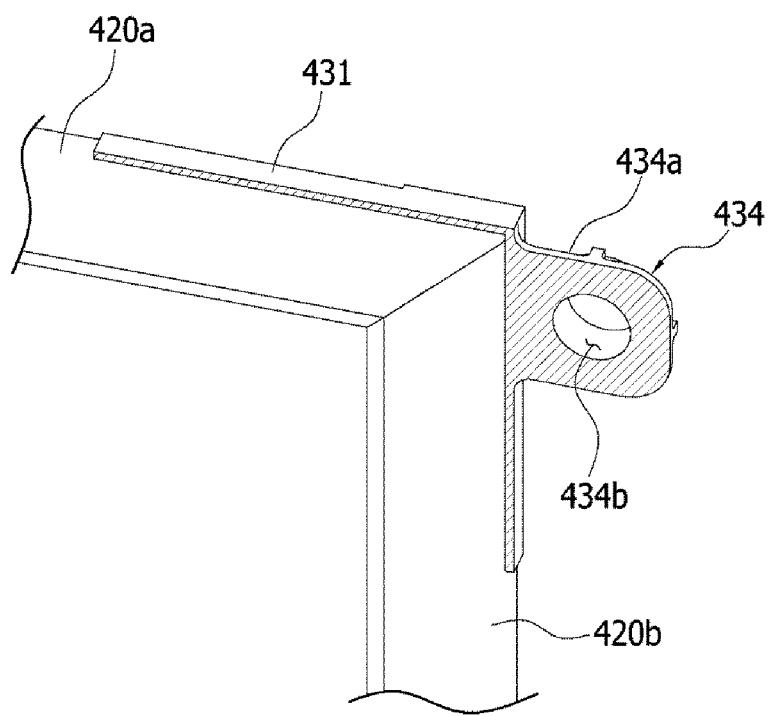
FIG. 33 is a diagram illustrating a coupled state of the connecting member and the support frame which are applied to the flat-plate filter for water treatment according to the fourth embodiment of the present invention.

To this end, the connecting member 430 may include a body 431 having one opened side so as to allow the end portions of the two adjacent frames 420a and 420b or the two adjacent frames 420b and 420c to be inserted thereinto (see FIGS. 32 and 33).

Consequently, the end portions of the two adjacent frames 420a and 420b or the two adjacent frames 420b and 420c among the plurality of frames 420a, 420b, and 420c constituting the support frame 420 are inserted into the body 431 such that the two adjacent frames 420a and 420b or the two adjacent frames 420b and 420c may be fixed by the body 431.

Here, the end portion of the frame 420a of the two adjacent frames 420a and 420b is inserted in a first direction of the body 431, and the end portion of the frame 420b thereof is inserted in a second direction of the body 431 such that the end portion of the frame 420b may be disposed to be brought into contact with the end portion of the frame 420a inserted in the first direction (see FIG. 33).

In this case, the flow path 423a formed at the first frame 420a inserted in the first direction and the flow path 423b formed at the second frame 420b inserted in the second direction are disposed to communicate with each other such that all the flow paths formed at the plurality of frames 420a and 420b may communicate with each other.

Meanwhile, when a plurality of filters are disposed in parallel, a gap adjuster 434 may be provided at the flat-plate filter 400 for water treatment according to the fourth embodiment of the present invention to allow filtration members 410 to be disposed and spaced a gap from each other.

The gap adjuster 434 may be provided on at least one of the plurality of frames 420a, 420b, and 420c constituting the support frame 420. Alternatively, the gap adjuster 434 may be provided on at least one of the plurality of connecting members 430.

As shown in FIGS. 27 and 28, in the flat-plate filter 400 for water treatment according to the fourth embodiment of the present invention, the water receiving hole 433 may be formed on at least one of the plurality of connecting members 430.

That is, the connecting member 430 at which the water receiving hole 433 is not formed among the plurality of connecting members 430 coupled to the corners of the support frame 420 may only serve to connect a pair of adjacent frames, whereas the connecting member 430 at which the water receiving hole 433 is formed may also serve as a drain for discharging the filtered water produced through the water receiving hole 433 to the outside in addition to serving to connect the pair of adjacent frames.

In this case, the flat-plate filter 400 for water treatment may be constituted of the plurality of frames 420a, 420b, and 420c having different cross-sectional areas of flow paths.

For example, each of the first frame 420a and the second frame 420b adjacent to the water receiving hole 433 may have a cross-sectional area of a flow path that is larger than a cross-sectional area of a flow path of the third frame 420c not adjacent to the water receiving hole 433.

Accordingly, the suction pressure or the back-washing pressure is uniformly maintained with respect to left and right sides of the filtration member 410, and at the same time, the suction pressure or the back-washing pressure of the plurality of frames 420a, 420b, and 420c is decreased according to a distance from the water receiving hole 433 to further prevent an imbalance in pressure according to regions in the filtration member 410 such that filtration efficiency or cleaning efficiency may be further improved.

Further, each of the gaps $W_{a2}$ and $W_{b2}$ between the confinement members 424 of the first and second frames 420a and 420b adjacent to the water receiving hole 433 may be smaller than the gap $W_{c2}$ between the confinement members 424 of the third frame 420c not adjacent to the water receiving hole 433.

Accordingly, the suction pressure or the back-washing pressure is uniformly maintained with respect to left and right sides of the filtration member 410, and at the same time, the suction pressure or the back-washing pressure of the plurality of frames 420a, 420b, and 420c is further decreased according to a distance from the water receiving hole 433 to further prevent an imbalance in pressure according to regions in the filtration member 410 such that filtration efficiency or cleaning efficiency may be further improved.

Further, the water receiving hole 133 may be integrally formed with the body 131 of the connecting member 130 (see FIG. 8). Alternatively, a coupling hole 131a may be formed in the body 131 of the connecting member 130, and a water receiving hole 133 having a predetermined length may be detachably coupled to the coupling hole 131a (see FIG. 12).

In this case, when the connecting member 430 with the water receiving hole 433 formed therein is coupled to two adjacent frames 420a and 420b, a collecting space communicating with the flow paths 423a formed at the two adjacent frames 420a and 420b may be formed at the connecting member 430. The collecting space may be formed at a position communicating with the water receiving hole 433 (The collecting space may be identical or similar to the collecting space 132 of FIGS. 10 and 11).

Therefore, the filtered water which flows in the filtration member 410 by a suction force provided from a pump (not shown) and from which foreign materials are filtered may flow into the flow paths 423 formed at the plurality of frames 420a and 420b, may move to the collecting space along the flow paths 423, and then may be discharged to the outside through the water receiving hole 433.

Contrarily, during a back-washing process, a fluid such as washing water provided from the outside may flow in through the water receiving hole 433, may pass through the collecting space, and then may be supplied to the flow path 423 formed at each of the plurality of frames 420a, 420b, and 420c.

Here, an exterior shape and a function of the connecting member 430 may be identical or similar to those of the connecting member 130 of FIGS. 8 and 12.

Components of a flat-plate filter 500 for water treatment according to a fifth embodiment of the present invention may be identical or similar to those of the above-described flat-plate filter 100 for water treatment according to the first and second embodiments of the present invention shown in FIGS. 1 and 2 except for a support frame 520 and a connecting member 530.

Here, technical features identical to those of the flat-plate filters 100, 300, and 400 for water treatment according to the first to fourth embodiments of the present invention will be omitted, and the technical features not mentioned with respect to the flat-plate filter 500 for water treatment according to the fifth embodiment of the present invention will be understood to be equal to the corresponding components of the flat-plate filter 100, 300, and 400 for water treatment according to the first to fourth embodiments.

Figure 35:
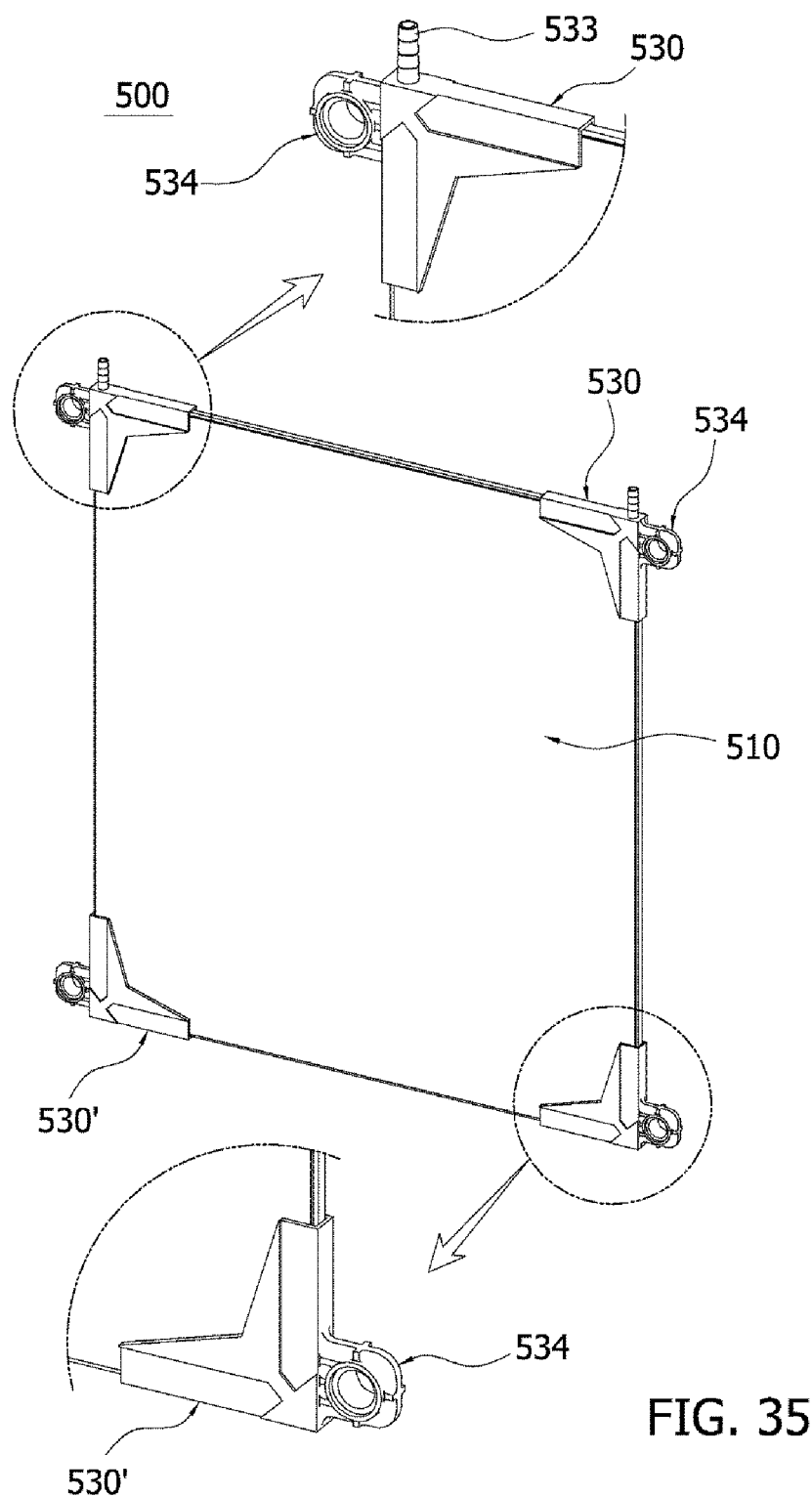
FIG. 35 is a diagram illustrating a flat-plate filter for water treatment according to a fifth embodiment of the present invention.
Figure 36:
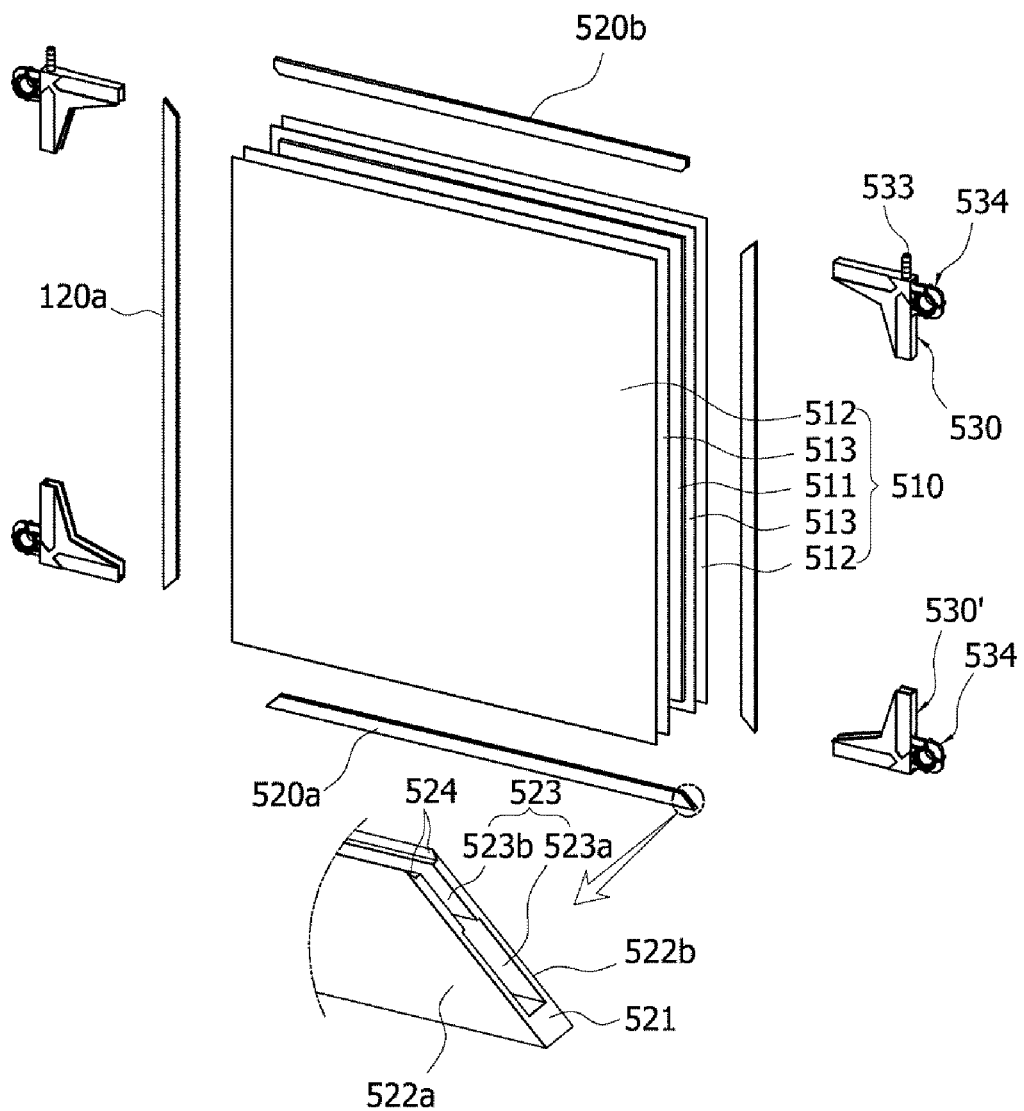
FIG. 36 is an exploded view of FIG. 35.
Figure 37:
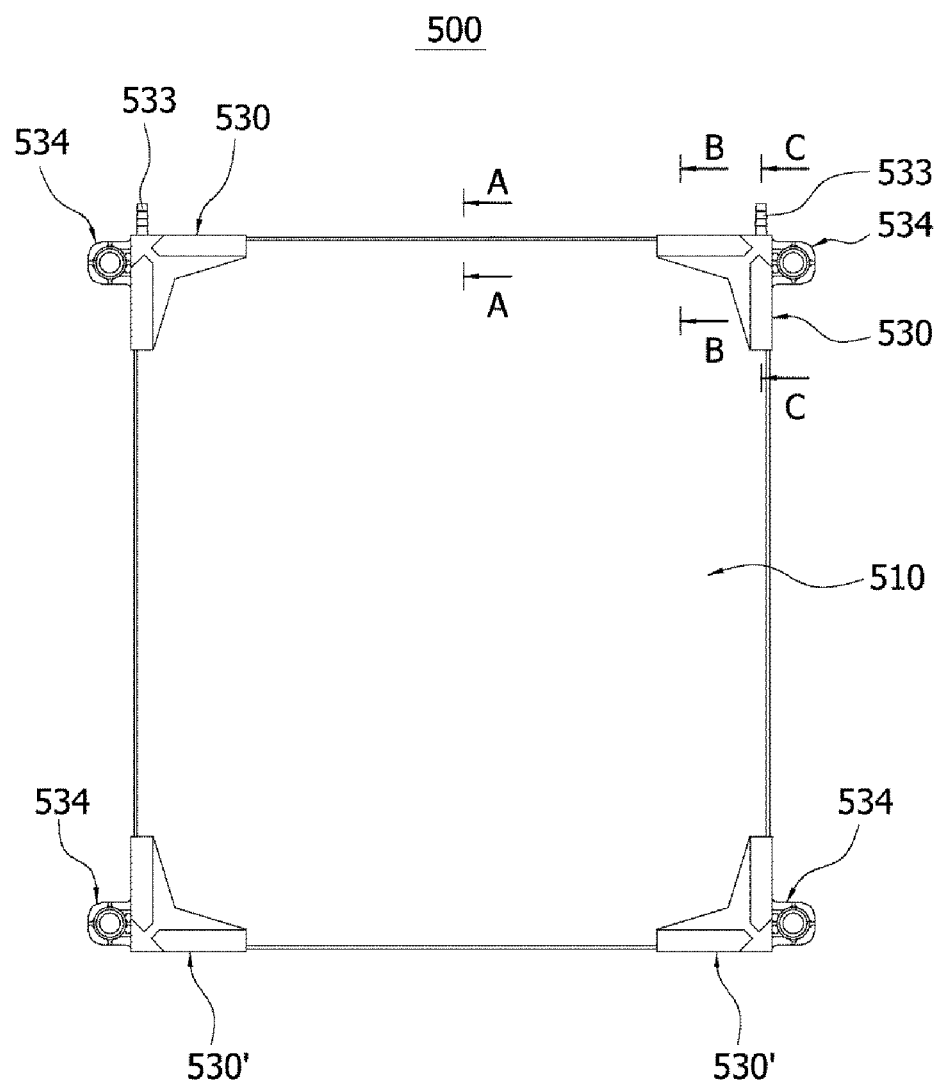
FIG. 37 is a front view of FIG. 35.

As shown in FIGS. 35 to 37, the flat-plate filter 500 for water treatment according to the fifth embodiment of the present invention includes a filtration member 510 and the support frame. Here, the filtration member 510 may be identical or similar to the filtration member 110 of FIG. 1.

Figure 42:
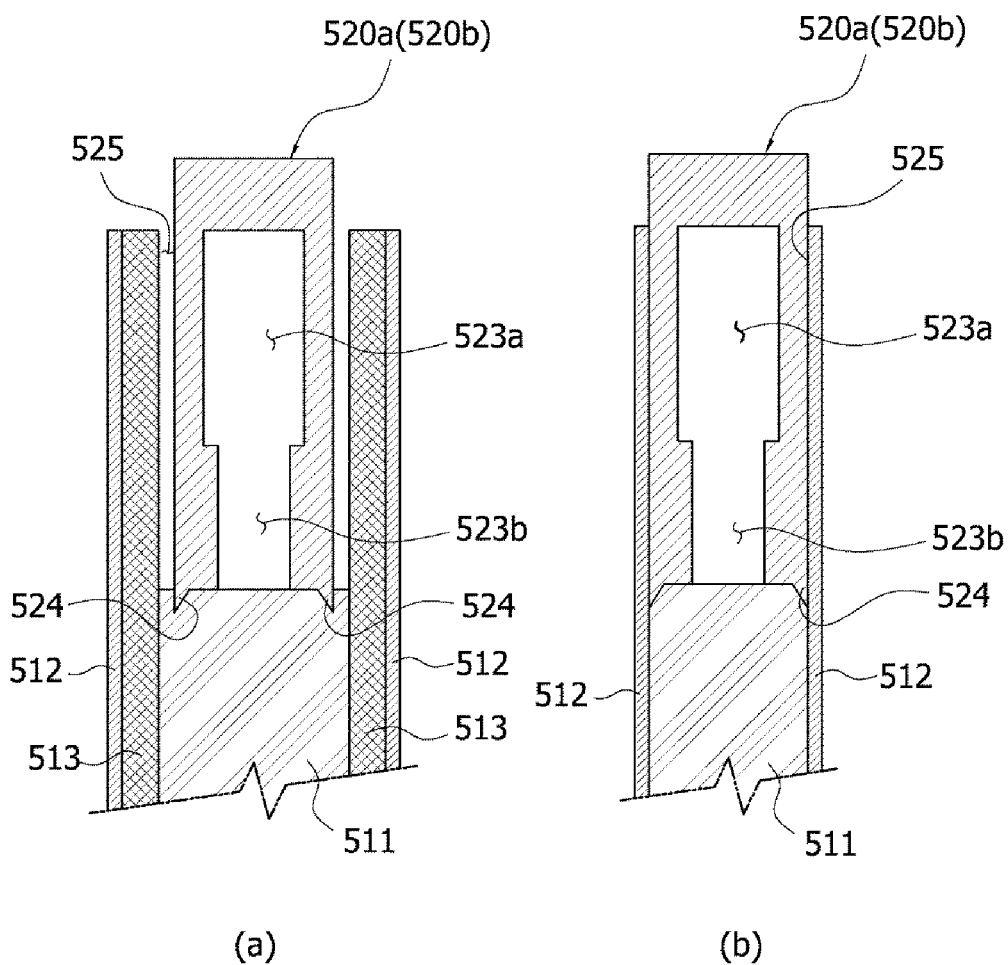
FIG. 42 is a diagram illustrating an arrangement relationship between the filtration member and a frame which are applied to the flat-plate filter for water treatment according to the fifth embodiment of the present invention.

In this case, the filtration member 510 may have a three-layer structure in which a nanofiber web 512 is directly attached to both surfaces of a first support 511 (see FIG. 42B) or may have a five-layer structure in which a separate second support 513 is interposed between the nanofiber web 512 and the first support 511 (see FIG. 36).

In this case, the nanofiber web 512 applied to the present invention may be provided to have an area that is relatively larger than an area of the first support 511 and may be disposed on both of the surfaces of the first support 511.

In particular, the nanofiber web 512 may include a first portion 512a disposed in a region corresponding to the first support 511 so as to be able to cover one surface of the first support 511, and a second portion 512b extending outward from an edge of the first portion 512a.

Figure 41:
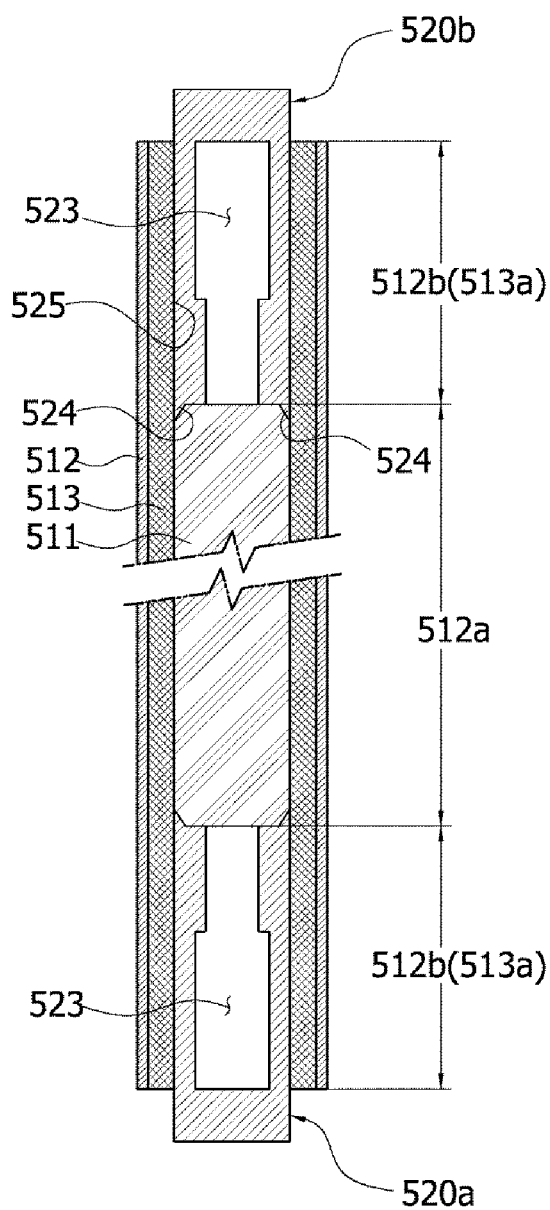
FIG. 41 is a schematic diagram showing a relationship in size among a first support, a nanofiber web, and a second support which are applied to a filtration member of the fifth embodiment of the present invention.

Here, an area of the second portion 512b may be an area obtained by subtracting an area of the first portion 512a from the entire area of the nanofiber web 512 (see FIG. 41).

Accordingly, when a pair of nanofiber webs 512 are laminated on both surfaces of the first support 511, each of the pair of nanofiber webs 512 may be disposed on one surface of the first support 511 so as to allow the second portion 512b surrounding the edge of the first portion 512a to protrude outward from the edge of the first support 511 with a predetermined length. Consequently, the pair of second portions 512b facing each other may be spaced a thickness of the first support 511 from each other.

Thus, an accommodation space 525 defined by widths of the pair of second portions 512b facing each other and the thickness of the first support 511 may be formed, and a support frame for supporting the filtration member 510 in the form of a flat plate may be inserted into and disposed in the accommodation space 525.

Figure 38:
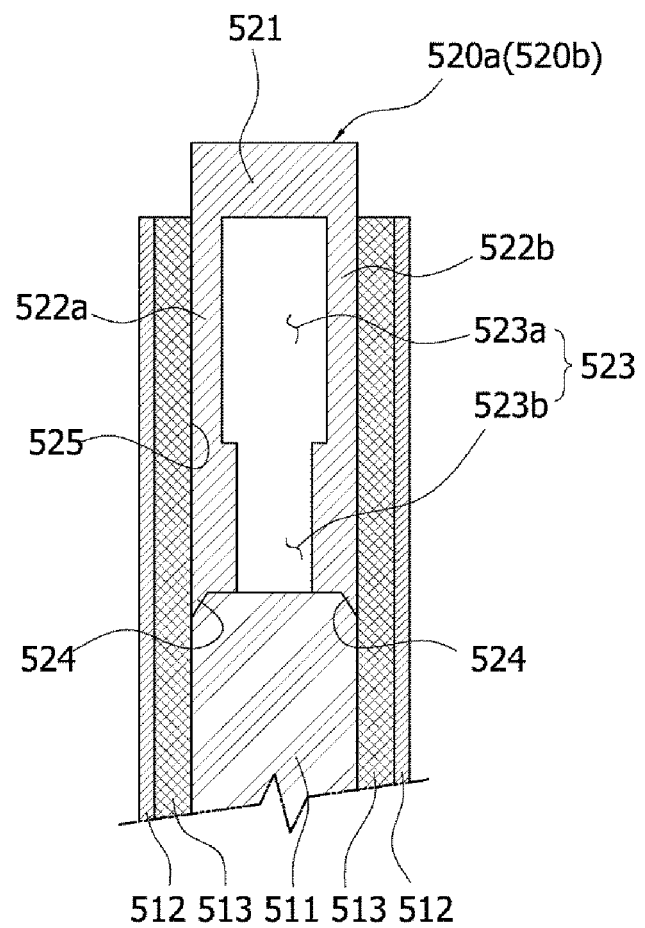
FIG. 38 is a cross-sectional view taken along line A-A of FIG. 37.

Here, the accommodation space 525 may be formed to have a width that is equal to a width of each of frames 520a and 520b (see FIG. 38). Alternatively, the accommodation space 525 may be formed to have a width that is relatively larger than the width of each of the frames 520a and 520b so as to allow the frames 520a and 520b to be smoothly inserted into the accommodation space 525 (see FIG. 42A).

In this case, the second portion 512b protruding outward from the edge of the first support 511 may be directly fixed to one surface of the support frame through heat fusing.

That is, in the present invention, the support frame for supporting the filtration member 510 is inserted into the accommodation space 525 and then directly fixed to the filtration member 510 through heat fusing such that there is no need to use an adhesive member.

To this end, the nanofiber web 512 may have a melting temperature that is similar to or lower than a process temperature performed during heat fusing so as to allow at least a portion of the nanofiber web 512 to be melted by heat during heat fusing. The support frame may be made of a polymer resin having excellent adhesive power with the nanofiber web 512 due to heat.

Consequently, a process of manually applying an adhesive member is omitted and thus work productivity may be increased, and the support frame is inserted into the accommodation space 525 and thus thinness is possible so as to improve integration.

Meanwhile, when the filtration member 510 according to the fifth embodiment of the present invention is implemented as a four or more layers structure in which at least one second support 513 is interposed between the first support 511 and the nanofiber web 512, the second support 513 may also be provided to have an area that is relatively larger than an area of the first support 511 and is equal to an area of the nanofiber web 512.

For example, when the filtration member 510 is implemented as a five-layer structure in which the second support 513 and the nanofiber web 512 are sequentially stacked on each of both surfaces of the first support 511, the second support 513 may include a fixing portion 513a extending from a plate-shaped body having a predetermined area and disposed in a region corresponding to the second portion 512b of the nanofiber web 512.

In this case, one surface of the fixing portion 513a may be laminated with the second portion 512b. Accordingly, similar to the second portion 512b, the fixing portion 513a may also protrude outward from the edge of the first support 511, and an accommodation space 525 defined by widths of a pair of the fixing portions 513a facing each other and the thickness of the first support 511 may be formed.

Here, an area of the fixing portions 513a may be an area obtained by subtracting the area of the fixing portion 513a from the entire area of the second support 513 (see FIG. 41).

Consequently, the support frame for supporting the filtration member 510 in the form of a flat plate may be inserted into and disposed in the accommodation space 525, and the fixing portion 513a protruding outward from the edge of the first support 511 may be directly fixed to one surface of the support frame through heat fusing.

As described above, when at least one second support 513 is interposed between the nanofiber web 512 and the first support 511, the nanofiber web 512 and the first support 511 may each have a melting temperature that is similar to or lower than a process temperature performed during heat fusing so as to allow at least a portion of each of the nanofiber web 512 and the first support 511 to be melted by heat during heat fusing. The support frame may be made of a polymer resin having excellent adhesive power with the second support 513 due to heat.

As described above, the support frame may be inserted into the accommodation space 525 and coupled to the edge of the first support 511 to allow the filtration member 510 to be maintained in a plate-shaped form.

The support frame may be made of a single member to entirely or partially support the edge of the filtration member 510. Alternatively, the support frame may be implemented as a plurality of frames 520a and 520b coupled to the edge of the first support 511.

Figure 43:
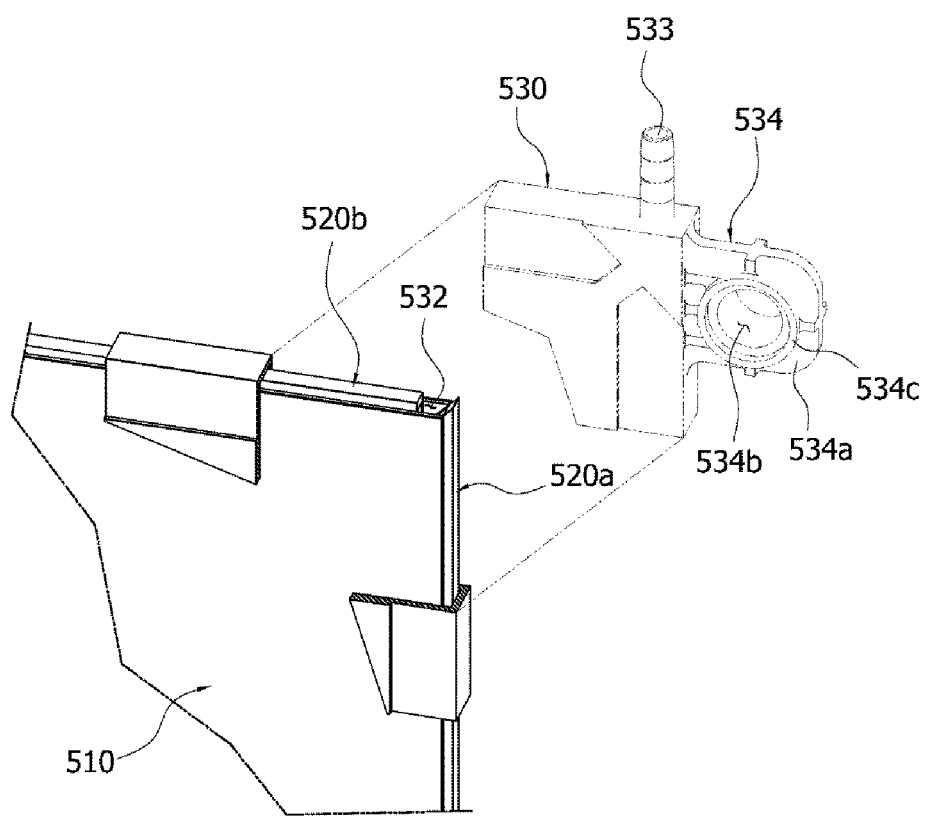
FIG. 43 is a diagram illustrating a coupled state of a connecting member and a support frame which are applied to the flat-plate filter for water treatment according to the fifth embodiment of the present invention.
Figure 44:
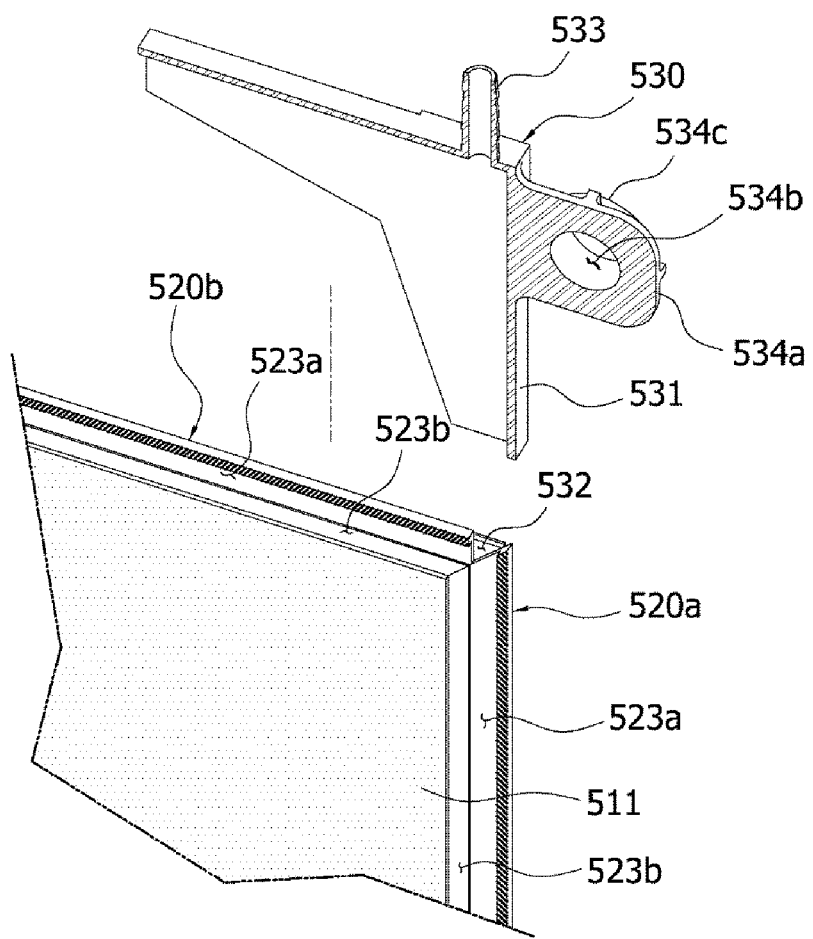
FIG. 44 is a partially cutaway view illustrating a separated state of the connecting member and the frame which are applied to the flat-plate filter for water treatment according to the fifth embodiment of the present invention.

For example, the plurality of frames 520a and 520b may be disposed at the edge of the first support 511 so as to allow an end portion of one frame of the plurality of frames 520a and 520b to be brought into contact with an end portion of the other frame thereof, and the end portions of two adjacent frames 520a and 520b may be connected via connecting members 530 and 530' which are disposed at corners of the filtration member 510 (see FIG. 43 44).

Here, an exterior shape and a function of each of the support frames 520a and 520b may be identical or similar to those of the support frame 220 of FIGS. 13 and 14.

The plurality of frames 520a and 520b may each include a plate-shaped first plate 521 and a pair of second plates 522a and 522b extending from the first plate 521 in a direction perpendicular to the first plate 521, and a flow path 523 may be formed between the pair of second plates 522a and 522b facing each other in a length directions thereof (see FIG. 38).

As described above, the frames 520a and 520b inserted into the accommodation space 525 may be integrated with the filtration member 510 by fixing outer surfaces of the second plates 522a and 522b to the second portion 512b of the nanofiber web 512 or the fixing portion 513a of the second support 513 through heat fusing.

Here, the flow path 523 may include a first flow path 523a and a second flow path 523b. The first flow path 523a may be a space defined by the pair of second plates 522a and 522b facing each other and the first plate 521, and the second flow path 523b may be a space defined by the pair of second plates 522a and 522b facing each other and openings of the frames 520a and 520b (see FIG. 38).

Figure 45:
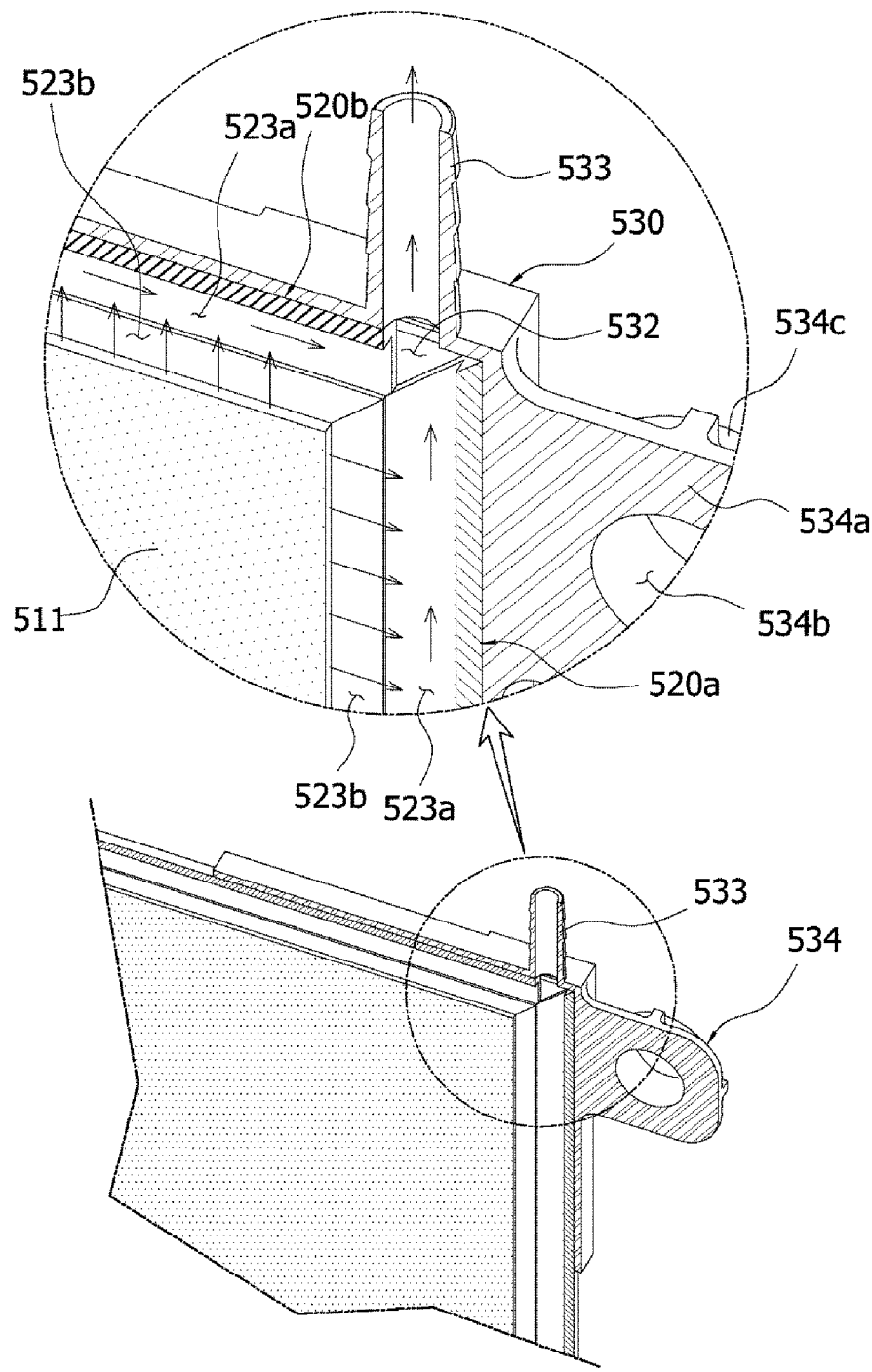
FIG. 45 is a diagram illustrating a coupled state of the connecting member, the frame, and the filtration member of FIG. 44.

Consequently, the second flow path 523b may serve as a flow path for allowing filtered water flowing from the filtration member 510 to flow to the first flow path 523a, and the first flow path 523a may serve as a main flow path through which the filtered water flowing via the second flow path 523b is collected and then flows to a water receiving hole 533 (see FIG. 45).

Here, the first flow path 523a and the second flow path 523b may be distinguished by forming inner surfaces of the second plates 522a and 522b as step surfaces. A gap between the second plates defining the first flow path 523a may be relatively larger than a gap between the second plates defining the second flow path 523b. However, a shape of the flow path 523 is not limited thereto, and the inner surfaces of the second plates 522a and 522b may be formed with horizontal surfaces such that the gap between the second plates 522a and 522b defining the first flow path 523a may be equal to the gap between the second plates 522a and 522b defining the second flow path 523b.

Meanwhile, at least one protrusion 524 protruding outward with a predetermined length may be formed at free end portions of the pair of second plates 522a and 522b (see FIGS. 36 and 38).

That is, the protrusion 524 may be formed to protrude from end portions of the second plates 522a and 522b in the length direction thereof. When the frames 520a and 520b are inserted into the accommodation space 525, the protrusion 524 may be embedded in an end portion of the edge of the first support 511 due to an external force.

Thus, the frames 520a and 520b and the first support 511 are temporarily fixed such that, during a fixing operation between the frames 520a and 520b and the second portion 512b or the fixing portion 513a through heat fusing, it is possible to prevent a position offset between the frames 520a and 520b.

As described above, in the present embodiment, the frames 520a and 520b are inserted into the accommodation space 525 and then at least a portion of the second portion 512b of the nanofiber web 512 or the fixing portion 513a of the second support 513 is melted through heat fusing such that the frames 520a and 520b may be fixed to the filtration member 510.

Meanwhile, the flat-plate filter 500 for water treatment according to the fifth embodiment of the present invention may include the connecting members 530 and 530' coupled to the corners of the support frame.

A plurality of connecting members 530 and 530' may be provided and coupled to the corners of the support frame, thereby fixing end portions of two adjacent frames 520a and 520b.

Figure 39:
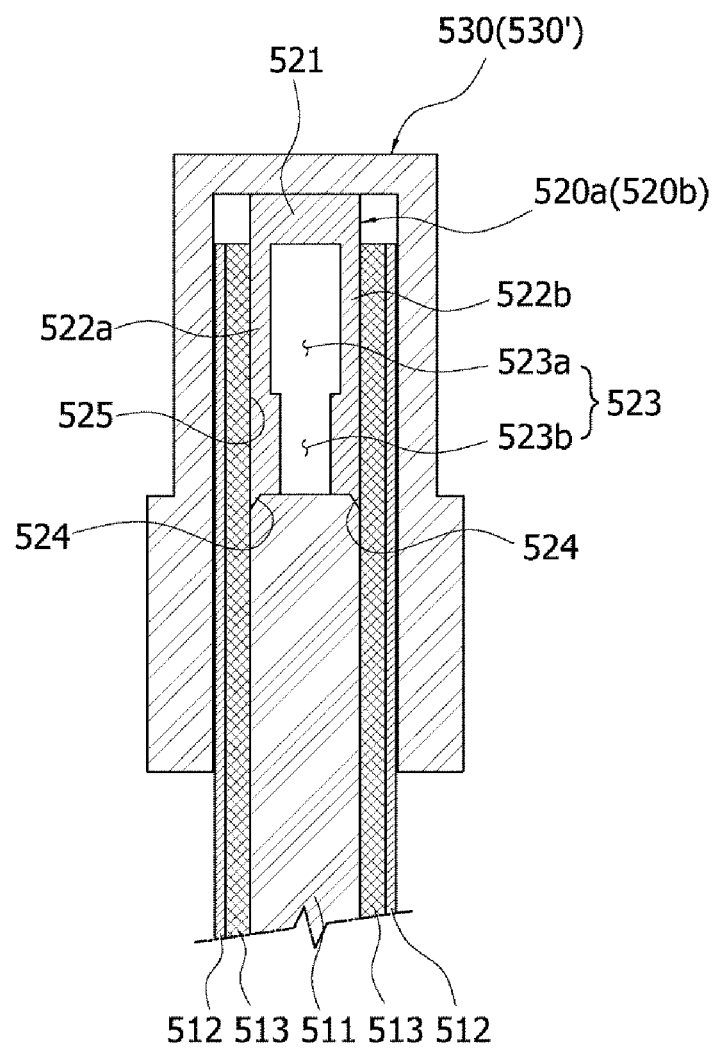
FIG. 39 is a cross-sectional view taken along line B-B of FIG. 37.
Figure 40:
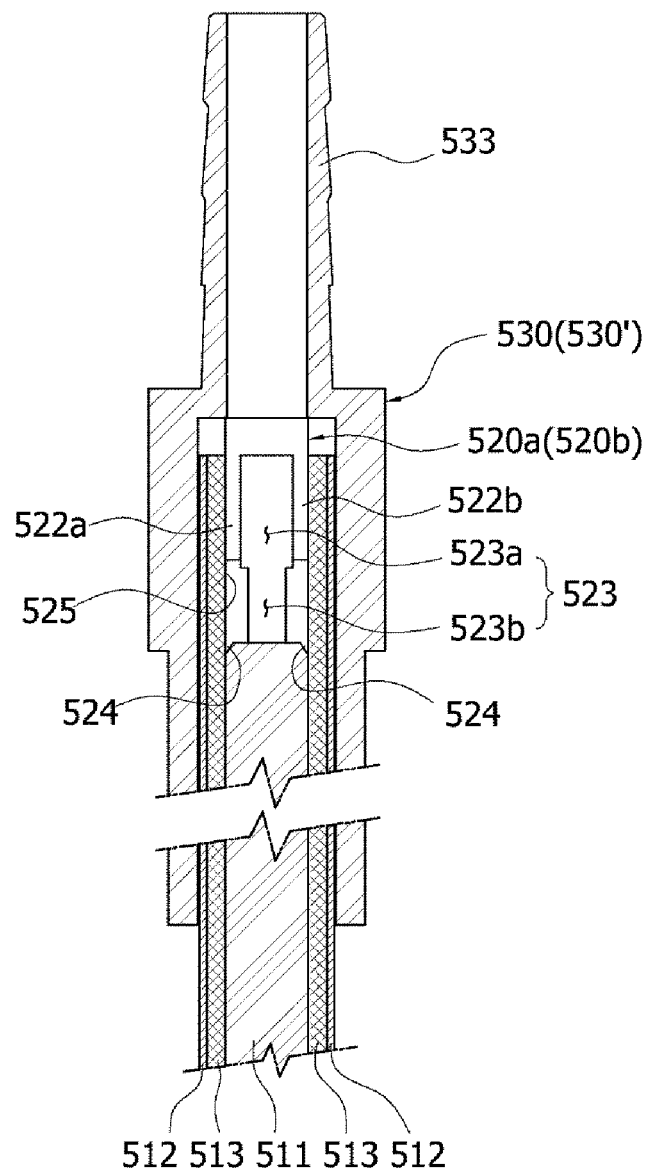
FIG. 40 is a cross-sectional view taken along line C-C of FIG. 37.

Here, the connecting members 530 and 530' may be directly coupled to the frames 520a and 520b disposed at the edge of the first support 511. Alternatively, in a state in which the outer surfaces of the frames 520a and 520b are covered with the nanofiber web 512, the connecting members 530 and 530' may be coupled to the frames 520a and 520b to cover an outer surface of the nanofiber web 512 (see FIGS. 39 and 40).

Here, an exterior shape and a function of each of the connecting members 530 and 530' may be identical or similar to those of the connecting member 130 of FIGS. 8 and 12.

Meanwhile, a plurality of the above-described flat-plate filter 100, 300, 400, or 500 for water treatment may be disposed in parallel and may be engaged with each other via the engagement bar 640, thereby constituting single modularized flat-plate filter module 600 for water treatment.

Figure 46:
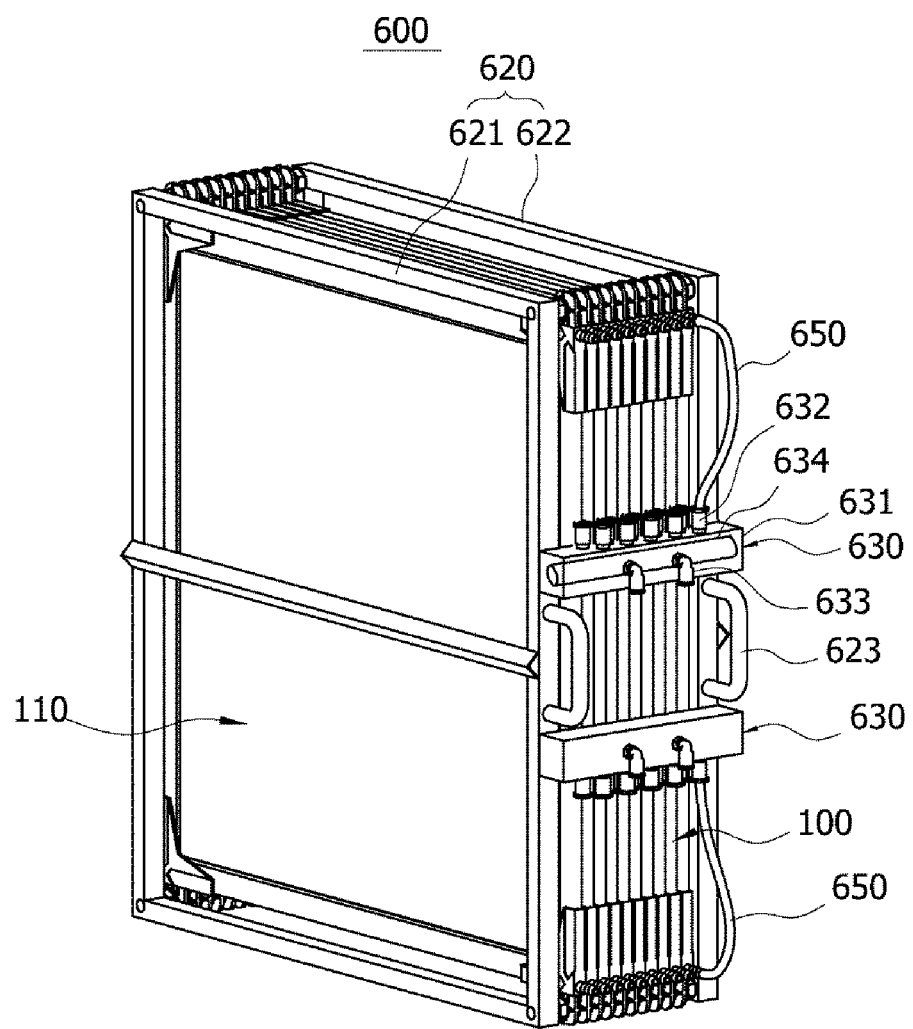
FIG. 46 is a diagram illustrating a flat-plate filter for water treatment module according to one embodiment of the present invention.

For example, as shown in FIG. 46 and described above, the flat-plate filter module 600 for water treatment may include a flat-plate filter 100 for water treatment, a fixing frame 620, and a common water receiving member 630. Here, the flat-plate filter 100 for water treatment may be substituted with the flat-plate filter 300, 400, or 500 for water treatment.

The flat-plate filter 100 for water treatment may include the filtration member 110 and the support frame 120. The flat-plate filter 100 for water treatment is configured to produce filtered water by filtering foreign materials while a target filtration liquid flows into the filtration member 110.

A plurality of flat-plate filters 100 for water treatment may be disposed in parallel, and detailed contents thereof are the same as those described above such that a detailed description thereof will be omitted.

The fixing frame 620 is configured to fix the plurality of flat-plate filters 100 for water treatment disposed in parallel.

The fixing frame 620 may be a plate-shaped member. Alternatively, the fixing frame 620 may be provided as a frame structure so as to allow a target filtration liquid to flow into the plurality of flat-plate filters 100 for water treatment.

For example, the fixing frame 620 may include a front frame 621 and a rear frame 621 disposed outside a pair of flat-plate filters 100 disposed at outermost sides among the plurality of flat-plate filters 100. Both end portions of the engagement bar 640 for interconnecting the plurality of flat-plate filters 100 may be coupled to the front frame 621 and the rear frame 621 (see FIG. 47).

Here, engagement holes (not shown) through which the end portions of the engagement bar 640 are inserted may be provided at the front frame 621 and the rear frame 621 and thus the engagement bar 640 may be fitted in and inserted into the engagement hoes. Alternatively, through-holes (not shown) passing through the front frame 621 and the rear frame 621 may be provided and thus the engagement bar 640 may be fixed through a separate fixing member in a state in which both end portions of the engagement bar 640 pass through the through-holes.

In this case, a hand grip 623 may be provided at one side of the fixing frame 620 so as to allow a user or an operator to easily attach or detach the modularized flat-plate filter module 600.

Further, a member constituting each of the front frame 621 and the rear frame 621 may be provided in the form of a plate-shaped bar having a predetermined width and a predetermined length, an "I-shaped" beam, an "inverted and reversed L-shaped" beam, or an angled pipe.

As described above, in the flat-plate filter module 600 for water treatment according to the present invention, the plurality of flat-plate filters 100 may be disposed in parallel, and the filtration member 110 provided in each of the plurality of flat-plate filters 100 may be disposed in a state of being spaced at predetermined intervals through a spacing member 134c.

Accordingly, a suction force provided from the outside, e.g., a single pump (not shown), is transmitted to each of the plurality of flat-plate filters 100 through the water receiving hole 133 such that the plurality of flat-plate filter 100 may produce filtered water in one process.

Consequently, a large amount of filtered water may be simultaneously produced through the plurality of flat-plate filters 100 such that production efficiency of filtered water may be increased.

Meanwhile, when the plurality of flat-plate filters 100 are provided in the flat-plate filter module 600 for water treatment according to the present invention, the common water receiving member 630 may be provided so as to simultaneously provide a suction force to the water receiving holes 133 of the plurality of flat-plate filters 100 and collect filtered water produced in the plurality of flat-plate filters 100 (see FIG. 46).

That is, the common water receiving member 630 is connected to each of the water receiving holes 133 via a tube 650 such that a suction force provided from the outside may be transmitted to each of the plurality of flat-plate filters 100 through the common water receiving member 630, the filtered water may be produced in each of the plurality of flat-plate filters 100 due to the transmitted suction force, and the filtered water produced in each of the plurality of flat-plate filters 100 may be collected to the common water receiving member 630 due to the suction force via the collecting space 132 and the water receiving hole 133.

A single common water receiving member 630 may be provided. Alternatively, when two water receiving holes 133 are provided at each of the plurality of flat-plate filters 100, two common water receiving members 630 may be provided to correspond to the two water receiving holes 133, thereby being connected to the two water receiving holes 133 in a one-to-one relationship.

To this end, the common water receiving member 630 includes a main body 631 having an inlet 632 connected to each of the water receiving holes 133 via the tube 650, and an outlet 633 for discharging filtered water, which flows from each of the flat-plate filters 100 to the main body 631, to the outside or providing an externally provided suction force to the water receiving hole 133.

A storage space 634 may be formed in the main body 631 so as to temporarily collect the filtered water flowing from the water receiving holes 133 provided at the flat-plate filters 100.

The inlet 632 is connected to the water receiving hole 133 to serve to allow the filtered water discharged from the water receiving hole 133 to flow into the storage space 634 of the main body 631.

In this case, a plurality of inlets 632 may be provided to be connected to a plurality of water receiving holes 133 and may be connected to the plurality of water receiving holes 133 in a one-to-one relationship.

Here, the plurality of inlets 632 may be connected to the plurality of water receiving holes 133 via the tube 650 in a one-to-one relationship. Alternatively, the plurality of water receiving holes 133 may be directly connected to the common water receiving member 630.

Meanwhile, when the inlet 632 and the water receiving hole 133 are connected via the tube, the common water receiving member 630 may be disposed to be located at an intermediate length portion of the fixing frame 620.

This is for preventing, when a gap between the water receiving hole 133 and the inlet 632 is too narrow, the tube 650 from being bent such as to hinder a flow of the filtered water while the tube 650 is connected.

The outlet 633 may serve to discharge the filtered water flowing into the storage space 634 via the inlet 632 to the outside, e.g., a filtered water storage tank (not shown).

The flat-plate filter module 600 for water treatment according to the present invention may be applied to a known wastewater treatment system.

Although the exemplary embodiments of the present invention have been described, the spirit of the present invention is not limited to the exemplary embodiments disclosed herein, and it should be understood that numerous other embodiments can be devised by those skilled in the art that will fall within the same spirit and scope of this disclosure through addition, modification, deletion, supplement, and the like of a component, and also these other embodiments will fall within the spirit and scope of the present invention.

The invention claimed is:

1. A flat-plate filter for water treatment, comprising:
a plate-shaped filtration member including a first support comprising two surfaces and a membrane formed on both surfaces of the first support; and
a support frame into which an edge of the filtration member is inserted so as to support the filtration member,
wherein the first support acts as a passage for filtered water in which foreign materials are filtered and a target filtration liquid passes through the membrane,
wherein the support frame comprises a first plate and a pair of second plates extending from both end portions of the first plate, thereby allowing the edge of the filtration member to be inserted,
wherein the support frame includes a flow path, which is a space formed when the edge of the filtration member is spaced apart from an inner surface of the first plate or an inner surface of the second plates, and
wherein the space is the flow path through which the filtered water flowing from the edge of the first support moves as the edge of the filtration member is disposed in the flow path or at the edge of the flow path, and the edge of the first support is exposed to the flow path inside the support frame.

2. The flat-plate filter for water treatment of claim 1, wherein the membrane is removed from at least a portion of the edge of the filtration member disposed in the flow path such that the first support is exposed to the flow path.

3. The flat-plate filter for water treatment of claim 1, wherein:
the support frame includes a plurality of frames coupled to the edge of the filtration member; and
each of the plurality of frames includes the first plate and the pair of second plates.

4. The flat-plate filter for water treatment of claim 3, wherein the flow path is formed by inner surfaces of the first plate and the second plates and one surface of the first support.

5. The flat-plate filter for water treatment of claim 3, wherein only the first support on one surface of the filtration member is brought into contact with the first plate.

6. The flat-plate filter for water treatment of claim 3, wherein each of the plurality of frames further includes a confinement member protruding from an inner surface of the first plate toward the flow path so as to limit an insertion depth of the filtration member.

7. The flat-plate filter for water treatment of claim 3, wherein an accommodation space for accommodating an adhesive member is formed between the filtration member and inner surfaces of the second plates.

8. The flat-plate filter for water treatment of claim 7, wherein the accommodation space is formed through at least one step surface, which is formed on an inner surface of an end portion of the second plate.

9. The flat-plate filter for water treatment of claim 3, wherein:
the plurality of frames are disposed such that one end portion of at least one of the plurality of frames is brought into contact with another end portion thereof;
a collecting space in which filtered water flows in different directions through the flow path is formed at adjacent end portions of one of the plurality of frames and another constituting a corner of the support frame; and
the collecting space communicates with a water receiving hole for discharging the filtered water.

10. The flat-plate filter for water treatment of claim 1, further comprising a plurality of connecting members coupled to corners of the support frame and a plurality of filtration members,
wherein a gap adjuster for adjusting a gap between adjacent filtration members of the plurality of filtration members is provided to at least one among the plurality of connecting members.

11. The flat-plate filter for water treatment of claim 10, wherein each of the plurality of connecting members includes:
a body coupled to the corner of the support frame; and
the gap adjuster having an engagement hole through which an engagement bar having a predetermined length passes.

12. The flat-plate filter for water treatment of claim 10, wherein at least one of the plurality of connecting members further includes a water receiving hole for discharging filtered water flowing into the flow path.

13. The flat-plate filter for water treatment of claim 1, wherein the filtration member further includes a second support disposed between the membrane and the first support.

14. The flat-plate filter for water treatment of claim 1, wherein the membrane is made of a nanofiber web.

15. A flat-plate filter module for water treatment, comprising:
a plurality of flat-plate filters for water treatment of claim 1, each of which includes at least one water receiving hole through which water filtered through a filtration member is discharged and which are disposed in parallel geometrically;
a fixing frame configured to fix the plurality of flat-plate filters for water treatment disposed in parallel via at least one engagement bar; and
at least one common water receiving member connected to the water receiving holes provided at the plurality of flat-plate filters for water treatment in a one-to-one relationship, in which one of the water receiving holes is connected to another one of the water receiving holes, to collect the filtered water discharged from the water receiving holes.

* * * * *